(12) United States Patent
     Ferguson

(10) Patent No.: US 11,162,471 B2
(45) Date of Patent: Nov. 2, 2021

(54) SYSTEMS AND METHODS FOR GENERATING ELECTRICAL ENERGY

(71) Applicant: Waterotor Energy Technologies Inc., Ottawa (CA)

(72) Inventor: Frederick D. Ferguson, Chelsea (CA)

(73) Assignee: Waterotor Energy Technologies Inc., Ottawa (CA)

(*) Notice: Subject to any disclaimer, the term of this patent is extended or adjusted under 35 U.S.C. 154(b) by 0 days.

(21) Appl. No.: 16/966,033

(22) PCT Filed: Feb. 1, 2019

(86) PCT No.: PCT/CA2019/050125
     § 371 (c)(1),
     (2) Date: Jul. 30, 2020

(87) PCT Pub. No.: WO2019/148285
     PCT Pub. Date: Aug. 8, 2019

(65) Prior Publication Data
     US 2020/0355154 A1    Nov. 12, 2020

(30) Foreign Application Priority Data
     Feb. 2, 2018  (CA) .............................. CA 2993857

(51) Int. Cl.
     *F03B 17/06*     (2006.01)
     *B63B 35/44*     (2006.01)
     (Continued)

(52) U.S. Cl.
     CPC ............ *F03B 17/065* (2013.01); *B63B 35/44* (2013.01); *F03B 3/12* (2013.01); *H02K 7/1823* (2013.01); *B63B 2035/4466* (2013.01)

(58) Field of Classification Search
     CPC ........ F03B 17/065; F03B 3/12; F03B 17/063; B63B 35/44; B63B 2035/4466; H02K 7/1823; Y02E 10/30; Y02E 10/20; E02B 9/08; F05B 2250/33; F05B 2240/97; F05B 2250/312; F05B 2240/30; F05B 2240/12
     See application file for complete search history.

(56) References Cited

U.S. PATENT DOCUMENTS

| 8,167,533 B2* | 5/2012 | Lucy ..................... F03D 3/0454 415/4.2 |
| 9,689,368 B2* | 6/2017 | Hopper ................... F03B 13/08 |
| 2011/0006534 A1* | 1/2011 | Achard ................. F03B 17/063 290/54 |

FOREIGN PATENT DOCUMENTS

| CN | 202055980 U | 11/2011 |
| CN | 202273812 U | 6/2012 |
| (Continued) |

OTHER PUBLICATIONS

International Search Report and Written Opinion for PCT/CA2019/050125, dated Aug. 8, 2019, 15 pages.

*Primary Examiner* — Joseph Ortega
(74) *Attorney, Agent, or Firm* — Luedeka Neely Group, P.C.

(57) ABSTRACT

A vertical twin rotor water turbine apparatus and method for extracting energy from a flow of water is described herein. The described apparatus delivers favourable performance by virtue the operation of a novel configuration of a plurality of central cores with at least one blade member extending from each core and flow directors to increase the effectiveness and efficiency of said device.

20 Claims, 56 Drawing Sheets

(51) Int. Cl.
*F03B 3/12* (2006.01)
*H02K 7/18* (2006.01)

(56) References Cited

FOREIGN PATENT DOCUMENTS

| | | |
|---|---|---|
| CN | 104533699 A | 4/2015 |
| CN | 104787280 A | 7/2015 |
| CN | 106917717 A | 7/2017 |
| EP | 2927476 A1 | 10/2015 |
| FR | 2976979 A1 | 12/2012 |
| KR | 20110013184 A | 12/2011 |

* cited by examiner

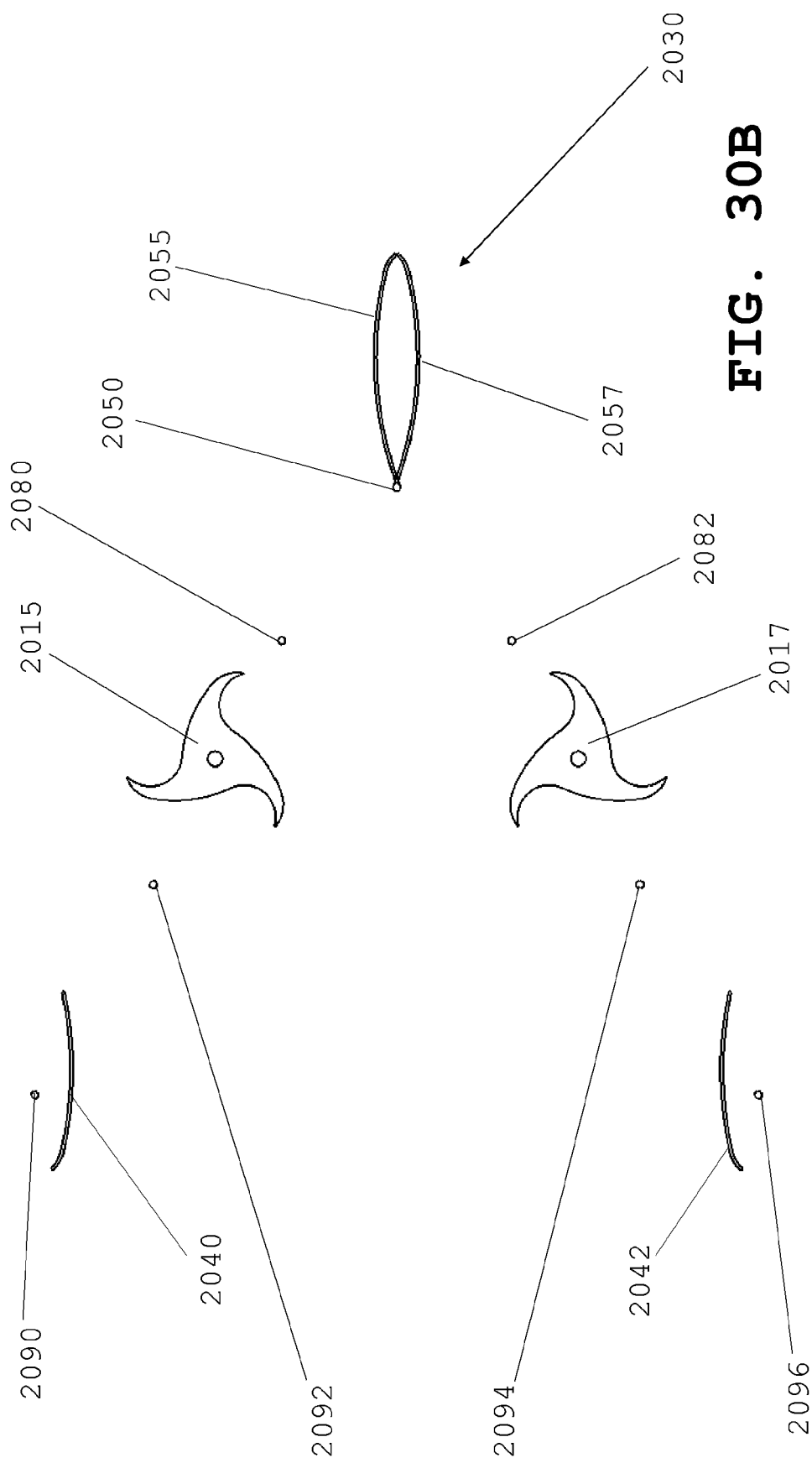

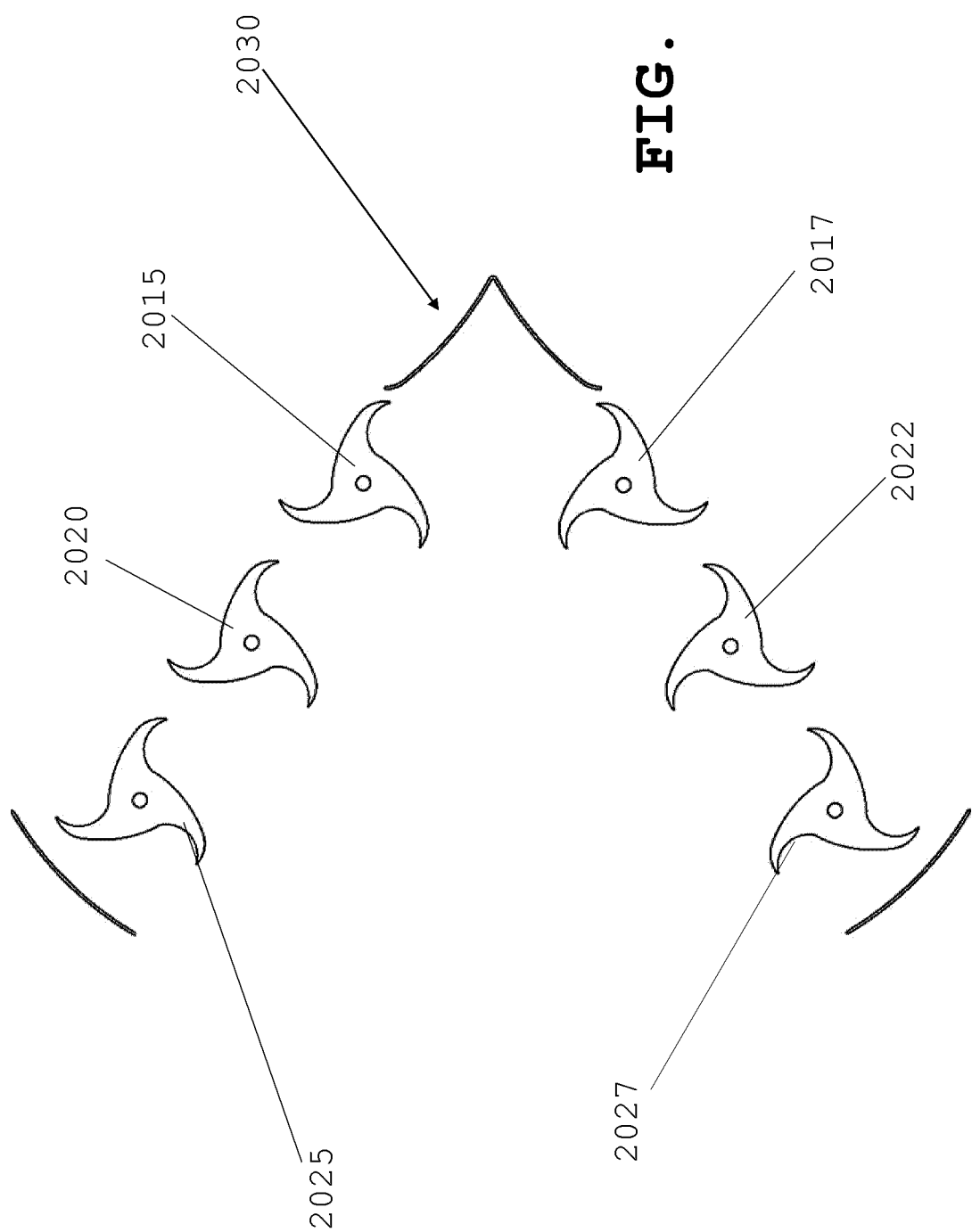

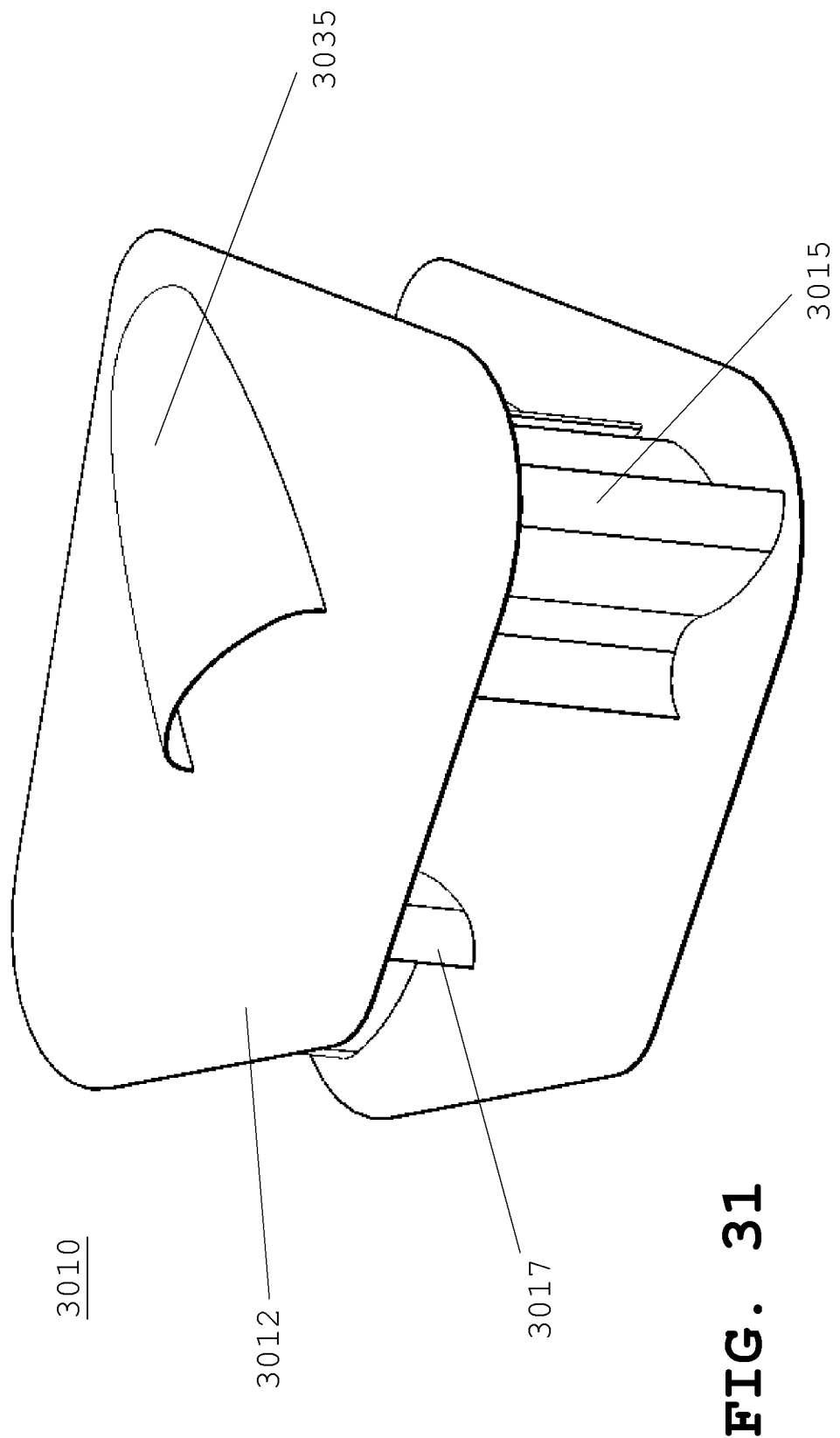

SYSTEMS AND METHODS FOR GENERATING ELECTRICAL ENERGY

FIELD

The disclosure relates to the field of electrical energy generation, and more specifically to systems and methods of generating electrical energy using a vertical twin rotor water turbine.

BACKGROUND

The world demand for energy is ever increasing thereby giving rise to the need to develop and continually improve energy-extracting technologies. Renewable energy sources are favourable due to their relatively low environmental impact. One example of a renewal energy source is a hydro electric generating device, commonly referred to as a water turbine.

Various configurations of water turbine exist for extracting energy from a flow of water. However, such devices can be difficult to maintain as they are typically submerged under water, thereby imposing harsh conditions on the mechanical components essential to the devices' vitality. Furthermore, there is ongoing pressure to increase the effectiveness and efficiency of these devices and decrease the minimum flow speed requirements for their operability such that a larger proportion of our planet's running water sources may be harnessed for their energy.

These deficiencies, and others, are addressed by the various embodiments described in the present disclosure.

SUMMARY OF THE DISCLOSURE

In an aspect, the present disclosure provides an apparatus for extracting energy from a flow of water, the apparatus comprising: a plurality of central cores, each supported at a first and second end, each core rotatable about a substantially vertical axis; at least one blade member extending from each of the central cores for engaging with the flow of water to cause rotation of the central cores; and, at least one primary flow director positioned at a leading end of the apparatus for directing incoming water flow toward a predetermined region along each of the at least one blade members, wherein the plurality of cores is positioned behind the at least one primary flow director.

In another aspect, the present disclosure provides a blade for use with an energy-generating turbine, the turbine having a central rotating member, the blade having a ram surface and a lift-surface, the blade comprising: an inner portion proximate the central rotating member; a central portion beginning at a distal end of the inner portion; and, an outer portion beginning at a distal end of the central portion and terminating in a sharp tip; wherein the central portion is curved to induced lift to the non-ram side of the blade; and wherein a curvature of the outer portion at the tip substantially corresponds to a curvature of a circular path travelled by the tip of the blade during rotation of the central rotating member.

In another aspect, the present disclosure provides a method to extract energy from a flow of water, comprising the steps of: deploying an apparatus into a water mass, the apparatus comprising: a plurality of central cores, each supported at a first and second end, each core rotatable about a substantially vertical axis; at least one blade member extending from each of the central cores for engaging with the flow of water to cause rotation of the central cores; and, at least one primary flow director positioned at a leading end of the apparatus for directing incoming water flow toward a predetermined region along each of the at least one blade members, wherein the plurality of cores is positioned behind the at least one primary flow director; operating the apparatus to generate energy from the flow of water; and, transmitting the energy to power an electrical device.

BRIEF DESCRIPTION OF THE DRAWINGS

The following figures serve to illustrate various embodiments of features of the disclosure. These figures are illustrative and are not intended to be limiting.

FIG. 30B is a top view of a configuration of the front flow director, central cores and secondary flow directors, the front flow director and secondary flow directors having stoppers, according to an embodiment of the present disclosure;

FIG. 30C is a top view of a configuration of the front flow director, secondary flow directors and a plurality of central cores in a substantially V-shaped configuration, according to an embodiment of the present disclosure;

FIG. 31 is a top perspective view of an energy extraction apparatus for shallow water, according to yet another embodiment of the present disclosure;

DETAILED DESCRIPTION

The following embodiments are merely illustrative and are not intended to be limiting. It will be appreciated that various modifications and/or alterations to the embodiments described herein may be made without departing from the disclosure and any such modifications and/or alterations are within the scope of the contemplated disclosure.

Figure 1:
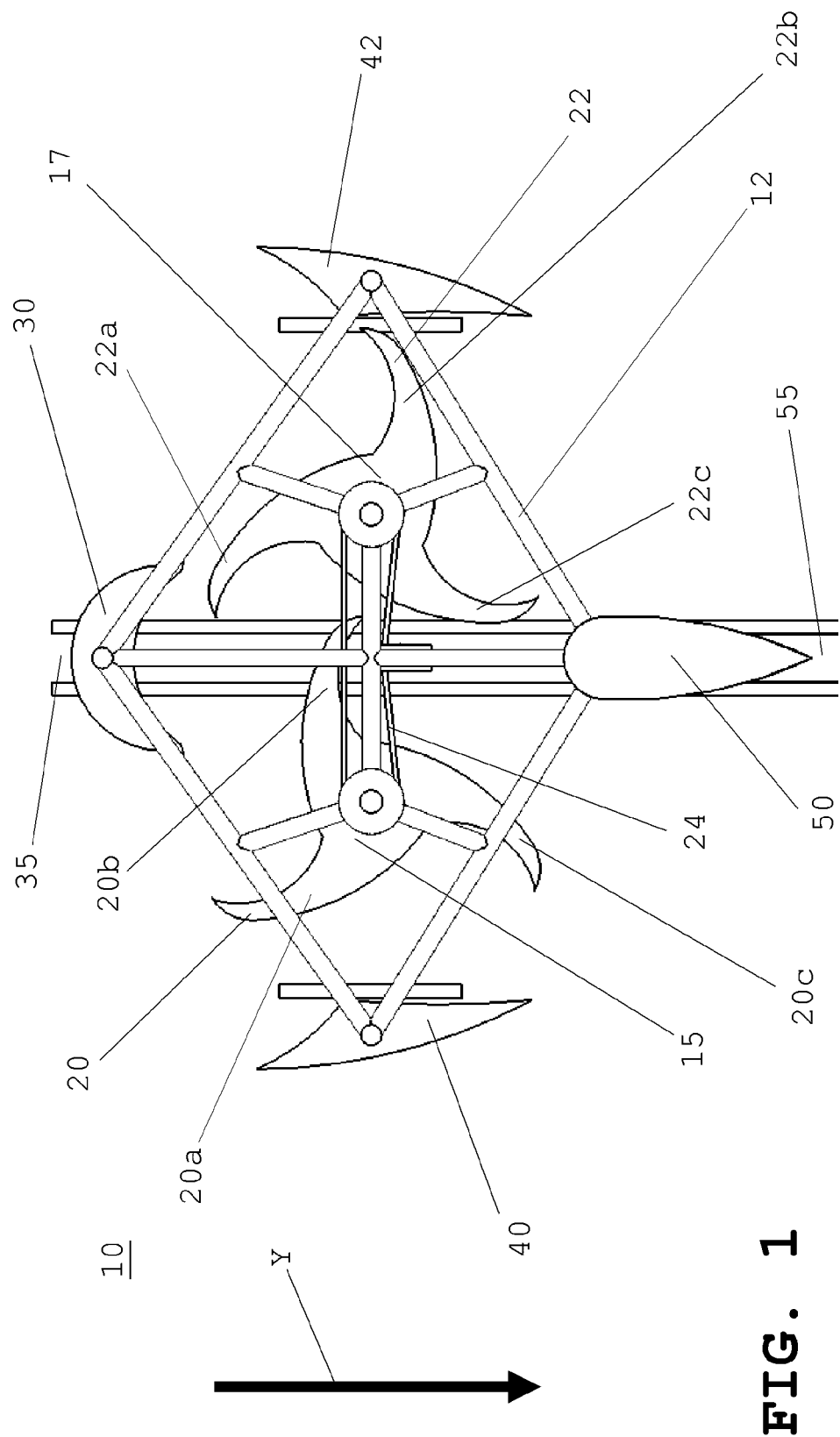
FIG. 1 is a top view of an energy extraction apparatus according to an embodiment of the present disclosure.
Figure 2:
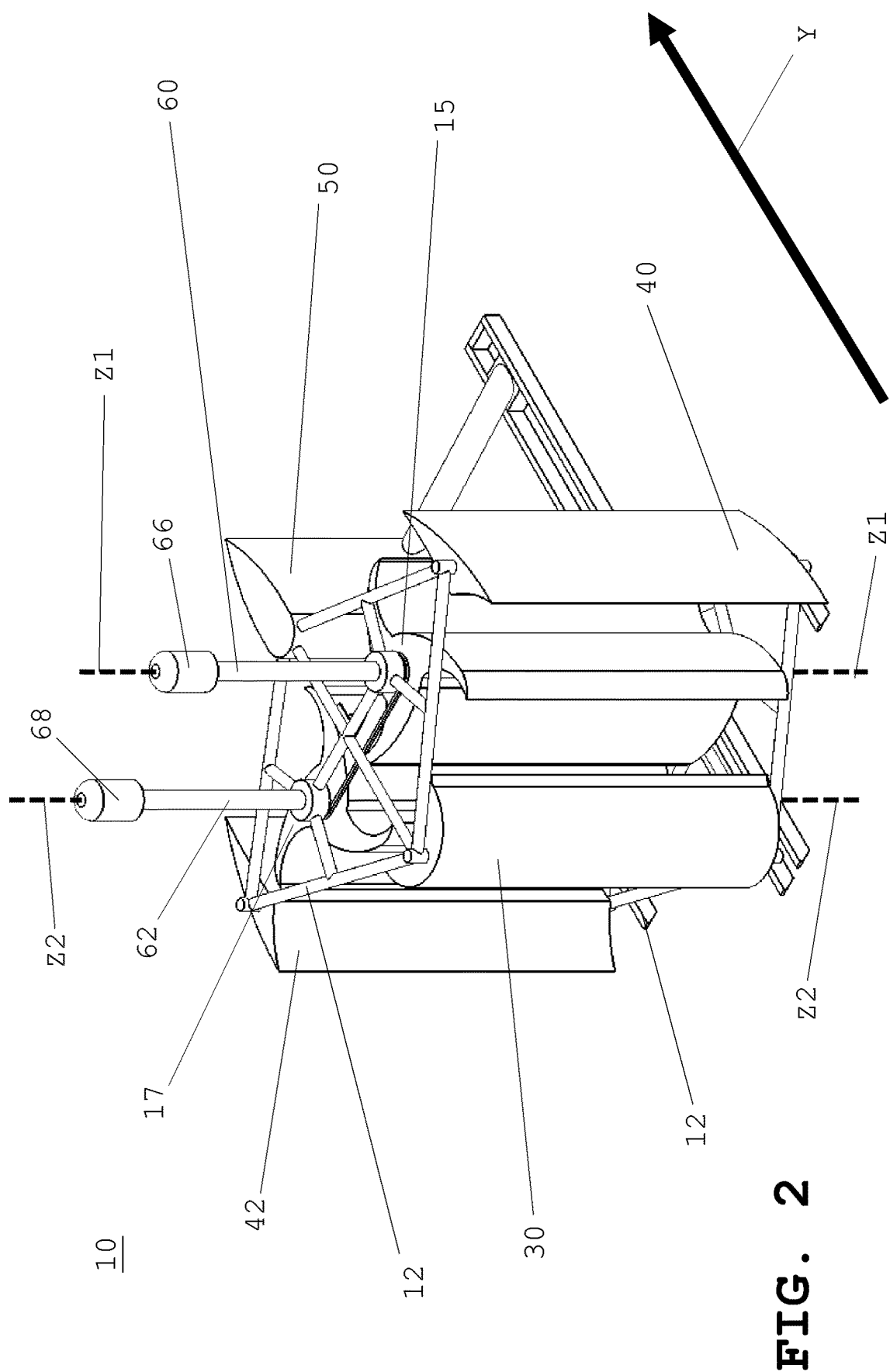
FIG. 2 is a perspective view of the energy extraction apparatus shown in FIG. 1.

With reference to FIGS. 1 and 2 and according to an embodiment of the present disclosure, an energy extraction apparatus 10 is shown. In this embodiment, apparatus 10 is comprised of two central cores 15, 17. Each of the central cores 15, 17 are supported at opposing ends such that they are permitted freedom of rotation about their respective central axes Z1, Z2. In operation, the cores 15, 17 are positioned such that their axes of rotation are vertical or substantially vertical. In the embodiment illustrated, the two cores 15, 17 are supported by suitable bearings (not shown) and frame 12. Persons of ordinary skill in the art will appreciate that the supporting frame 12 may take on various configurations provided that it serves to maintain the necessary spatial relationship between the various components of the apparatus 10.

Each core 15, 17 has a plurality of blade members 20, 22 that extend out radially from the center of the cores 15, 17. In the preferred embodiment, the apparatus 10 is illustrated as having three blades per core 15, 17; however, the person skilled in the art will appreciate that a lesser or greater number of blades per core may be used without departing from this disclosure. As water flows in direction Y toward and through the apparatus 10, forces generated by the water on the blade members 20, 22 cause a rotation of the cores 15, 17. In the embodiment illustrated and from the vantage point depicted in FIG. 1, water flowing in direction Y would cause core 15 to rotate counter-clockwise and core 17 to rotate clockwise. The resulting rotational energy of the cores 15, 17 may then be converted to electricity using a combination of gearboxes and generators, as necessary, that are commonly known in the art. For greatly simplicity, gearboxes and generators have not been included in the figures.

A suitable combination of power transmission components may be used to ensure the synchronization of the rotation of the cores 15, 17 and avoid physical contact between the blade members 20, 22. For example, combination of chain 24 and sprockets may be used to achieve the synchronization of the bladed cores 15, 17 in opposite directions. Those skilled in the art would appreciate that other suitable combinations of power transmission components may be used to synchronize rotation of the cores 15, 17.

Apparatus 10 comprises numerous elements that help to increase the overall coefficient of power of the system. These elements will now be described with continued reference to FIGS. 1, 2 and 3. A primary flow director 30 is positioned at a leading end 35 of the apparatus 10. As shown, primary flow director 30 is held in position by frame 12. The primary flow director 30 serves to direct incoming water flow in such a way to maximize the resulting rotational energy of the cores 15, 17. Preferably, incoming water flow is directed to a stagnation point of the bladed core 15, 17. As known in the art, when a static object is placed in the path of a fluid flow, the stagnation point is the point along the object that separates fluid flowing to one side of the object from fluid flowing to the other side of the object. In the case of the rotating cores 15, 17 and blade members 20, 22 described herein, the stagnation point will change with the rotational position of the blade members 20, 22 as well as with variations of the direction of the fluid flow. As such, the stagnation point will be continuously changing during operation of the apparatus 10. Through experimentation, applicant has found it desirable to direct incoming fluid flow toward an area along the blade members 20, 22 within the speckled zone depicted as B in FIG. 4. The boundaries of zone B consist of two substantially parallel planes. The first plane P1 is the plane that contains the rotational axis of the core in question (in this example core 15) and is substantially parallel to the natural flow direction Y. The second plane P2 is a plane resulting from a lateral translation of plane P1 by a distance of 0.5*R in a direction normal to axis Z1 of the core in question 15 toward the axis Z2 of the other core (core 17 in this example). Distance R is defined as the radius of the circumferential path travelled by the tips of the blade members 20 of the core in question 15 during rotation.

Figure 3:
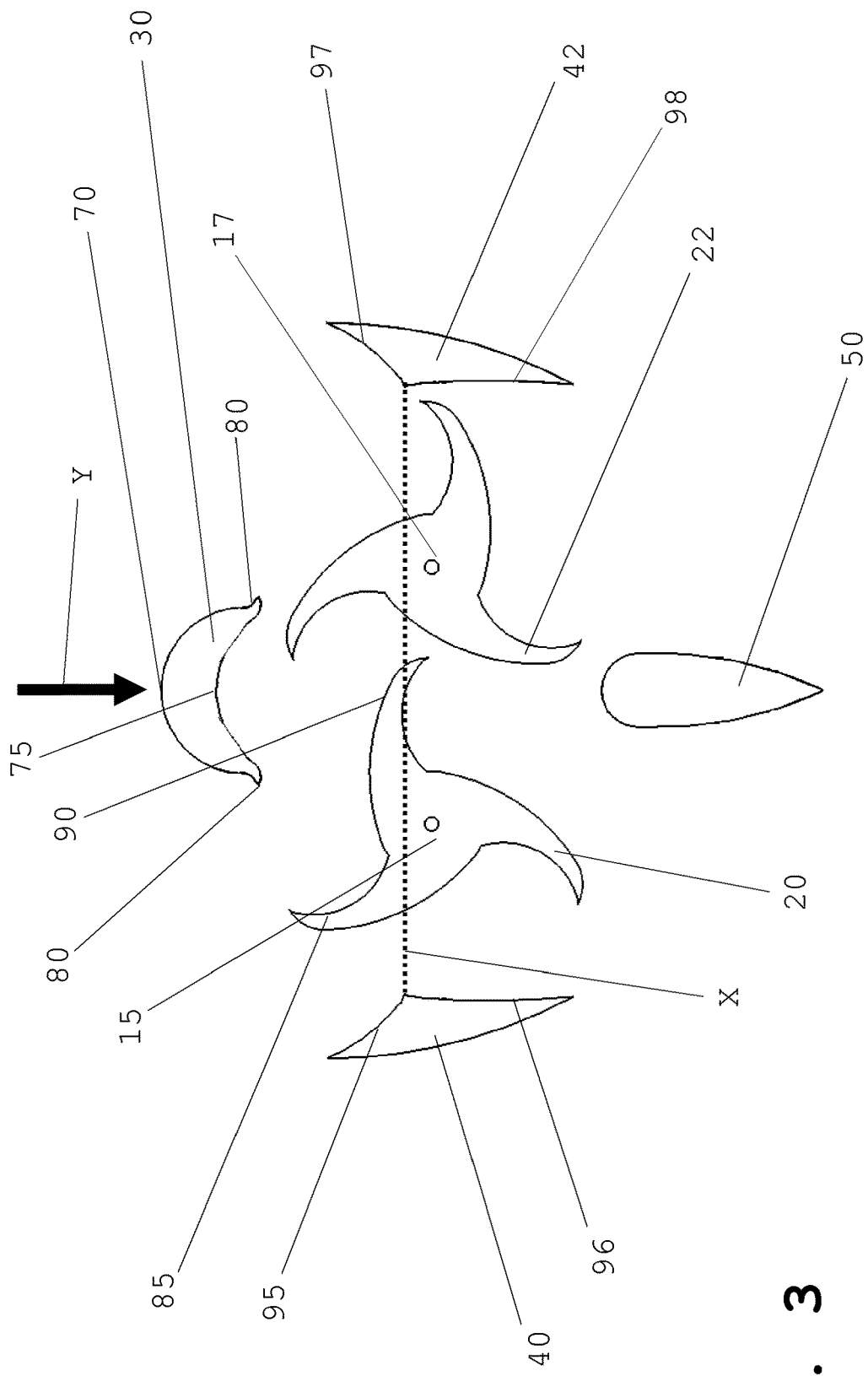
FIG. 3 is a top view of the primary flow director, the central cores, the foil and secondary flow directors of the energy extraction apparatus shown in FIG. 1.

With continued reference to FIGS. 1, 2 and 3, secondary flow directors 40, 42 are shown secured to the frame 12 and positioned next to and to the outside of the rotational periphery of each of the bladed cores 15, 17. The secondary flow directors 40, 42 serve to corral peripheral incoming fluid flow (via surfaces 95, 97) and direct it toward the blade members 20, 22 to enhance the rotation-inducing forces experienced by the blade members 20, 22. Secondary flow directors 40, 42 also serve to contain fluid flow (via surfaces 96, 98) exiting the rotation of the blade members 20, 22 downstream of the rotational axes. Containing fluid flow exiting the apparatus 10 helps to reduce drag on the apparatus 10 by facilitating reattachment of the flow downstream. Reattachment of downstream flow may be further induced using a reattachment member such as foil 50. Foil 50 is a structural member having substantially the same height as the cores 15, 17 and blade members 20, 22. Foil 50 is positioned at a rear end 55 of the apparatus 10 (downstream with respect to the cores 15, 17) and serves to reattach fluid flowing from the blade members 20, 22, thereby reducing drag and increasing the coefficient of power of the system. Applicant has determined that a teardrop geometry resulting in a symmetrical airfoil is preferred. The person of ordinary skill in the art, however, will appreciate that reduction of drag at the tail end of the apparatus may be accomplished by similar structures of varying geometries other than the teardrop illustrated in the preferred embodiments.

With reference to FIG. 2, each core 15, 17 of apparatus 10 may be connected to a generator (not shown) via shafts 60, 62 projecting along the rotational axes Z1, Z2 of the cores 15, 17. The shafts 60, 62 may be coupled to the cores 15, 17 using, for example, various coupling configurations, keyless locking devices, or other suitable means known to the person of ordinary skill in the art. The generators (not shown) would serve to convert the rotational energy of the cores 15, 17 into electricity. The ordinary skilled person would appreciate that although shafts 60, 62 are described herein as components separate from the cores 15, 17, the cores 15, 17 may alternatively be manufactured with protruding shafts built-in (for example, each core and protruding shaft being a unitary molded part).

Figure 13:
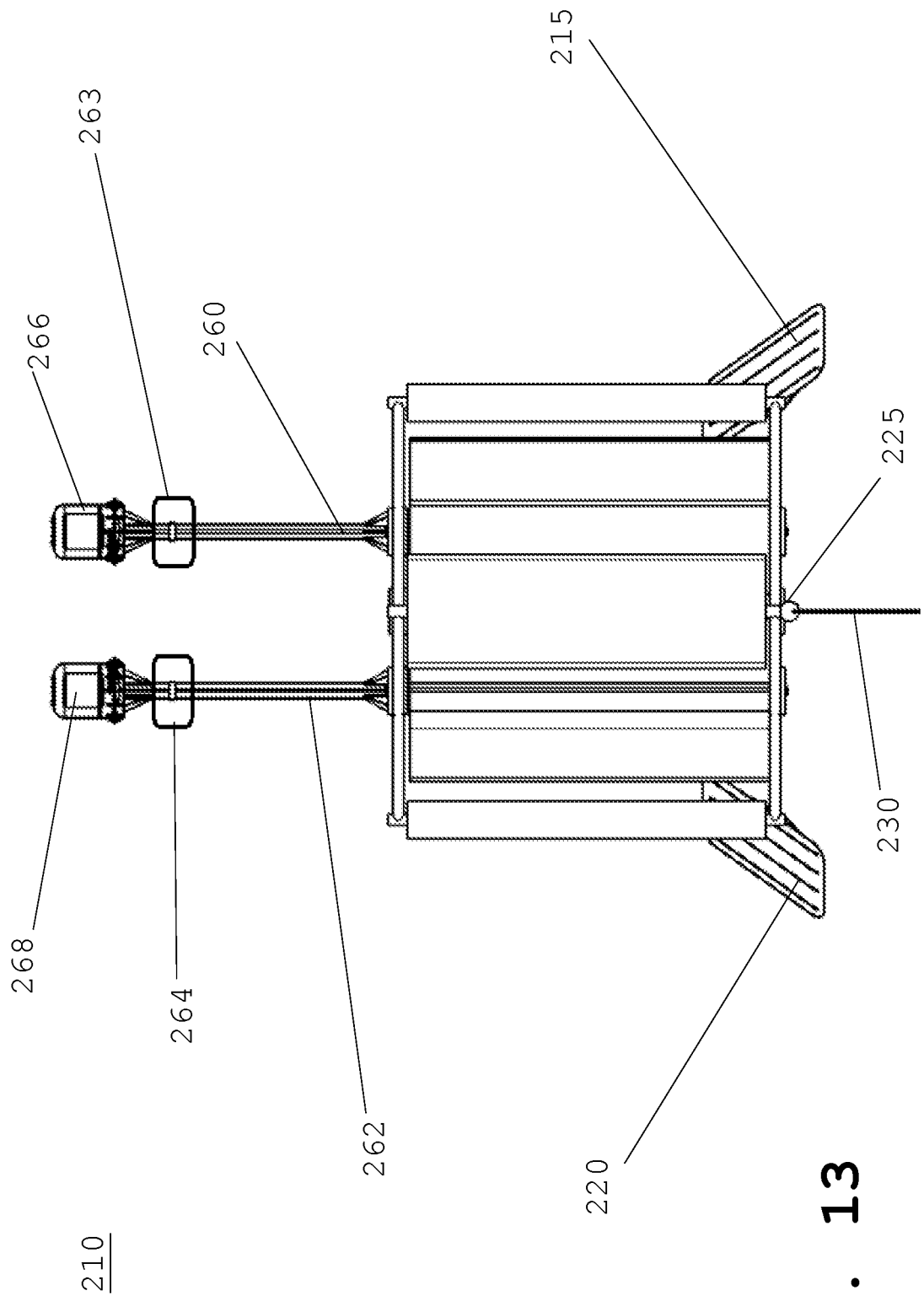
FIG. 13 is a front view of an energy extraction apparatus having dihedral fins according to another embodiment of the present disclosure.
Figure 14:
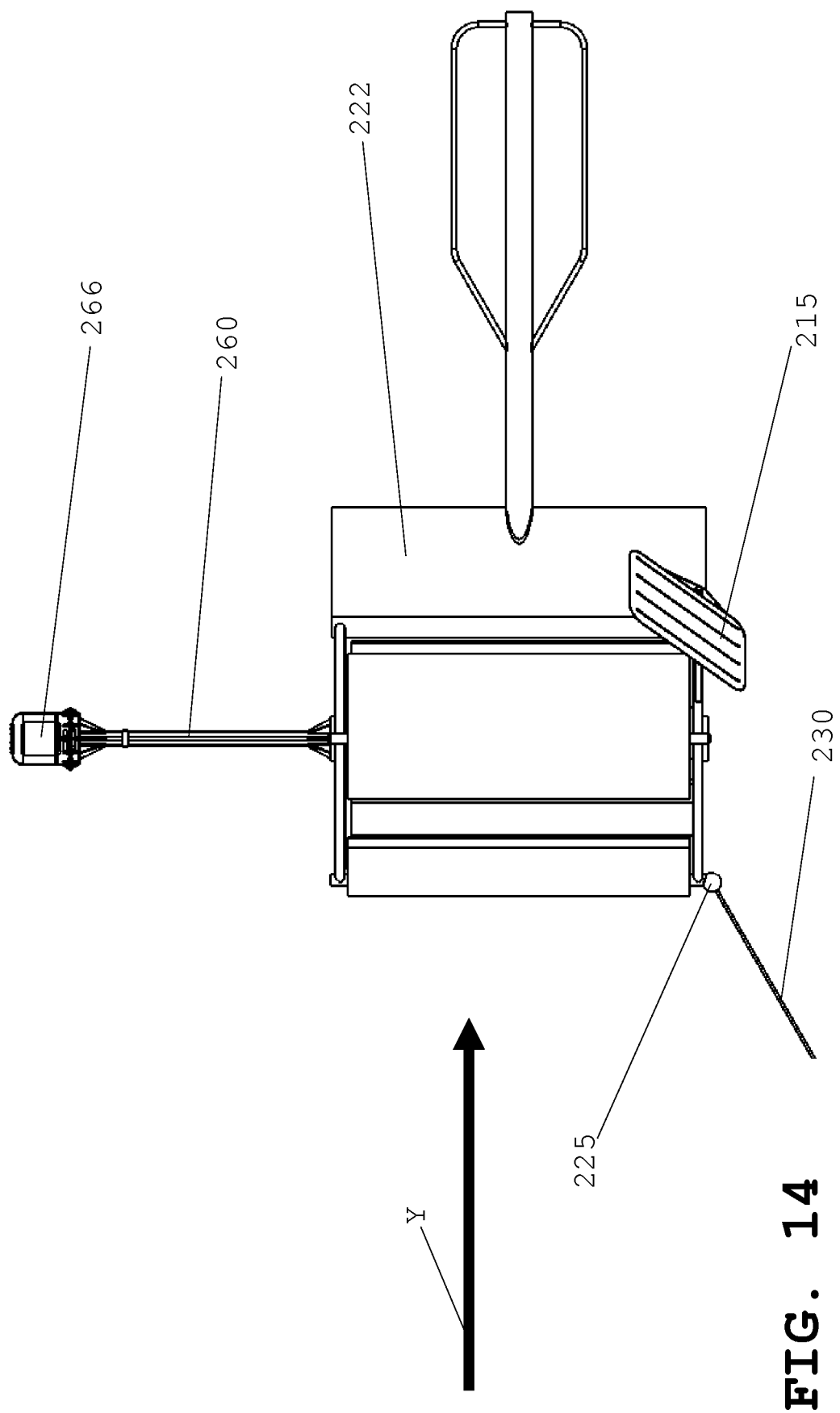
FIG. 14 is a side view of the energy extraction apparatus having dihedral fins according to another embodiment of the present disclosure.
Figure 15:
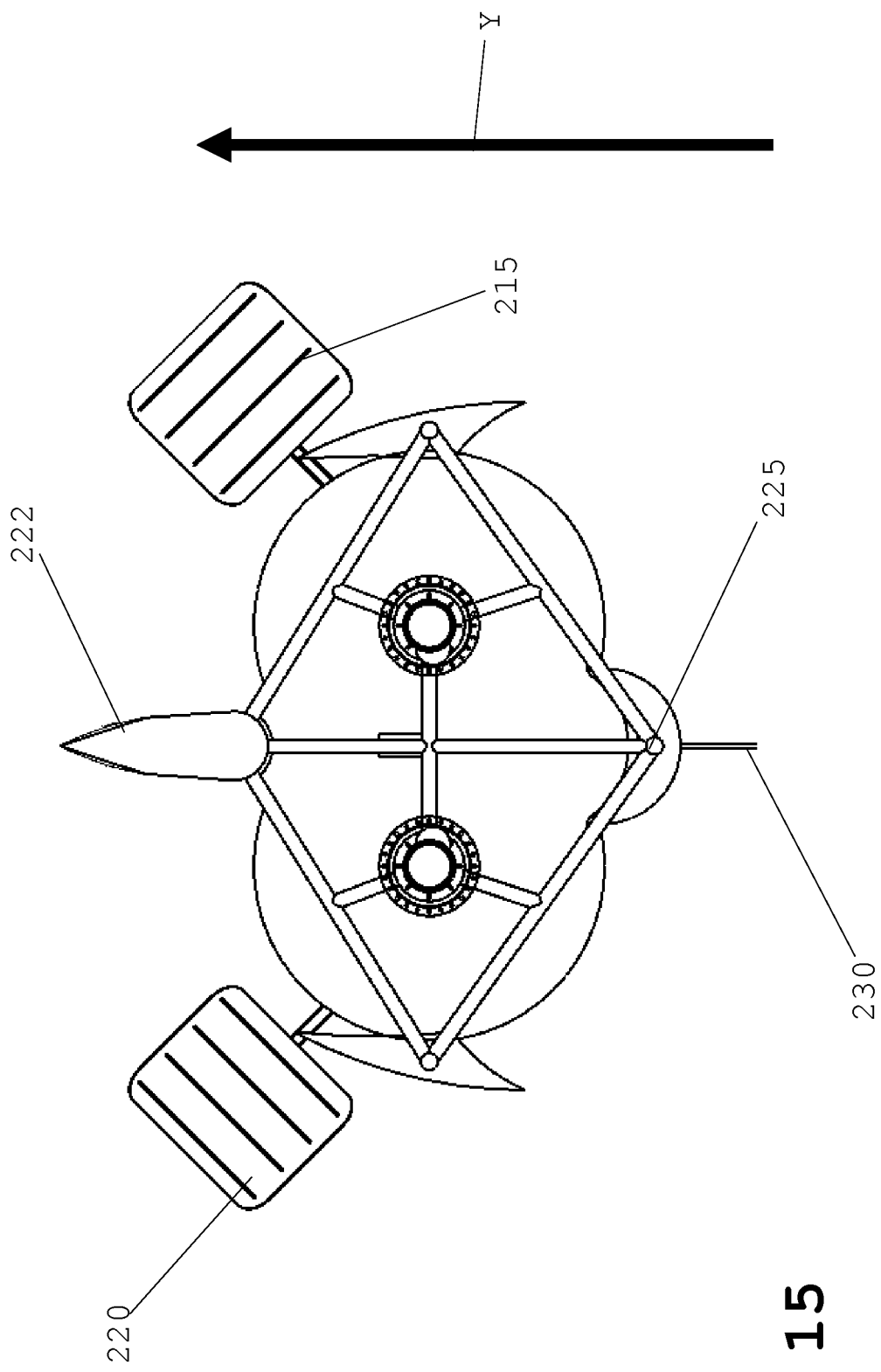
FIG. 15 is a top view of the energy extraction apparatus as described in the embodiment of FIG. 14.
Figure 16:
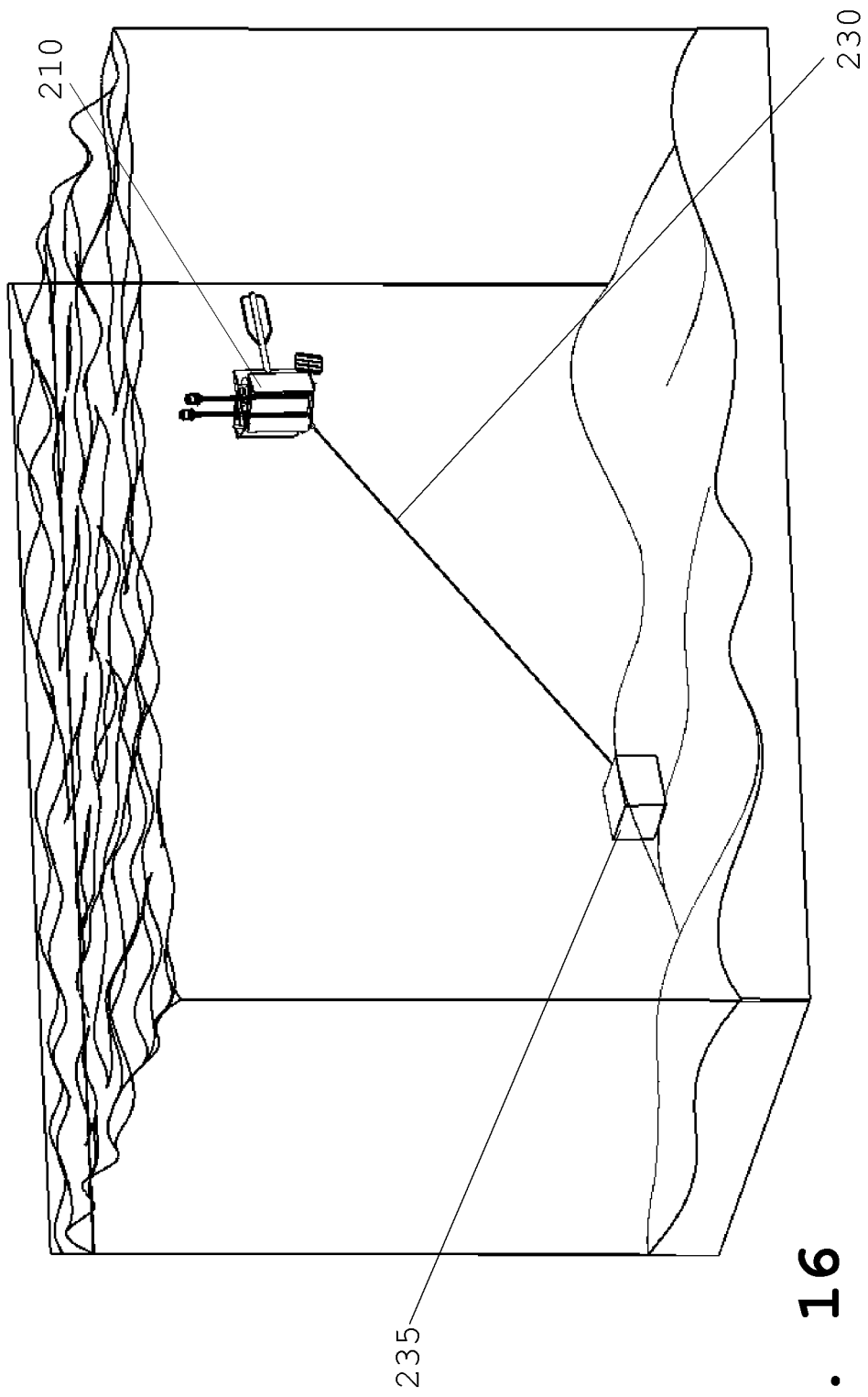
FIG. 16 is a perspective view of the energy extraction apparatus submerged in a body of water as described in the embodiment of FIG. 14.
Figure 17:
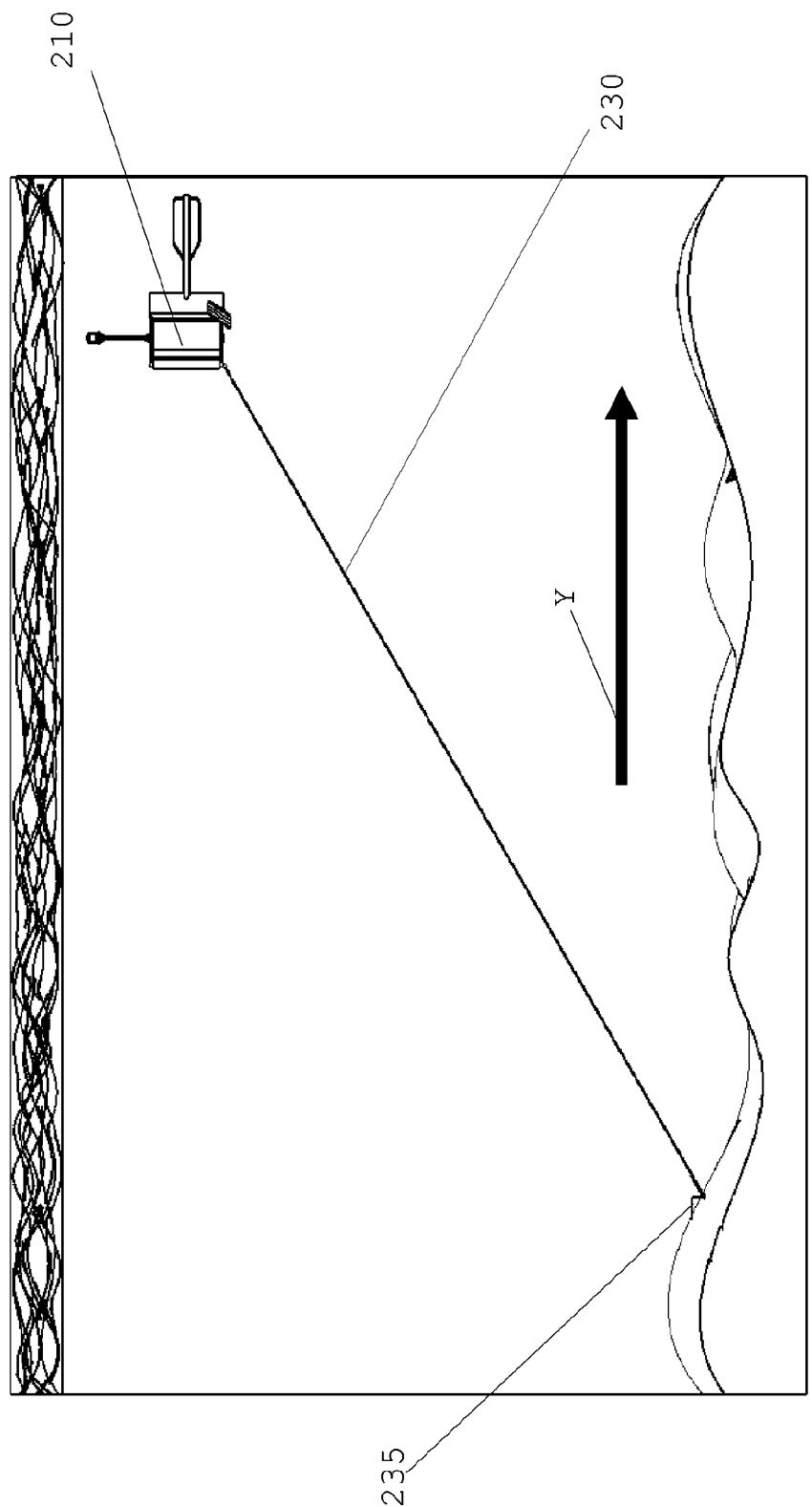
FIG. 17 is a side view of the energy extraction apparatus submerged in a body of water as described in the embodiment of FIG. 14.
Figure 18:
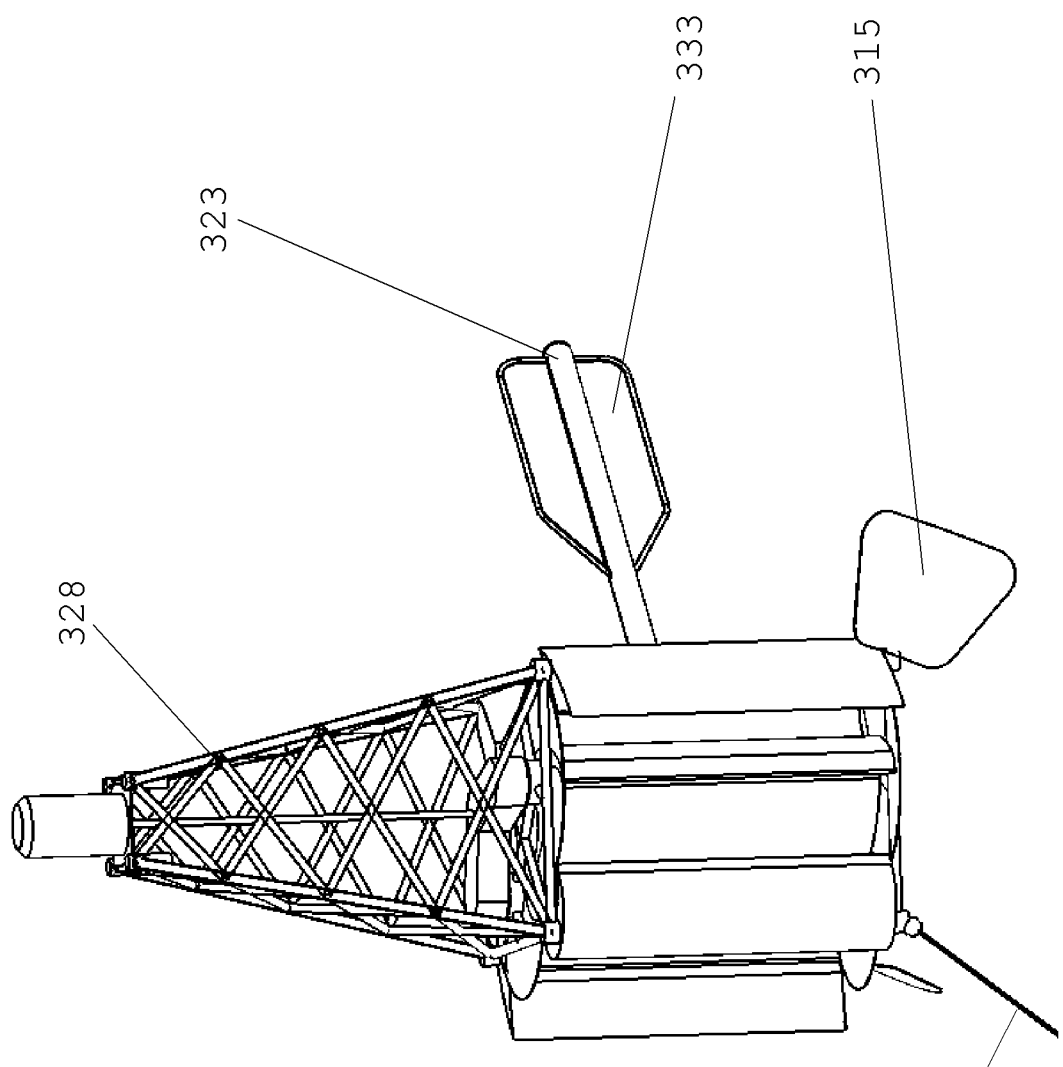
FIG. 18 is a front perspective view of an energy extraction apparatus having dihedral fins and a rear fin according to yet another embodiment of the present disclosure.
Figure 19:
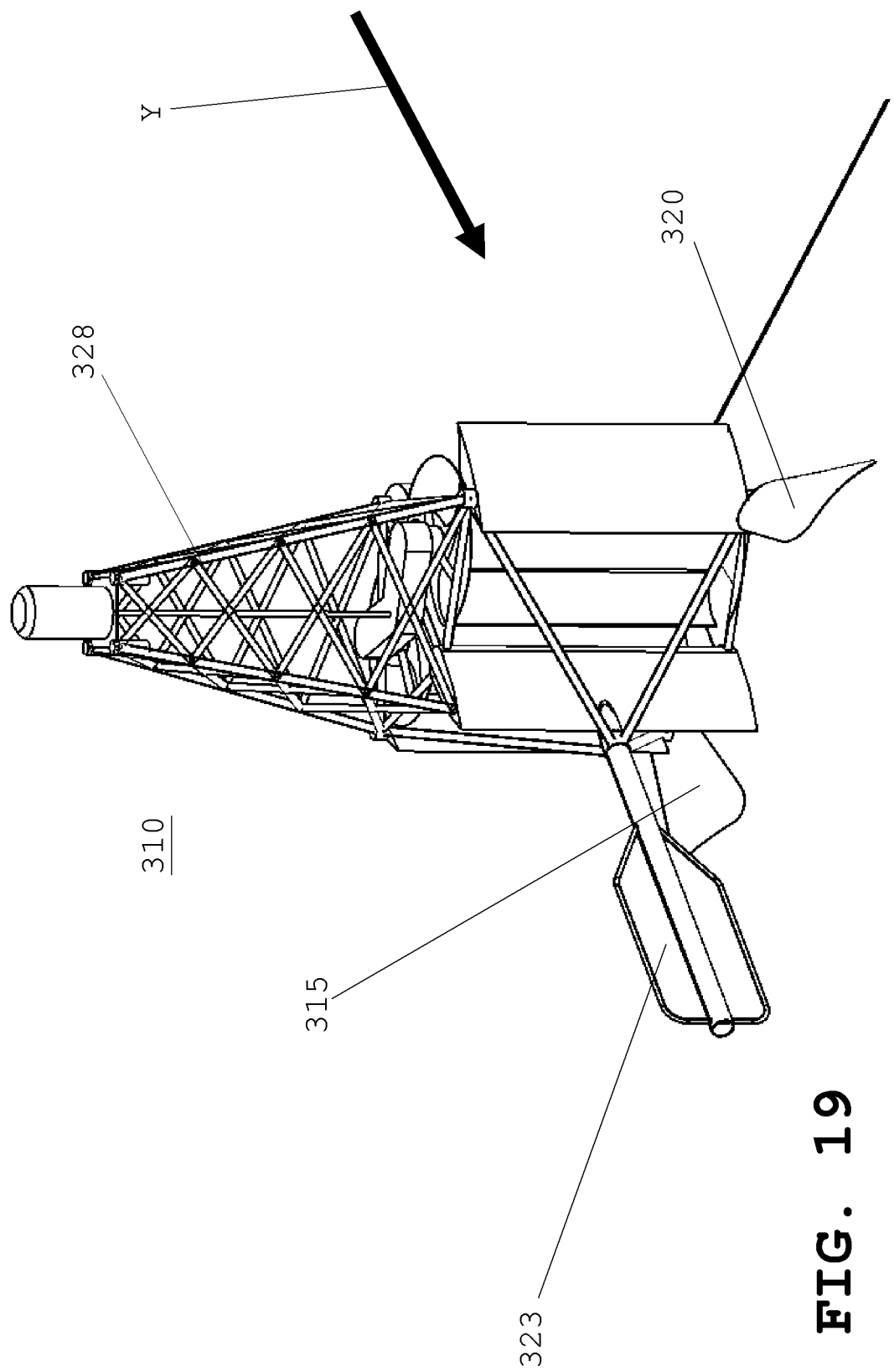
FIG. 19 is a rear perspective view of the energy extraction apparatus as described in the embodiment of FIG. 18.
Figure 20:
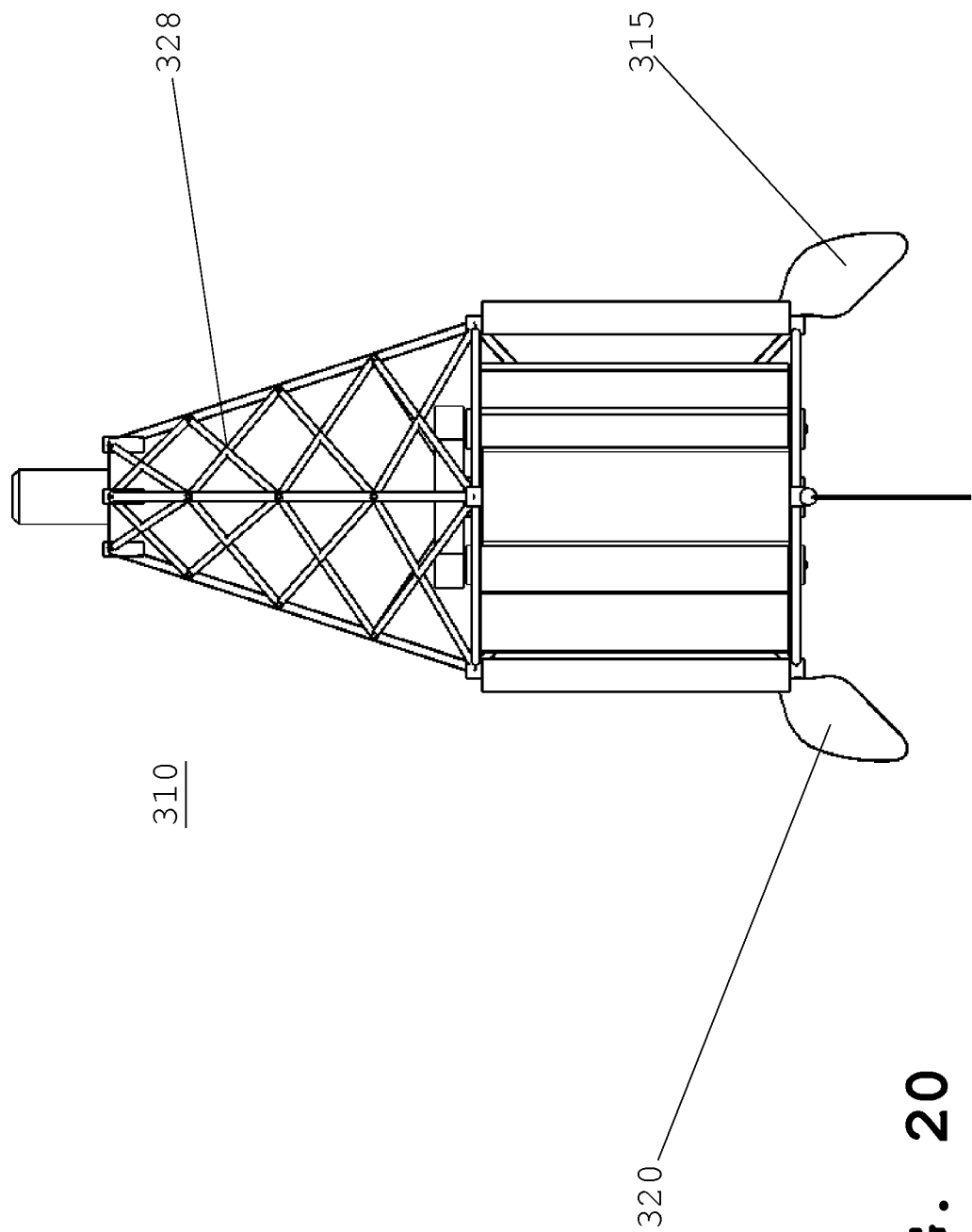
FIG. 20 is a rear view of the energy extraction apparatus as described in the embodiment of FIG. 18.
Figure 21:
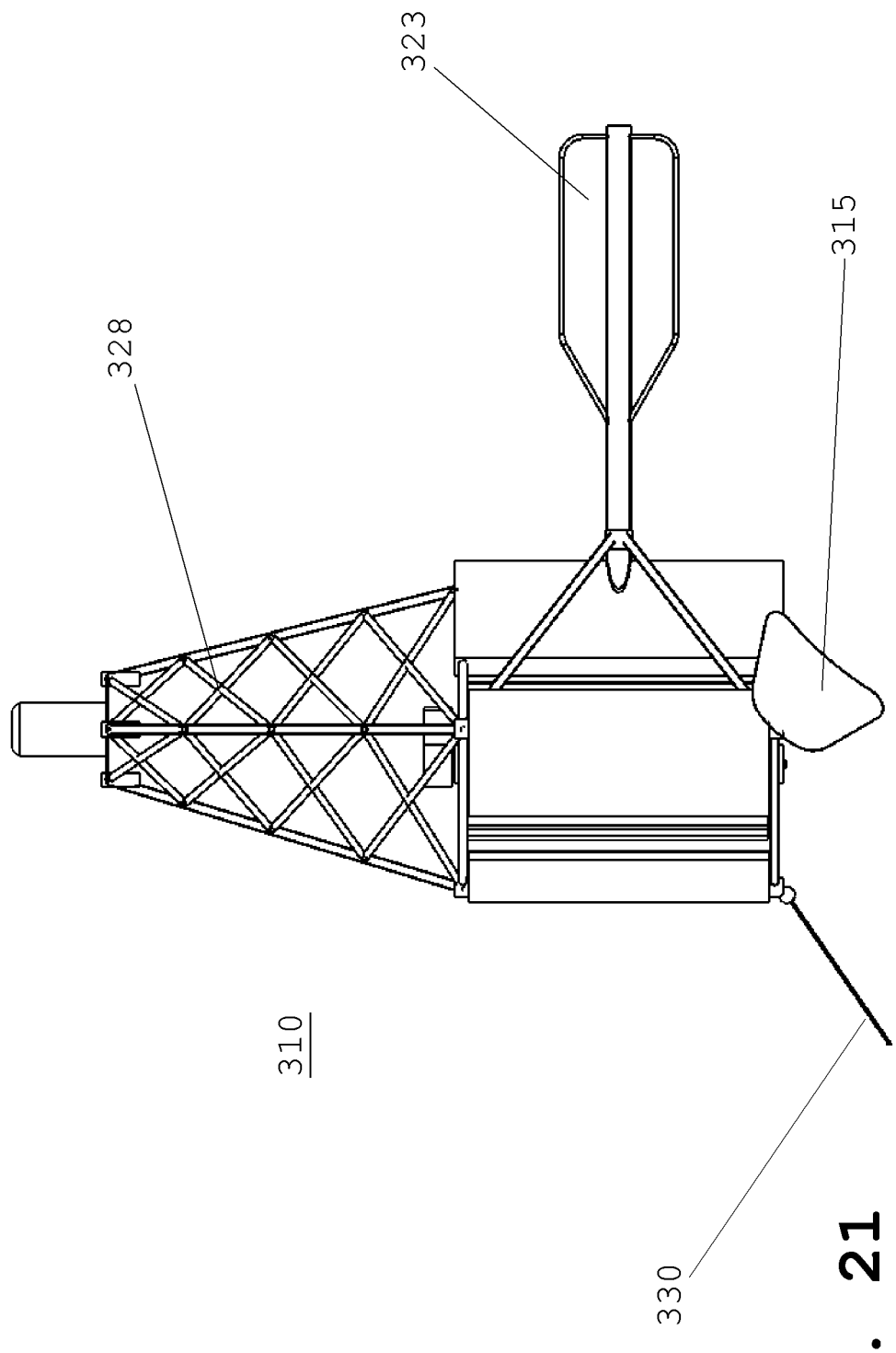
FIG. 21 is a side view of the energy extraction apparatus as described in the embodiment of FIG. 18.

The described embodiments of energy extraction device may be configured in practice in an advantageous way that allows for one or many of the mechanical components of the apparatus to be free from continuous contact with water. For example, apparatus 10 may be suspended from one or more buoyant structures 66, 68 such that the generators and gearboxes (not shown) lie above the surface level of the fluid, and the cores 15, 17 and corresponding blade members 20, 22 lie below the fluid surface. The gearboxes and generators may be housed inside the buoyant structures 66, 68, in which case the buoyant structures 66, 68 would also serve to shelter those components from the elements. The embodiment illustrated in FIGS. 1 and 2 shows the upper portion of the frame 12, including the means for synchronizing rotation of the cores 15, 17, and any necessary support bearing and coupling mechanisms, in close proximity to the cores 15, 17. However, the upper frame 12 may alternatively serve as the buoyant structure and may be configured such that the bearings, couplings, synchronizing means and other mechanical components are further from the fluid surface. FIG. 13 illustrates such an alternate embodiment of the energy extraction apparatus and will be further described below.

With specific reference to FIG. 3, the relative positioning and cross-sections of the cores 15, 17, the primary flow director 30, the secondary flow directors 40, 42, and the foil 50 are shown. The frame 12 and other components of the apparatus have been omitted for ease of illustration. The preferred cross-section of the primary flow director 30 is a crescent-moon shape, having a convex leading surface 70 and a concave trailing surface 75. The convex leading surface 70 of the primary flow director 30 serves to split the incoming flow of fluid denoted by arrow Y and direct it toward a desirable predetermined portion (described in greater detail above) of the blade members 20, 22. Applicant has determined that the presence of lips 80 at the lateral extremities of the primary flow director is desirable as the lips help to release flow adhesion at the extremities of the curved flow director edges directing flow into the blades 20, 22, optimizing power by directing flow slightly outwards directly into the blade face, thereby increasing the performance of the apparatus. The primary flow director 30 is positioned at the leading end 35 of the apparatus, ahead of the cores 15, 17 and blade members 20, 22. A person skilled in the art would appreciate that although the present disclosure describes a single primary flow director 30 that is generally crescent-moon shaped, the number, shape and size of the primary flow director 30 can be varied provided that it serves to direct incoming fluid flow toward the predetermined location along the blade members. A central dotted line X is shown to denote the position of the downstream-most point of the curved front faces 95, 97 relative to the central cores 15, 17. Positioning the secondary flow directors 40, 42 such that the front faces 95, 97 terminate at a point that is upstream relative to the rotational axes Z1, Z2 of the cores 15, 17 has been found to have a positive effect on the coefficient of power of the apparatus.

Figure 3A:
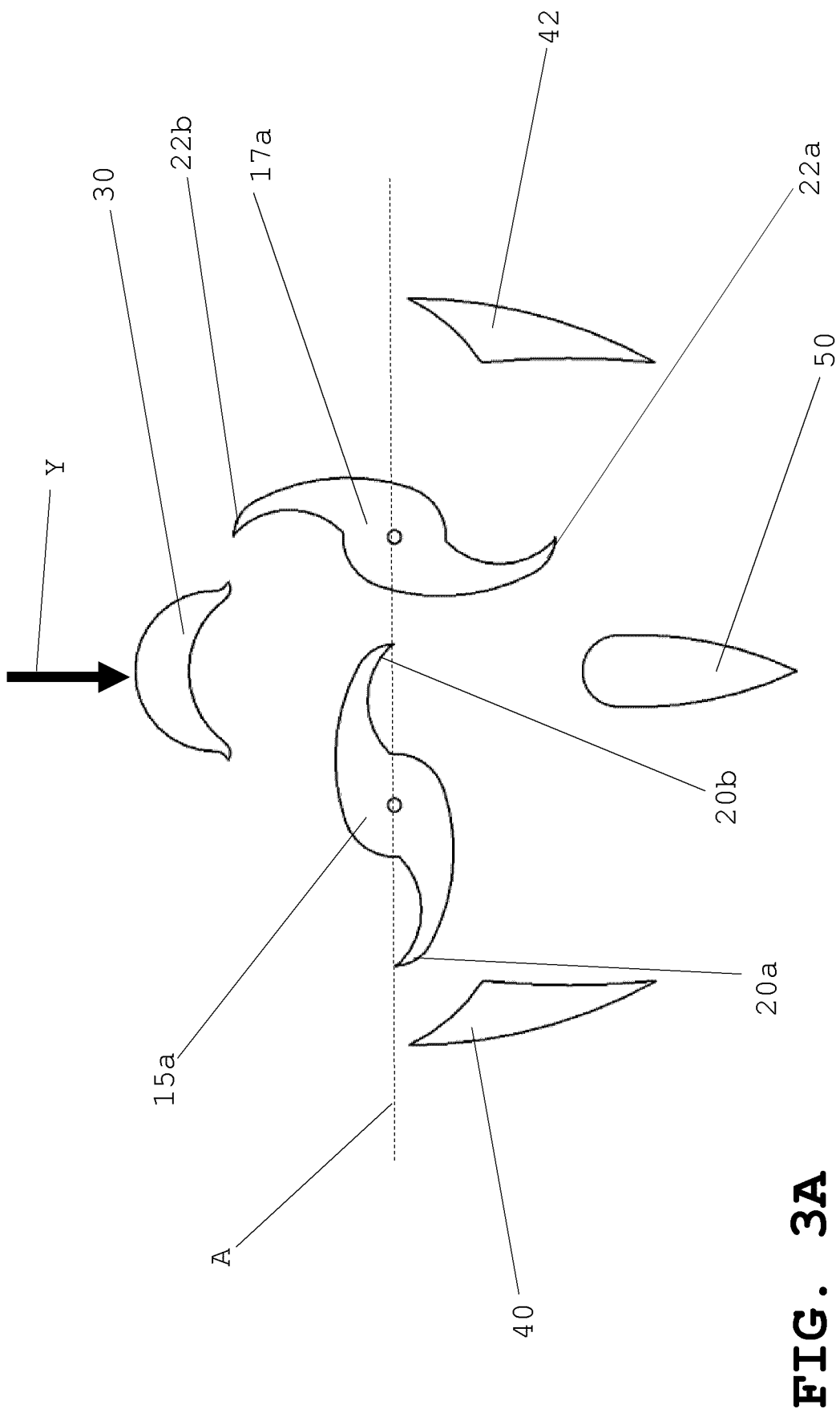
FIG. 3A is a top view of the primary flow director, foil, secondary flow directors and a variant of the central cores of the energy extraction apparatus shown in FIG. 1.

With reference to FIG. 3A, the components (the primary flow director 30, the secondary flow directors 40, 42, and the foil 50) that were described in FIG. 3 are shown with an alternate embodiment of the central bladed cores 15a, 17a. In this alternate embodiment, the central core 15a is comprised of exactly two blades 20a, 20b, 20c while central core 17a is also comprised of exactly two blades 22a, 22b, 22c. As shown, the central cores 15a, 17a are preferably synchronized such that the blades 20a, 20b, 20c are substantially in a horizontal plane, while the blades 22a, 22b, 22c are substantially in a vertical plane. In other words, the central cores 15a, 17a are offset by approximately 90-degrees. This relative 90-degree offset of one central core 15a with respect to the other central core 17a, ensures that the blades 20a, 20b, 20c and 22a, 22b, 22c do not hit one another during rotation. In this embodiment, the secondary flow directors 40, 42 are positioned behind the center of the central cores 15a, 17a, as depicted by the horizontal stippled line "A", and help to corral peripheral incoming fluid flow and direct it toward the blade members 20a, 20b, 20c, 22a, 22b, 22c to enhance the rotation-inducing forces experienced by the blade members 20a, 20b, 20c, 22a, 22b, 22c.

Figure 4:
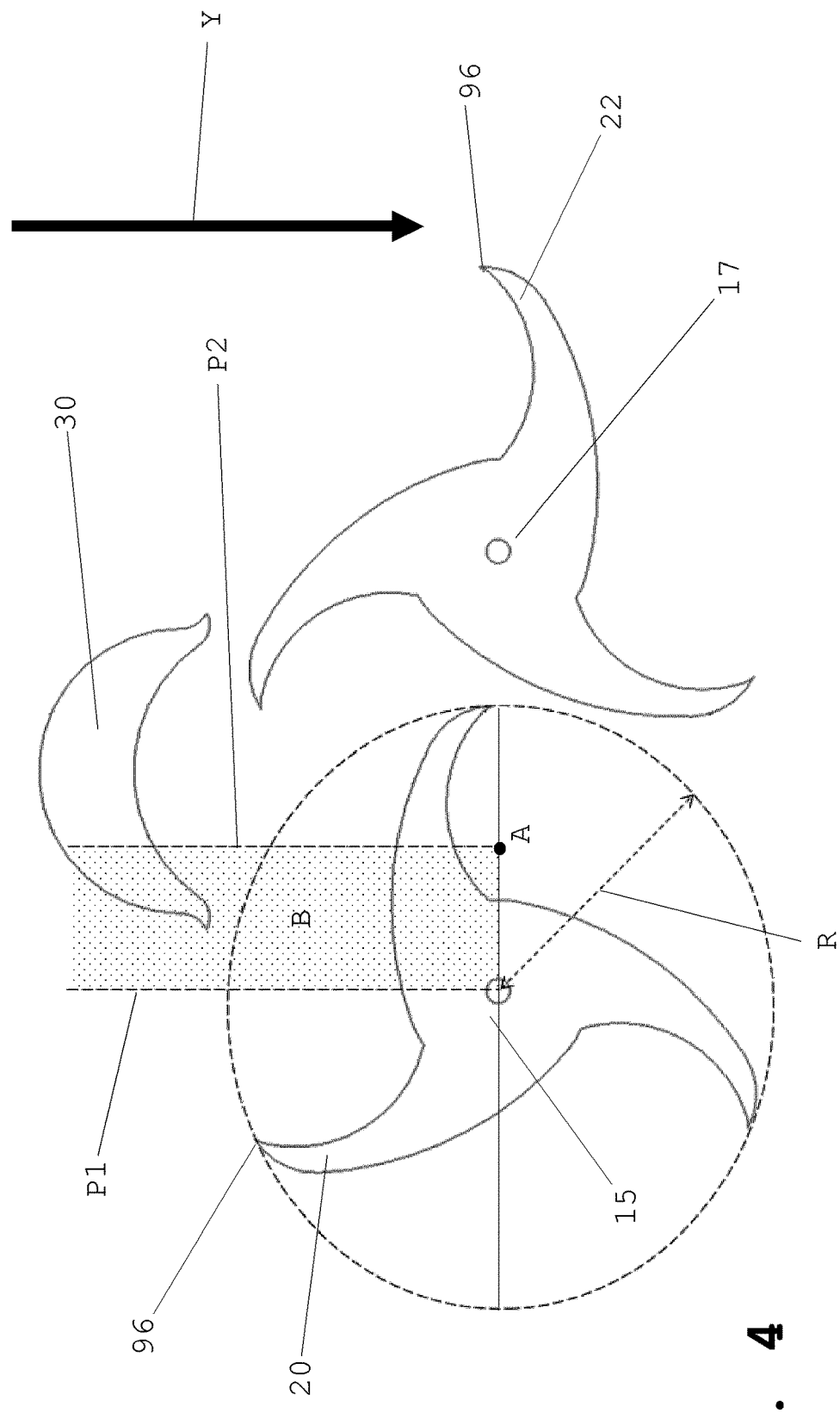
FIG. 4 is a top view of the central cores and blade members, in isolation, of the energy extraction apparatus of FIG. 1.

With reference to FIG. 4, the relative positioning of the cores 15, 17 in a preferred embodiment will now be described. The tips of the blade members of each rotating core 15, 17 create a circumferential path. As shown, the cores 15, 17 are positioned relative to one another such that their circumferential paths overlap. A preferred range of circle overlap between each of the bladed cores has been determined to be between 50% and 80% of radius R (i.e. a preferred range for the distance between the axes of rotation of the cores Z1, Z2 has been determined to be between 1.5*R and 1.2*R).

Figure 5:
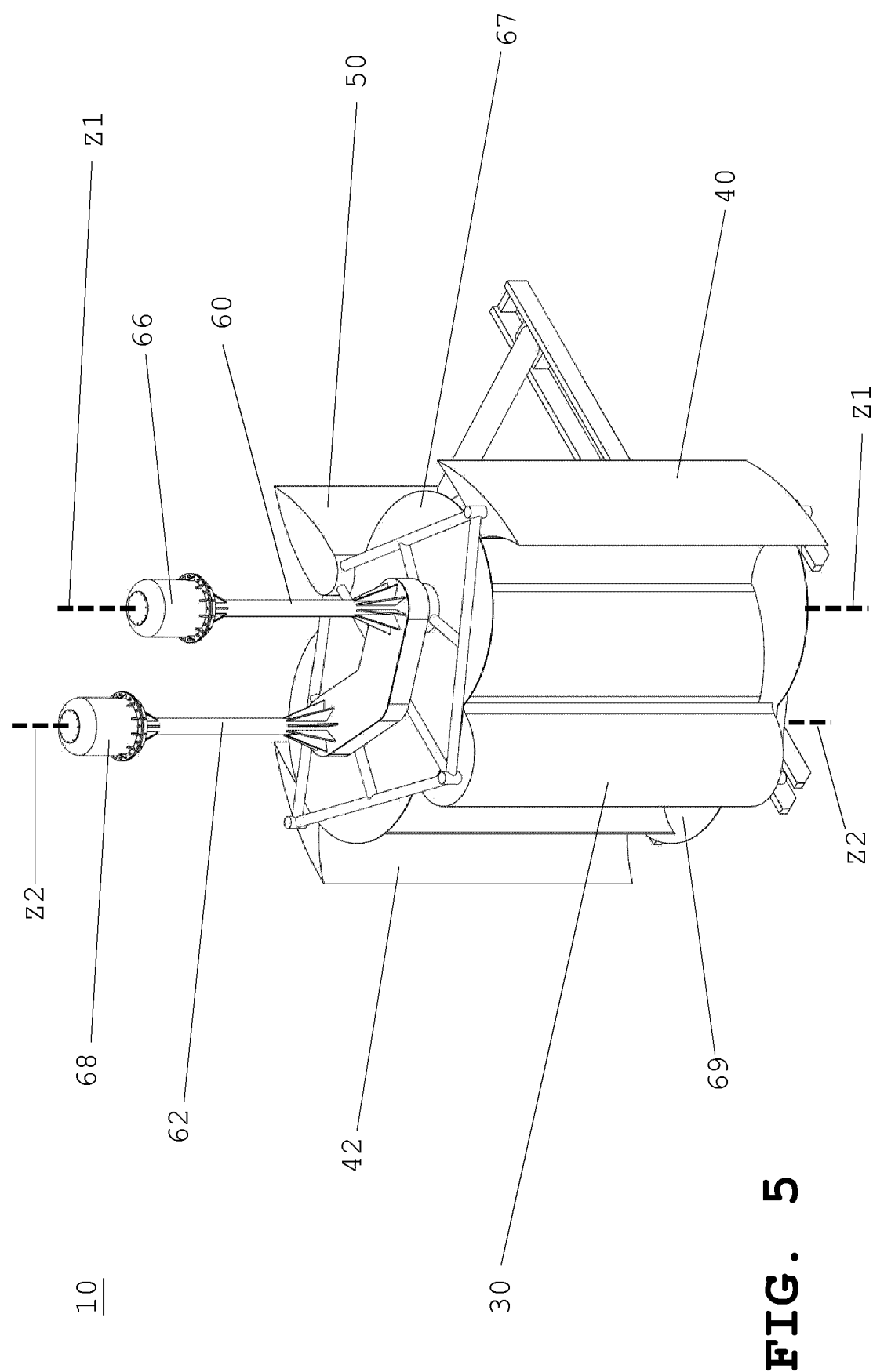
FIG. 5 is a perspective view of yet another embodiment of the present disclosure.

FIG. 5 shows an alternative embodiment of the present disclosure where enclosure plates 67, 69 are used to "bookend" the cores (not shown) and blade members (not shown). The use of these plates helps to maximize the energy extracted from incoming fluid that comes into contact with the blade members (not shown) by preventing the escape of the fluid from the upper and lower extremities of the apparatus 10. The plates 67, 69 may be shaped like two side-by-side circular discs merged together to form a peanut-like shape. The diameters of the disc portions of the plates may vary; however, using discs with a radius of at least 125% of radius R have shown favorable results with respect to the coefficient of power of the apparatus 10. Although the present embodiment discloses two cores, a worker skilled in the art would appreciate that a combination of multiple dual-core systems would similarly be within the scope of this disclosure.

Figure 6:
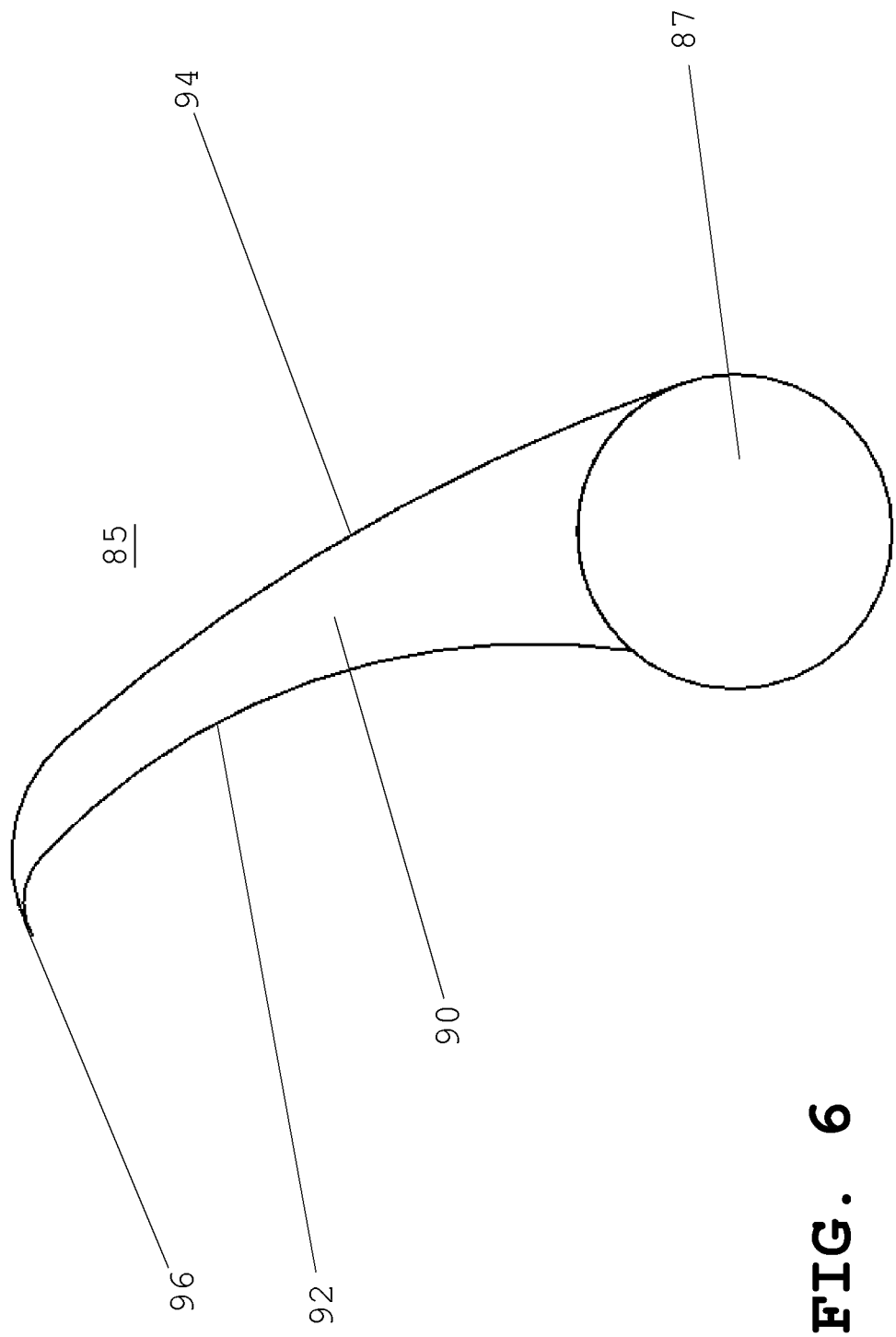
FIG. 6 shows a cross-section of a blade member according to another embodiment of this disclosure.

FIG. 6 shows a cross sectional blade geometry that has been found to exhibit desirable properties as a turbine blade. That is, a blade 85 with the illustrated cross section has been shown to induce lower amounts of ram drag and higher amounts of lift when placed in the path of a fluid flow. The blade 85 cross-section generally consists of a core portion 87 consisting of a point that defines the blade's center of rotation, and a blade portion 90. The blade portion 90 is generally defined by a curvilinear impact side 92 and a curvilinear trailing side 94, both originated from the core portion 87 and converging to a point, sometimes referred to as tip end 96, at some distance away from the center of rotation point. The angle between the two sides of the blade 90 at the tip end 96 is minimized, thereby minimizing the thickness of the blade portion 90 at its tip end 96 and producing a blade 85 having a sharp knife-edge extremity. The trailing side 94 of the blade portion 90 of the blade 85 is mostly flat, thereby increasing the lift experienced by the blade 85 during rotation. The blade portion 90 of this embodiment is further configured such that the tip end 96 of the blade portion 90 closely matches the circumferential path defined by the travel of the tip end 96 of the rotating blade 85. In other words, a first line defined by a point at the tip end 96 of the blade portion 90 and a point along the impact side 92 just prior to the tip end 96 is as closely colinear as possible with the tangent of the circumferential path at the tip end 96 of the blade portion 90. Similarly, a second line defined by a point at the tip end 96 of the blade portion 90 and a point along the trailing side 94 just before the tip 96 is as closely colinear as possible with the tangent of the circumferential path at the tip end 96 of the blade 85.

Figure 7:
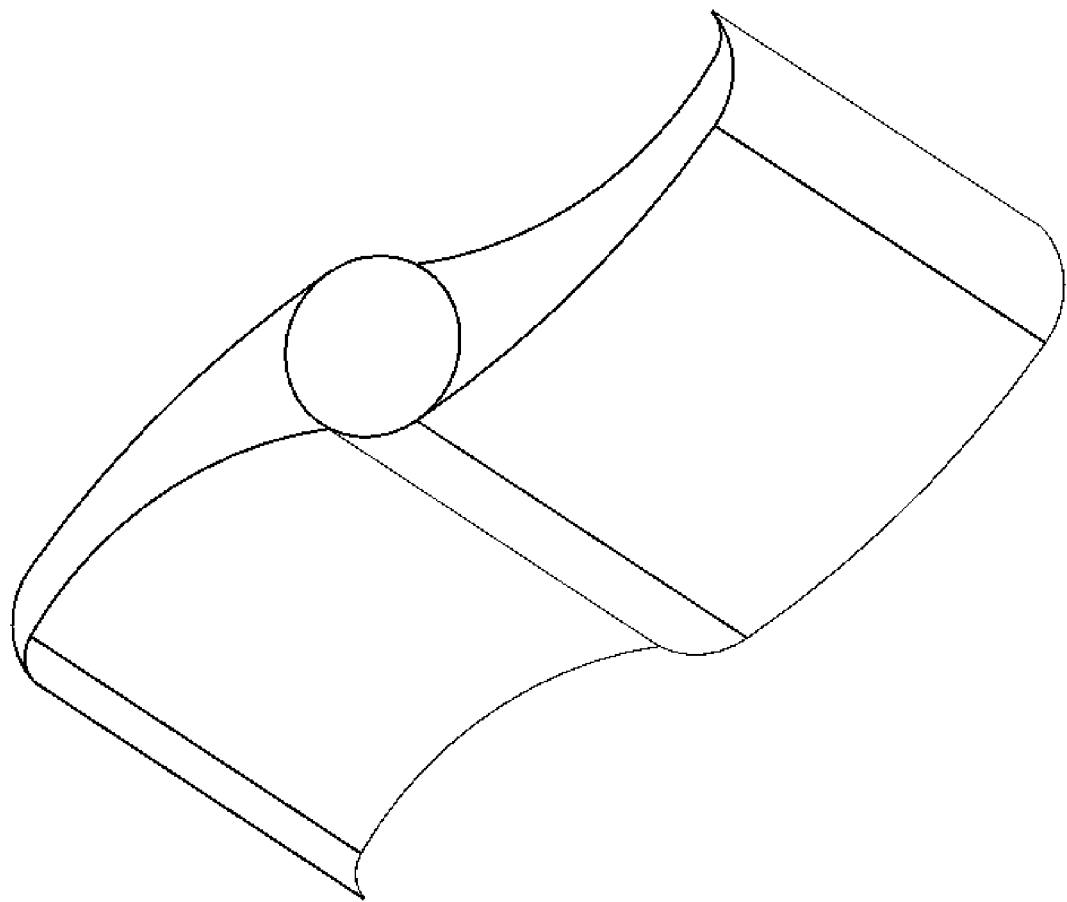
FIG. 7 shows a perspective view of a core having two blade members as described in the embodiment of FIG. 6.
Figure 8:
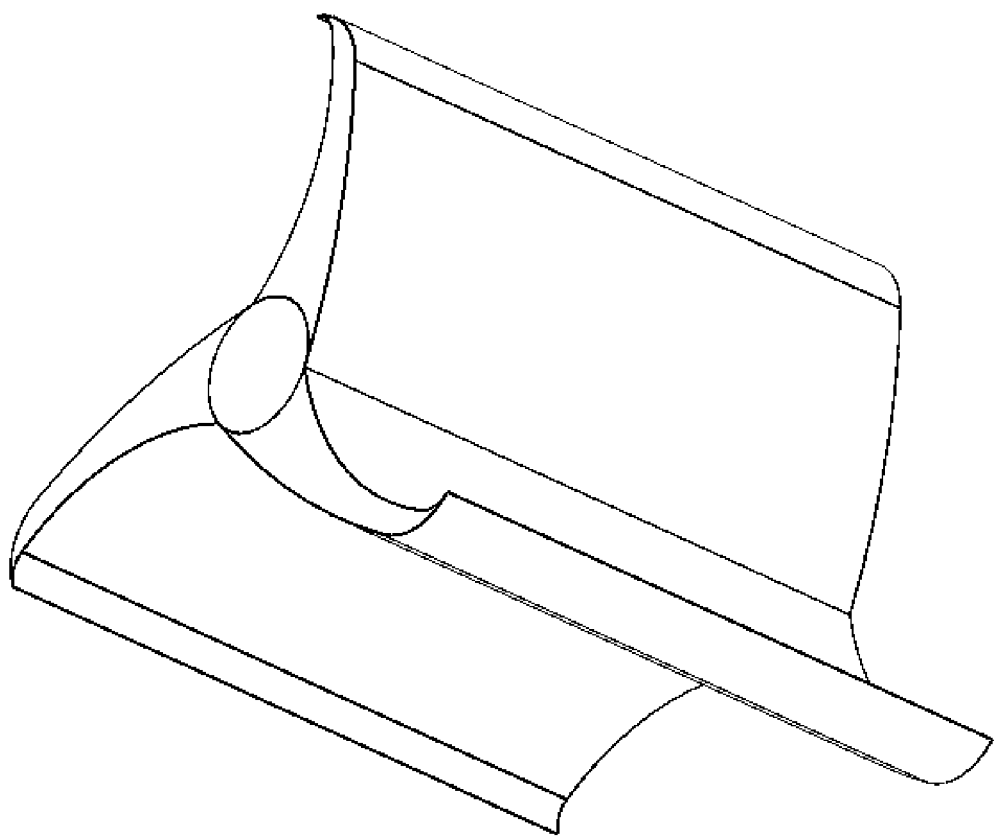
FIG. 8 shows a perspective view of a core having three blade members as described in the embodiment of FIG. 6.
Figure 9:
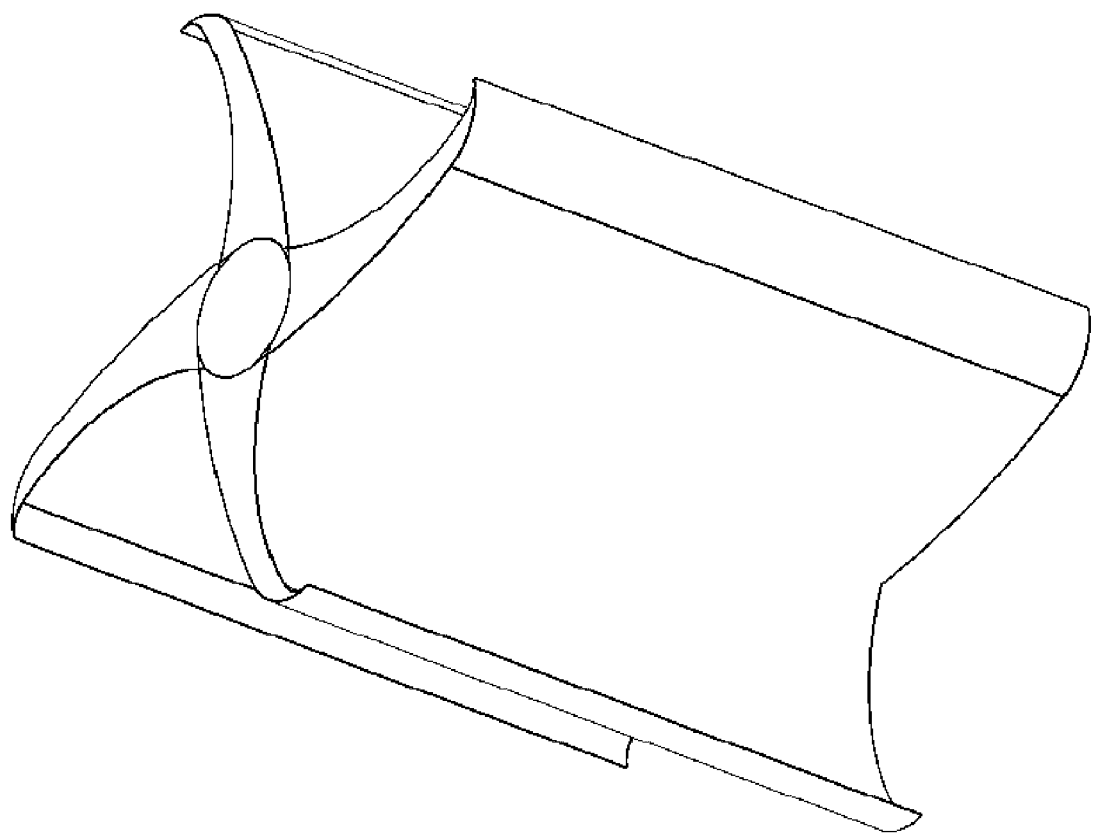
FIG. 9 shows a perspective view of a core having four blade members as described in the embodiment of FIG. 6.
Figure 10:
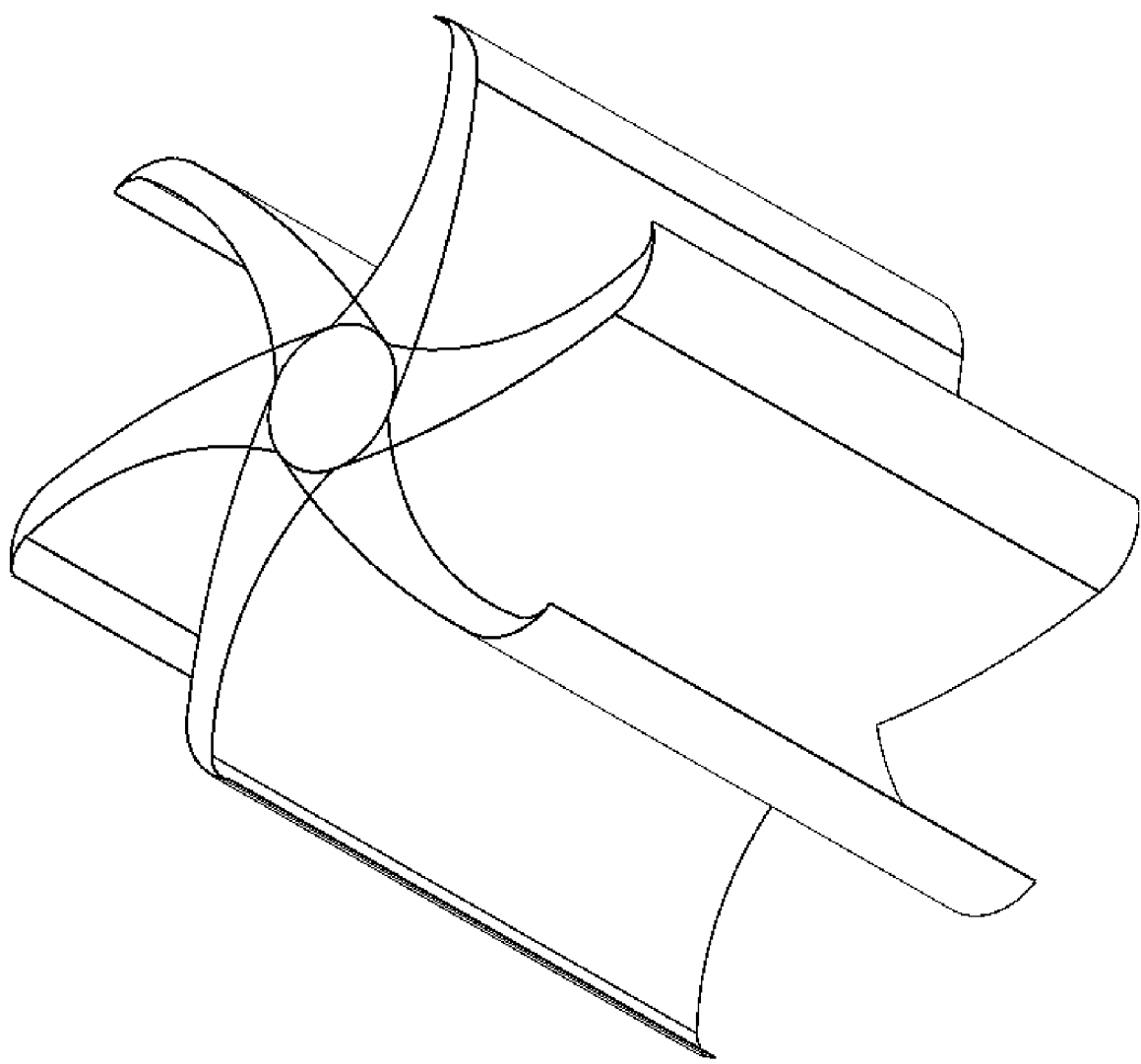
FIG. 10 shows a perspective view of a core having six blade members as described in the embodiment of FIG. 6.
Figure 11:
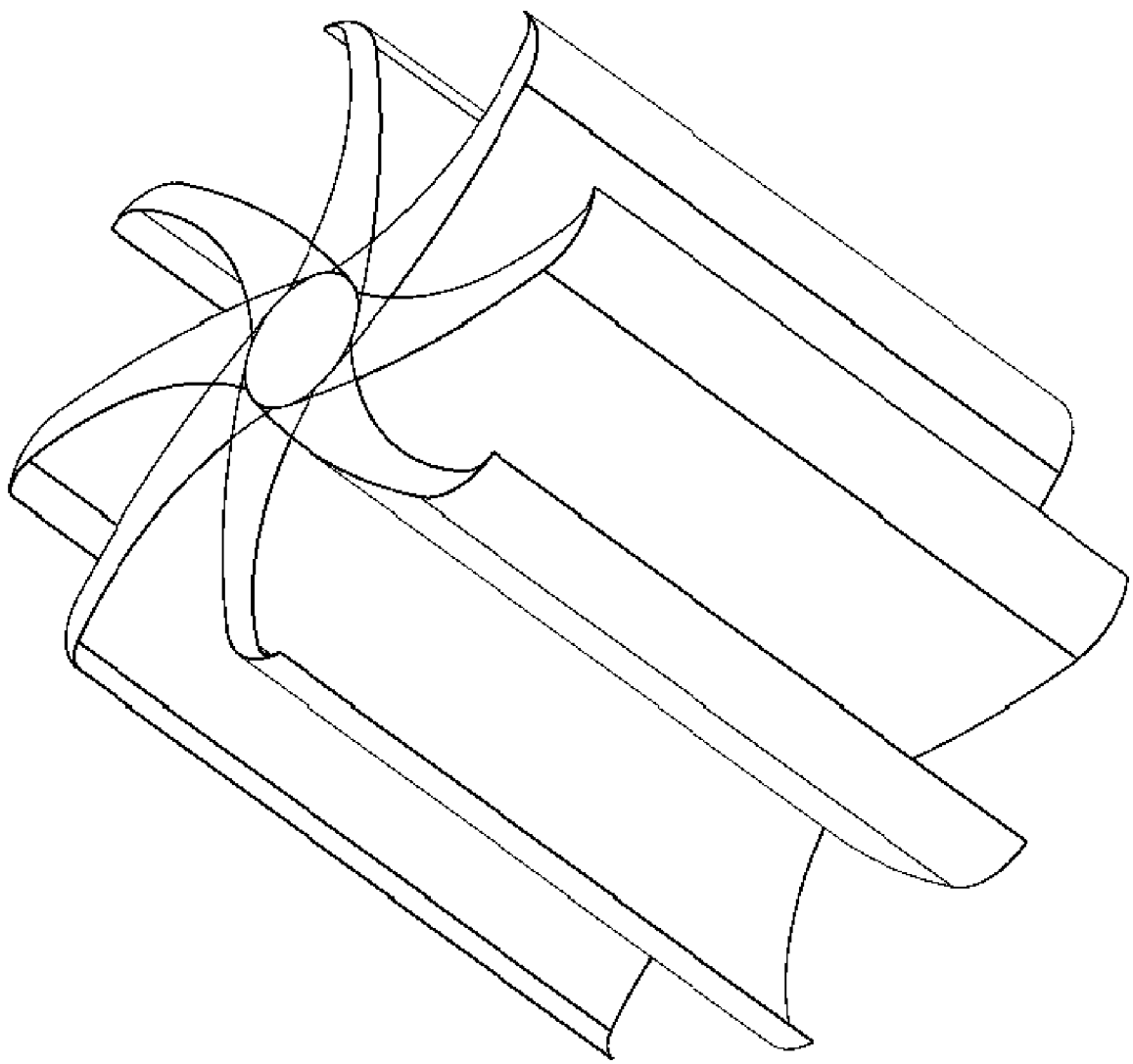
FIG. 11 shows a perspective view of a core having eight blade members as described in the embodiment of FIG. 6.
Figure 12:
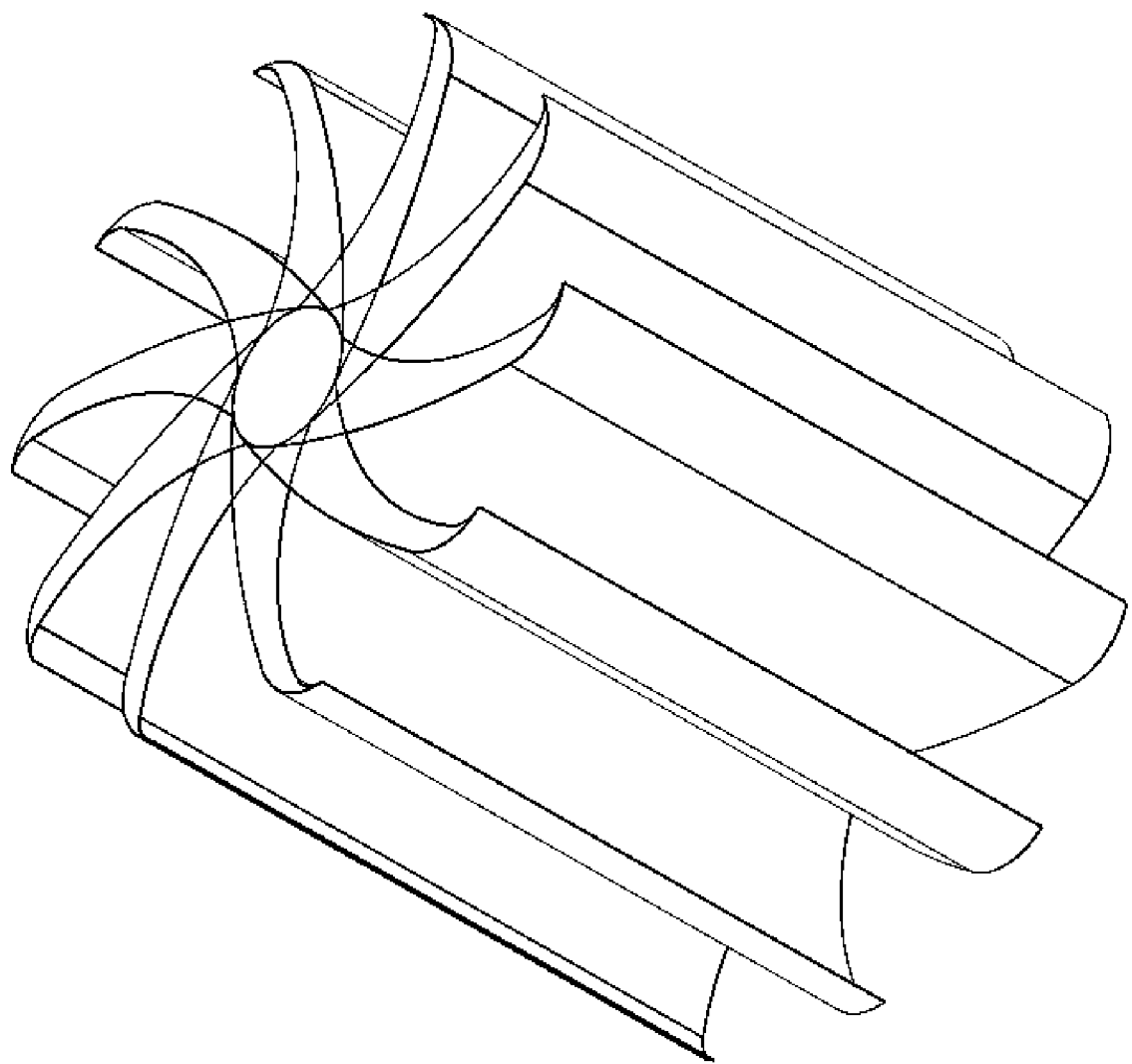
FIG. 12 shows a perspective view of a core having ten blade members as described in the embodiment of FIG. 6.

FIGS. 7, 8, 9, 10, 11 and 12 show cross-sectional views of alternate embodiments of cores having two, three, four, six, eight and ten of the blade portions illustrated in FIG. 7, respectively.

With reference to FIGS. 13, 14, 15, 16 and 17 and according to another embodiment of the present disclosure, an energy extraction apparatus 210 that includes dihedral stability plates 215, 220 is shown. The stability plates 215, 220 are positioned at a lower end of the apparatus 210 and secured via frame 212 and have an upward and outward angle with respect to the apparatus 210. As such, the stability plates 215, 220 help to maintain the apparatus in a desirable orientation with respect to the direction of water flow Y and optimize the performance of the apparatus 210. In a similar fashion to the embodiment shown in FIGS. 1 and 2, apparatus 210 is equipped with a foil 222 positioned at the rear end of the apparatus 210. Foil 222 also may serve to help maintain the optimal orientation of the apparatus with respect to the water flow. The stability plates 215, 220 and foil 222 may also serve to reduce unwanted agitation of the apparatus 210 during operation, brought on by minor variations in water flow direction. To secure the apparatus 210 generally within the flow of water, the apparatus 210 may for example be tethered to the ocean floor by means of a cable 230 attached at one end to a connection point 225 of the apparatus 210, and at the other end to a heavy object 235 (as specifically shown in FIG. 16) such as a concrete block resting on the ocean floor. In this embodiment, the entire apparatus 210 is configured to be buoyant and therefore biased toward the surface of the water. Buoyancy may, for example, be achieved by selecting a suitable material for the construction of the frame or through the incorporation of dedicated buoyancy inducing elements (e.g. 263, 264) that may be positioned at the upper end of the apparatus 210 and below the generators 266, 268.

As part of an alternative configuration, the apparatus may be configured such that the main body (i.e. the bladed cores) is non-buoyant and the apparatus is suspended from above from a fixed structure such as, for example, a rig similar to that typically used in offshore drilling. An energy extraction apparatus described herein may be suspended from such a structure using one or more cables. In this type of alternative configuration, buoyancy-inducing elements 263, 264 may still be used and may be configured such that they induce buoyancy to generators located at an upper end of the apparatus but not to the remainder of the apparatus. Such a buoyancy configuration, along with a mechanism to allow vertical movement of the generators independent of the remainder of the apparatus, would help to prevent submersion of the generators that may be caused by tidal activity or large rolling swells in the body of water. The vertical freedom of the generators may be achieved, for example, by affording the portion of the frame (260, 262 in FIG. 13) extending from the top of the bladed cores to the generators a suitable amount of telescoping ability. The telescoping ability may be provided, for example, through the use of a square shaft with mating square hollow frame configuration for the portions of the frame 260, 262 extending between the bladed cores of the apparatus and the generators. Alternatively, a commonly available double telescoping PTO drive shaft may be used to afford the generators a desired amount of vertical freedom. With such a configuration, a rising tide would not submerge the generators because the buoyancy-inducing elements would cause the generators to rise with the tide.

Figure 22:
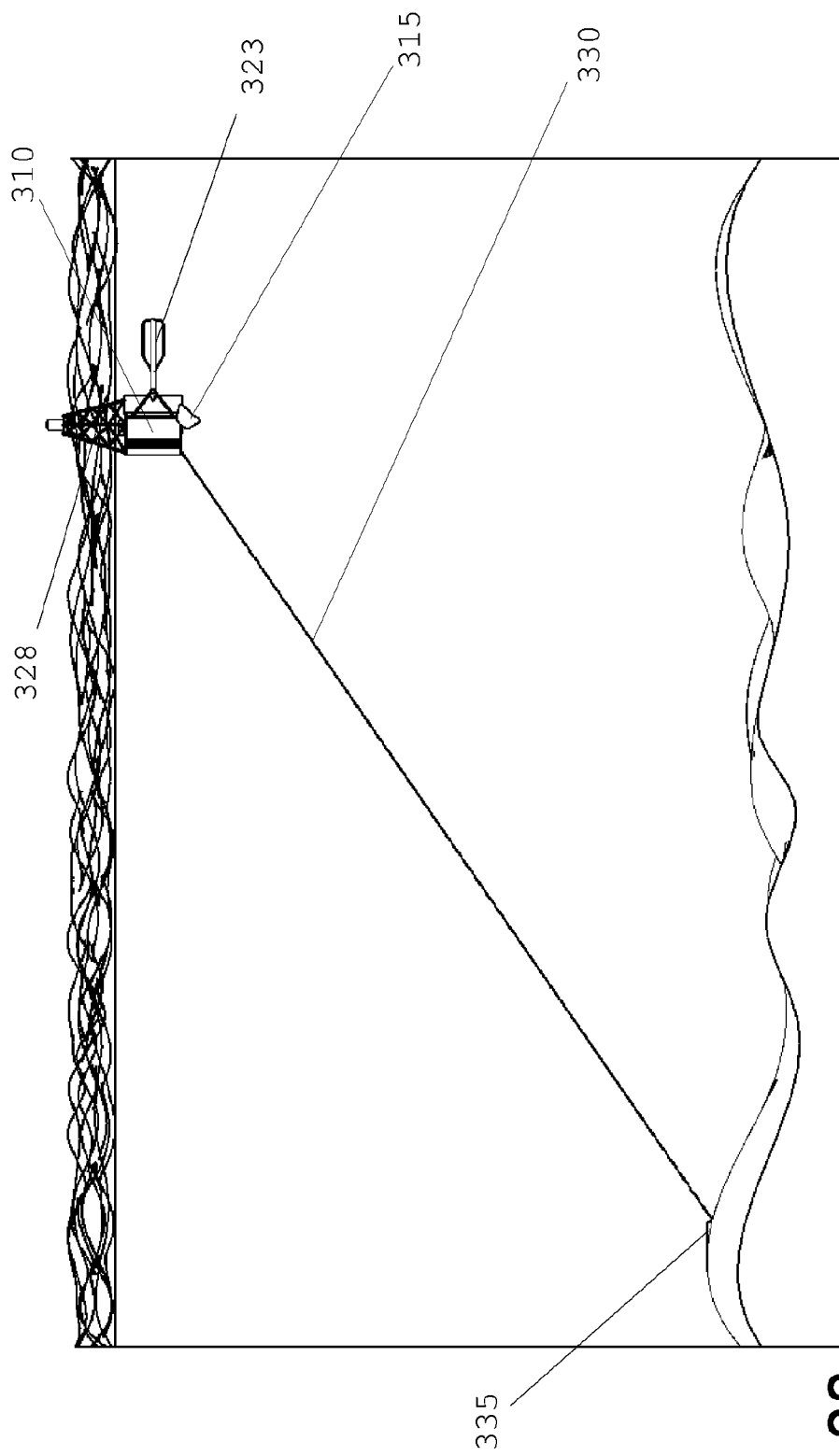
FIG. 22 is a rear perspective view of the energy extraction apparatus partially submerged in a body of water as described in the embodiment of FIG. 18.

With reference to FIGS. 18, 19, 20, 21 and 22 and according to yet another embodiment of the present disclosure, an energy extraction apparatus 310 with dihedral fins 315, 320 and rear stabilizing fin 323 is shown. The dihedral fins 315, 320 are similarly configured to dihedral fins 215, 220 that were earlier described with reference to FIGS. 13, 14, 15, 16 and 17. Rear fin 323 is positioned at the rear end of the apparatus 310, extends rearwardly therefrom, and has a substantially planar paddle portion 333. Conceptually similar to a weather vane, the stabilizing fin 323 may be used to help mitigate unwanted yaw of the apparatus 310 when the apparatus 310 is positioned in a body of water, and to further help maintain a desirable orientation of the apparatus with respect to the water flow direction. Apparatus 310 is also comprised of a frustum-shaped tower frame 328 projecting upwardly from an upper portion of the central cores. Tower frame 328 may be configured to provide buoyancy to the apparatus to bias the apparatus 310 and toward the surface of the water. Apparatus 310 may be tethered to an anchoring block 335 by means of a cable 330. FIG. 22 shows an example of the apparatus 310 biased toward the surface in a body of water and secured by tether to the ground. The length of the cable 330 may be selected such that the generator or generators at the top of the apparatus are maintained generally above the water's surface.

Figure 23:
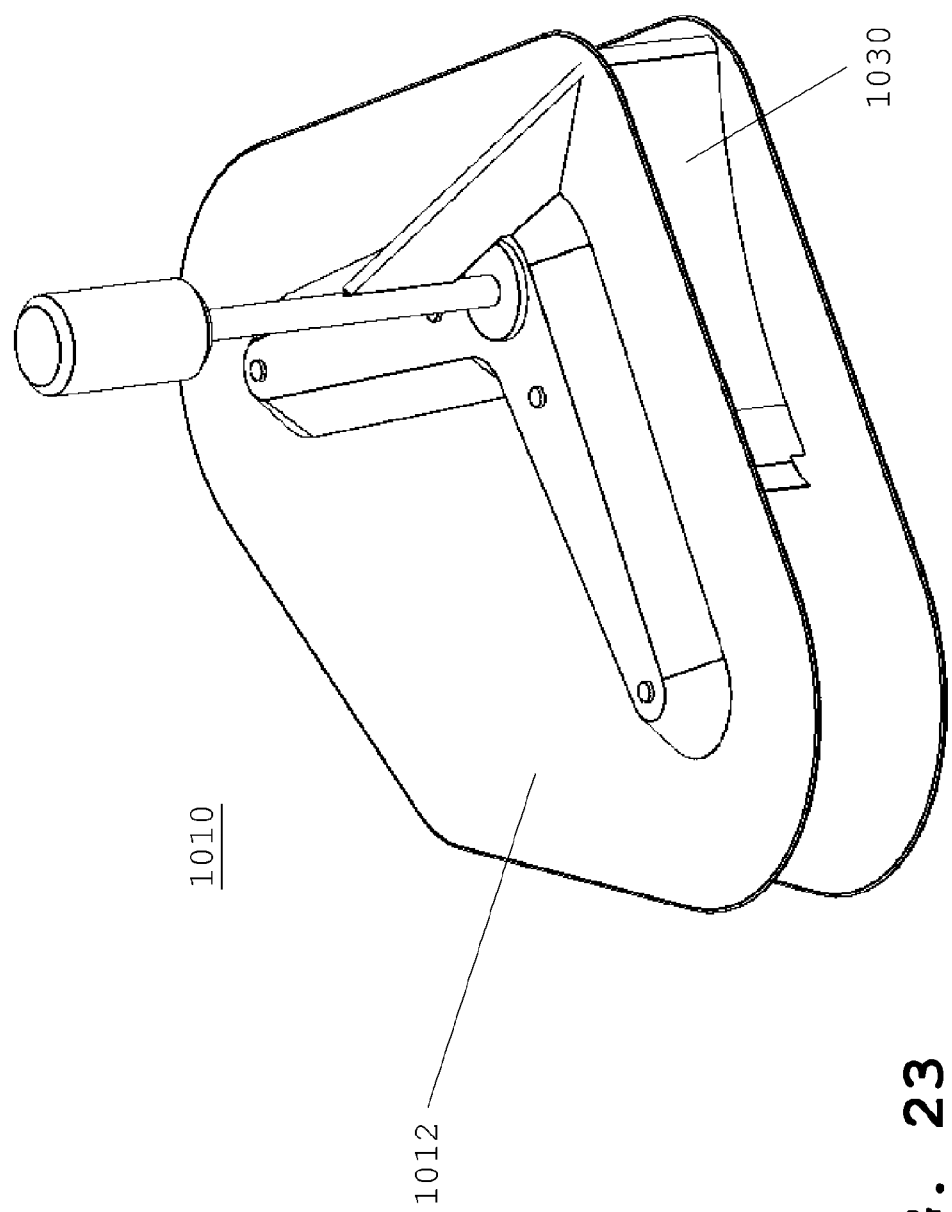
FIG. 23 is a front perspective view of an energy extraction apparatus for shallow water, according to another embodiment of the present disclosure.
Figure 24:
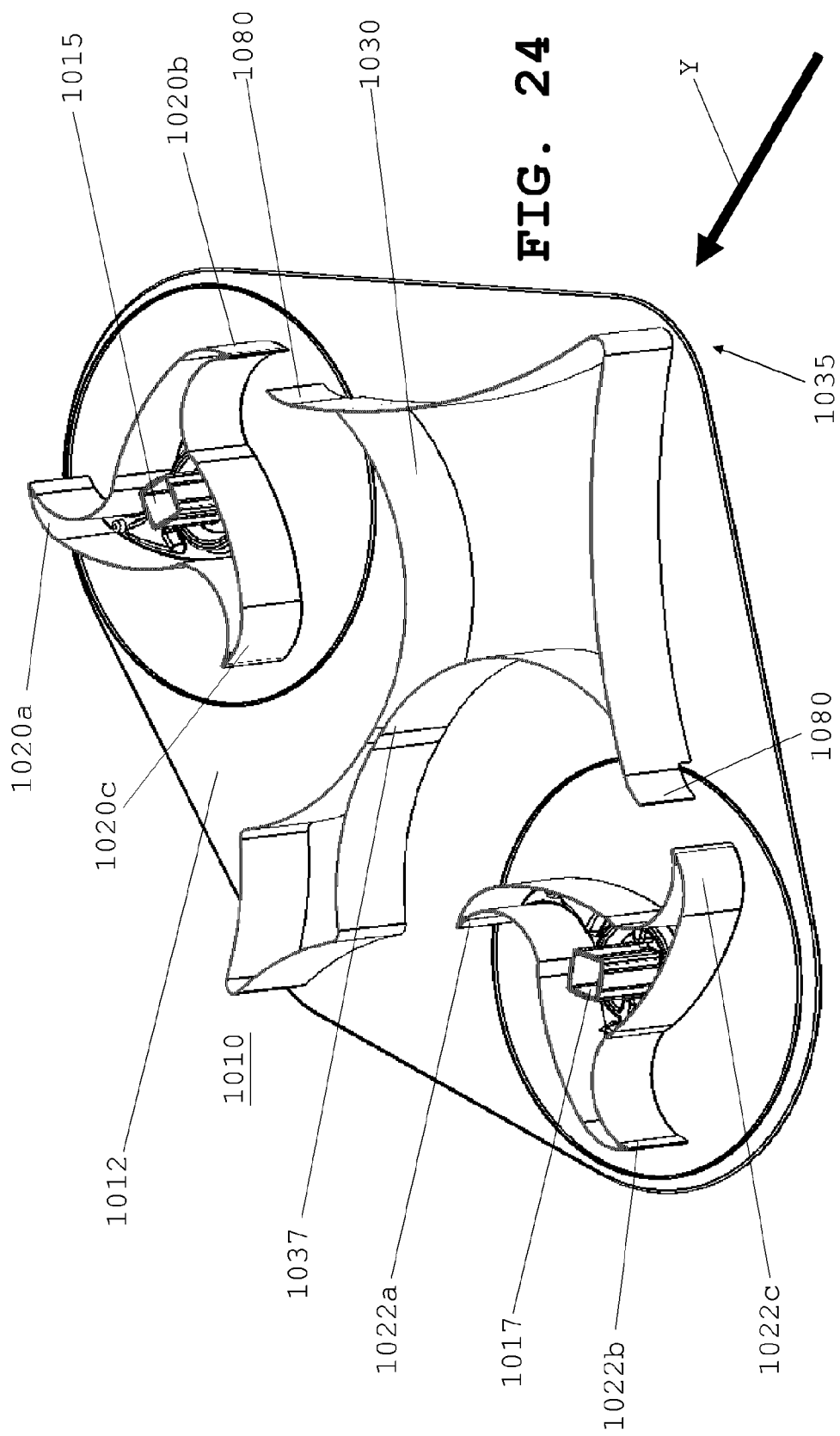
FIG. 24 is a front perspective cutaway view of the energy extraction apparatus described in the embodiment of FIG. 23.

With reference to FIGS. 23 and 24, another embodiment of the present disclosure will now be described. Apparatus 1010 is generally comprised of a frame 1012, the frame 1012 preferably secured to at least two central cores 1015, 1017 and a primary flow director 1030. The two central cores 1015, 1017 are each further comprised of at least one blade member 1020a, 1022a that extends radially from the center of the central cores 1015, 1017. In this embodiment, the apparatus 1010 is shown having three blades (e.g. 1020a, 1020b, 1020c, 1022a, 1022b, 1022c) per core; however, a person skilled in the art would appreciate that more or less than three blades may be used. As water flows in direction Y toward and through the apparatus 1010, forces generated by the water on the impact (or ram) surface of blade members 1020a, 1020b, 1020c, 1022a, 1022b, 1022c cause a rotation of the central cores 1015, 1017. Additional forces on the blades 1020a, 1020b, 1020c, 1022a, 1022b, 1022c, which will be described further below, also contribute to inducing rotation of the cores. In the embodiment shown in FIGS. 23 and 24, water flowing in direction Y would cause core 1015 to rotate counter-clockwise and core 1017 to rotate clockwise. The resulting rotational energy of the central cores 1015, 1017 may then be converted to electricity using a combination of mechanical components (e.g. gearboxes and generators), as necessary. Such mechanical components may include belt or chain drives, power take-ups, or other suitable components generally known in the art. For simplicity, gearboxes and generators have not been included in the figures.

The apparatus 1010 comprises numerous elements that help to increase the overall coefficient of power of the system. For example, a primary flow director 1030 may be positioned at a leading end 1035 of the apparatus 1010. The primary flow director 1030 may be secured to the frame 1012 to ensure its proper positioning relative to the bladed cores 1015, 1017. The primary flow director 1030 serves to direct incoming water flow in such a way to maximize the resulting rotational energy of the central cores 1015, 1017. The primary flow director 1030 is further comprised of two lips 1080 positioned at the lateral extremities of the primary flow director 1030. These lips 1080 help to release flow adhesion at the extremities of the curved flow director edges directing flow into the blades 1020a, 1020b, 1020c, 1022a, 1022b, 1022c, contributing to an increased coefficient of power for the apparatus. Preferably, incoming water flow is directed to a stagnation point of the central cores 1015, 1017, as similarly described previously with respect to the embodiment shown in FIGS. 1 to 4.

Figure 25:
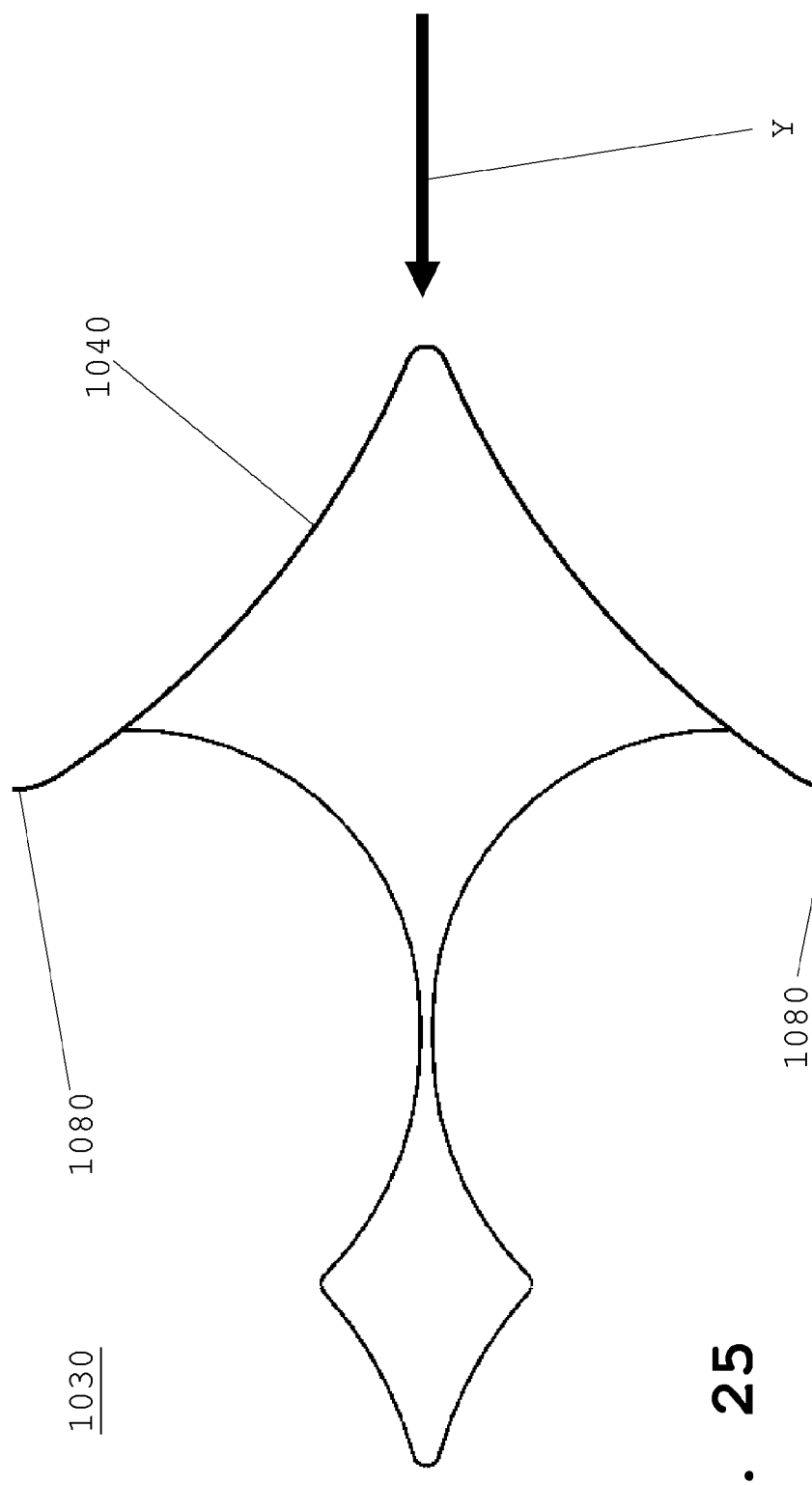
FIG. 25 is a top view of the front flow director of the energy extraction apparatus described in the embodiment of FIG. 23.
Figure 39A:
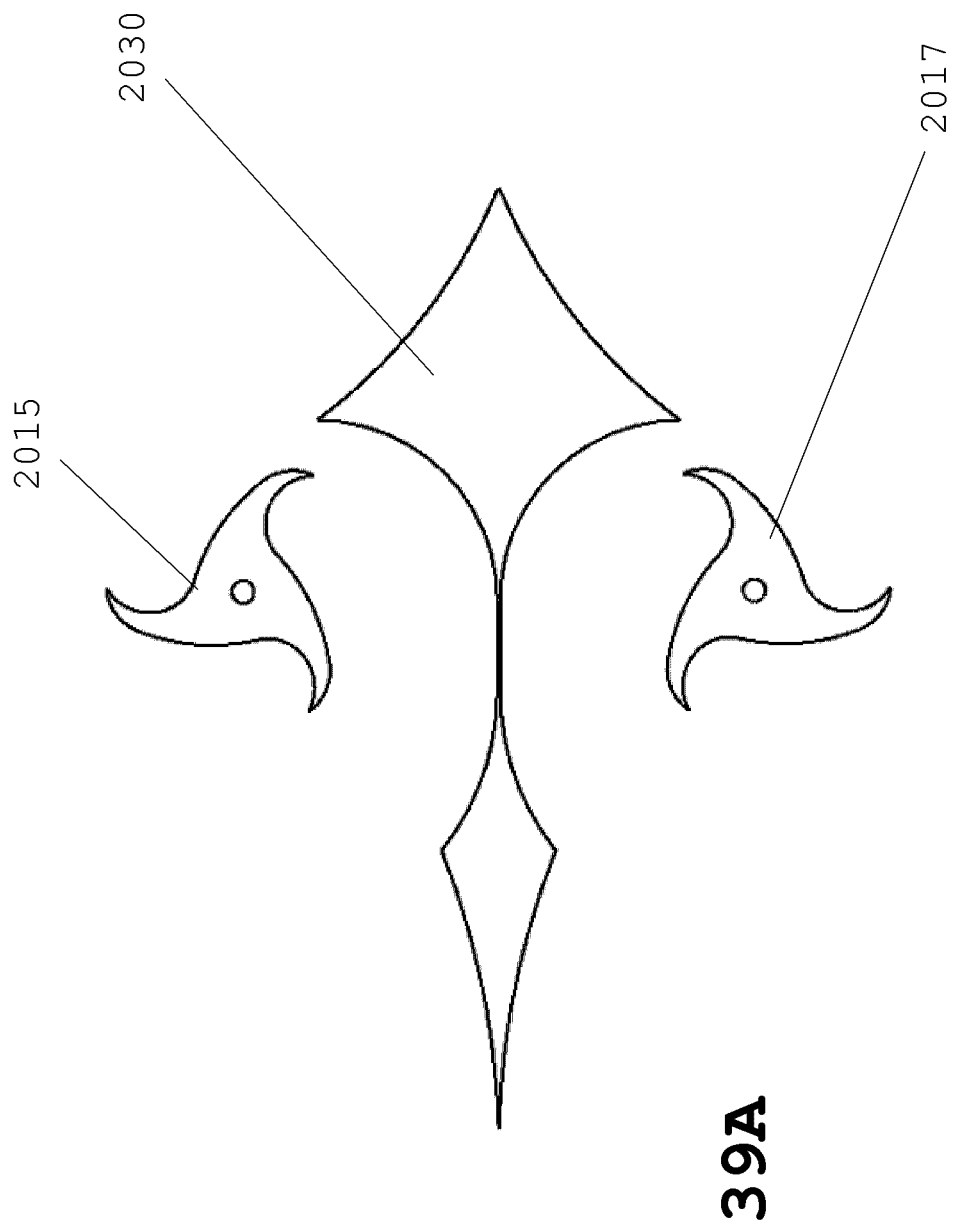
FIG. 39A is a top view of a configuration of the front flow director and central cores, according to another embodiment of the present disclosure.
Figure 39B:
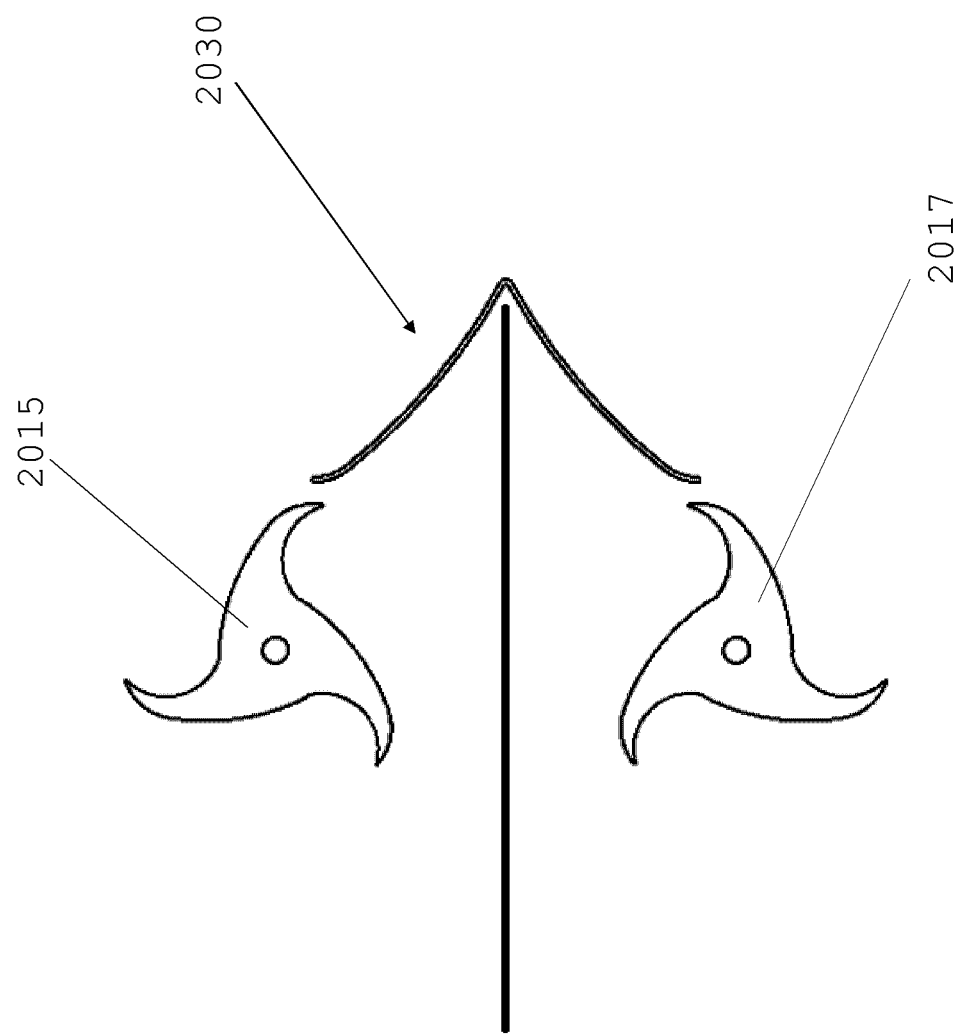
FIG. 39B is a top view of a configuration of the front flow director and central cores, according to another embodiment of the present disclosure.
Figure 39C:
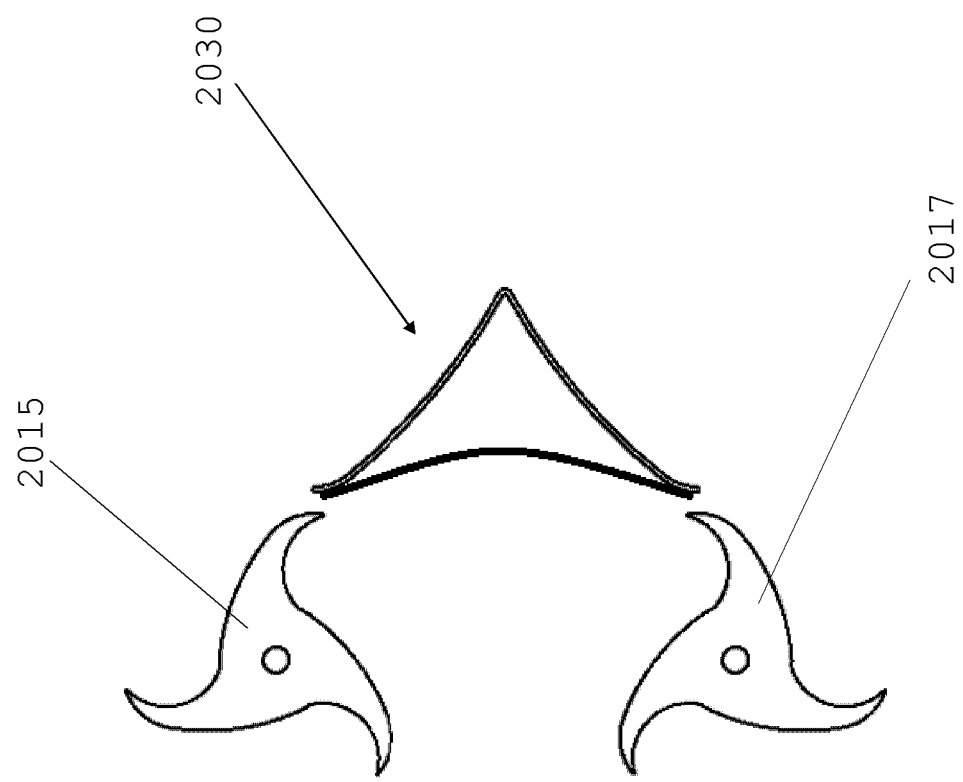
FIG. 39C is a top view of a configuration of the front flow director and central cores, according to another embodiment of the present disclosure.
Figure 39D:
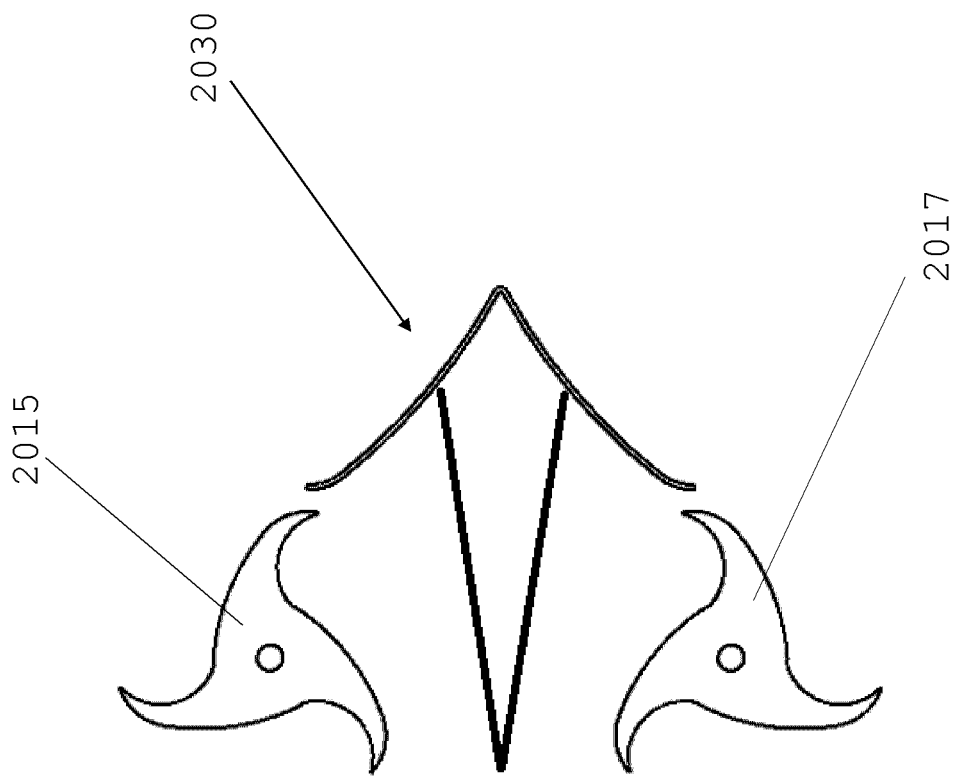
FIG. 39D is a top view of a configuration of the front flow director and central cores, according to another embodiment of the present disclosure.
Figure 39E:
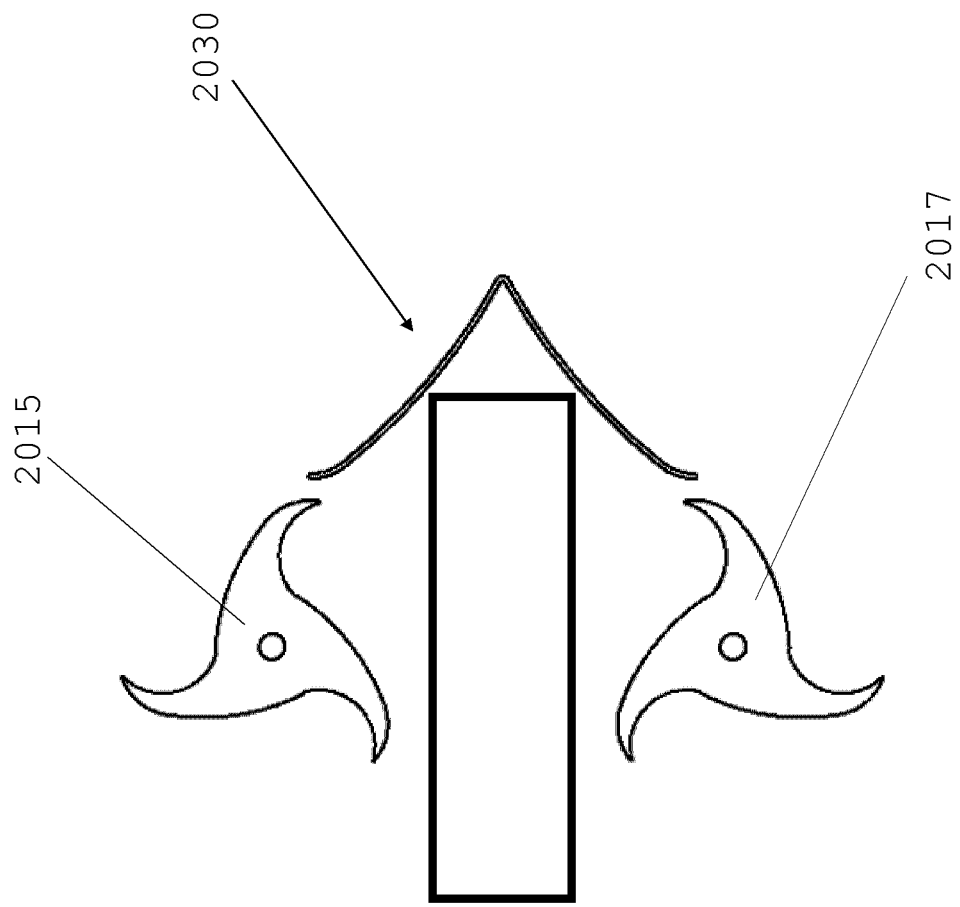
FIG. 39E is a top view of a configuration of the front flow director and central cores, according to another embodiment of the present disclosure.
Figure 39F:
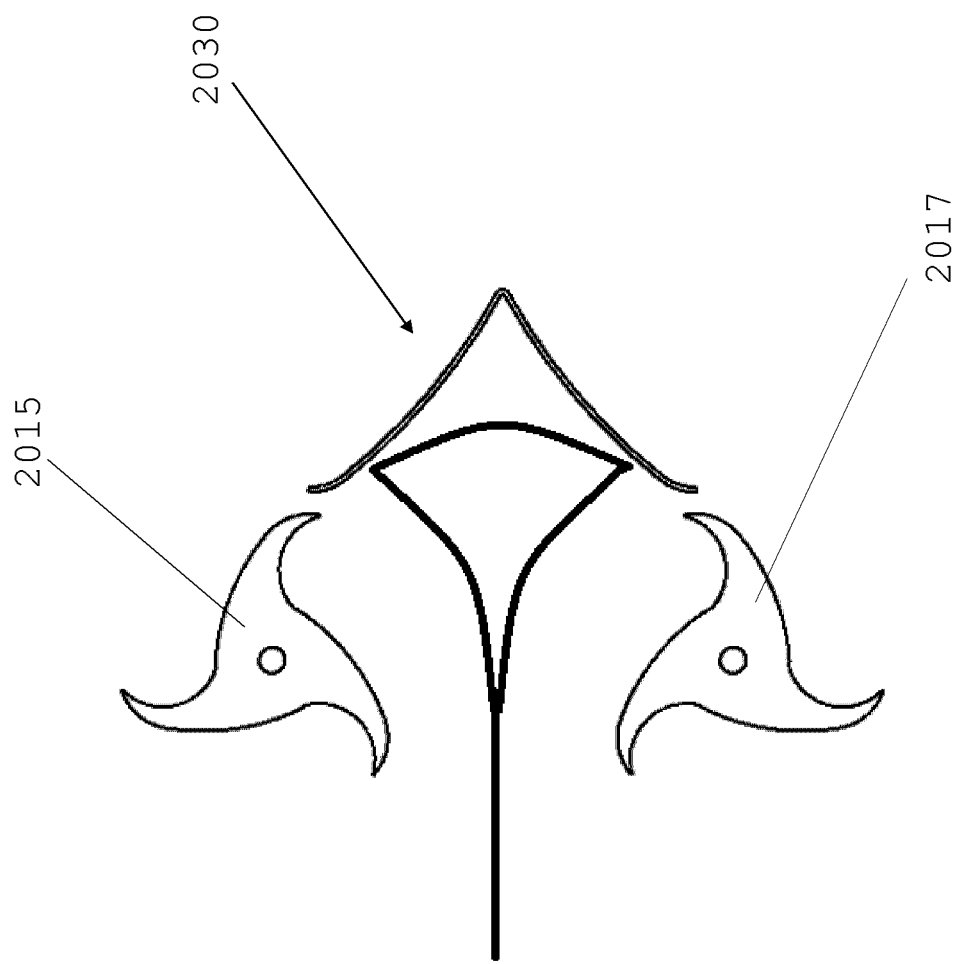
FIG. 39F is a top view of a configuration of the front flow director and central cores, according to another embodiment of the present disclosure.

FIG. 25 shows a top view of the primary flow director 1030 of FIG. 24. Primary flow director 1030 is shown generally arrow-shaped, having a V-shaped front portion 1040 and lips 1080, which serve to re-direct the incoming water flow Y outwardly and toward a desired point on the blade members, as previously described. As shown in FIG. 24, the central portion 1037 of primary flow director 1030 may be configured with a curvature complimentary to that of the path travelled by the tips of the blades. FIG. 39A shows a top view of bladed cores 2015, 2017, and a front flow director 2030 similar to the one shown in the embodiment in FIG. 24. FIGS. 39B, 39C, 39D, 39E and 39F show alternative embodiments with possible variants to the central portion and trailing end of the front flow director, including a line shape as shown in FIG. 39B, an arc shape as shown in FIG. 39C, a triangle shape as shown in FIG. 39D, a square shape as shown in FIG. 39E, or a trailing funnel-shape as shown in FIG. 39F.

Figure 26:
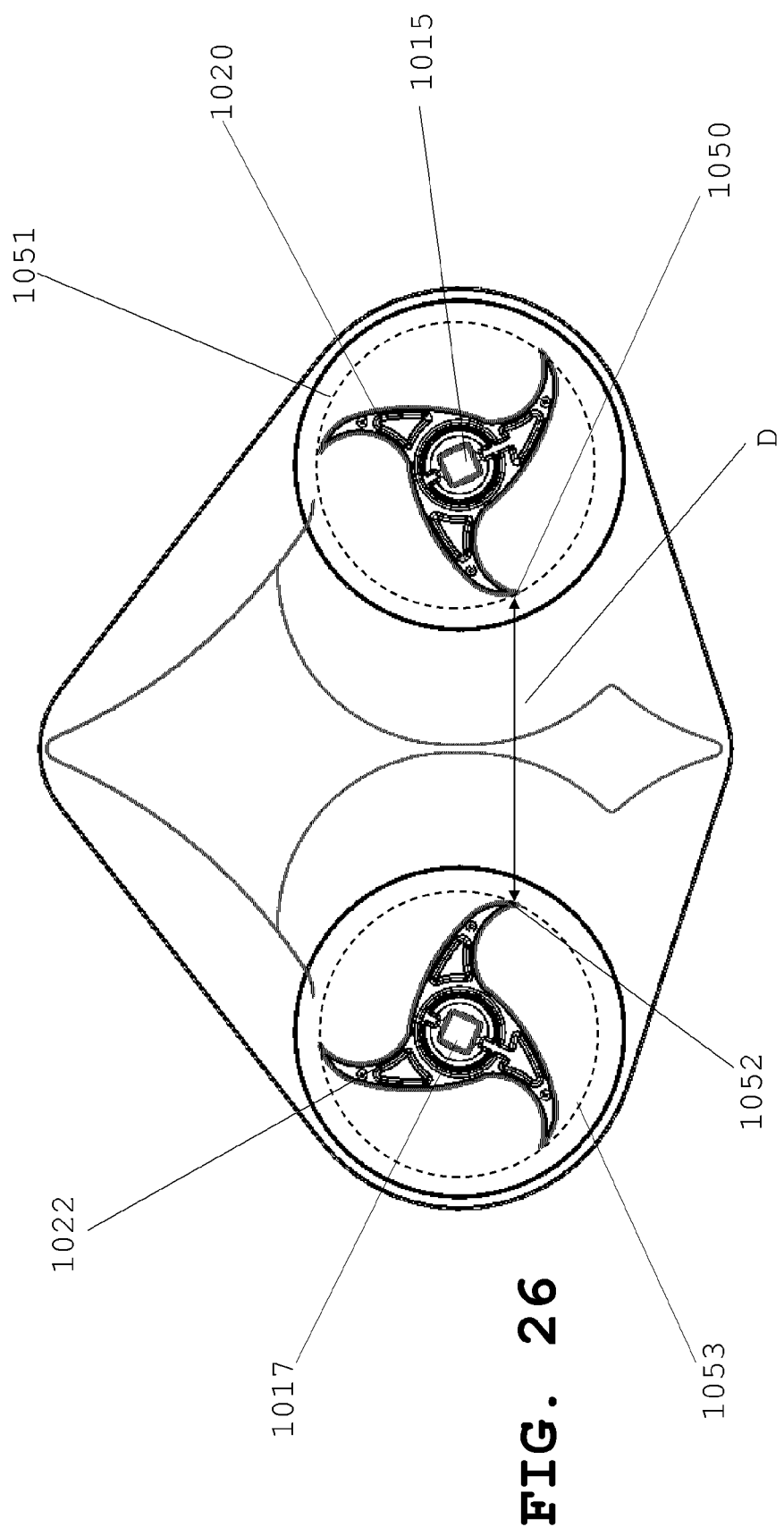
FIG. 26 is a top cutaway view of the energy extraction apparatus described in the embodiment of FIG. 23.
Figure 27:
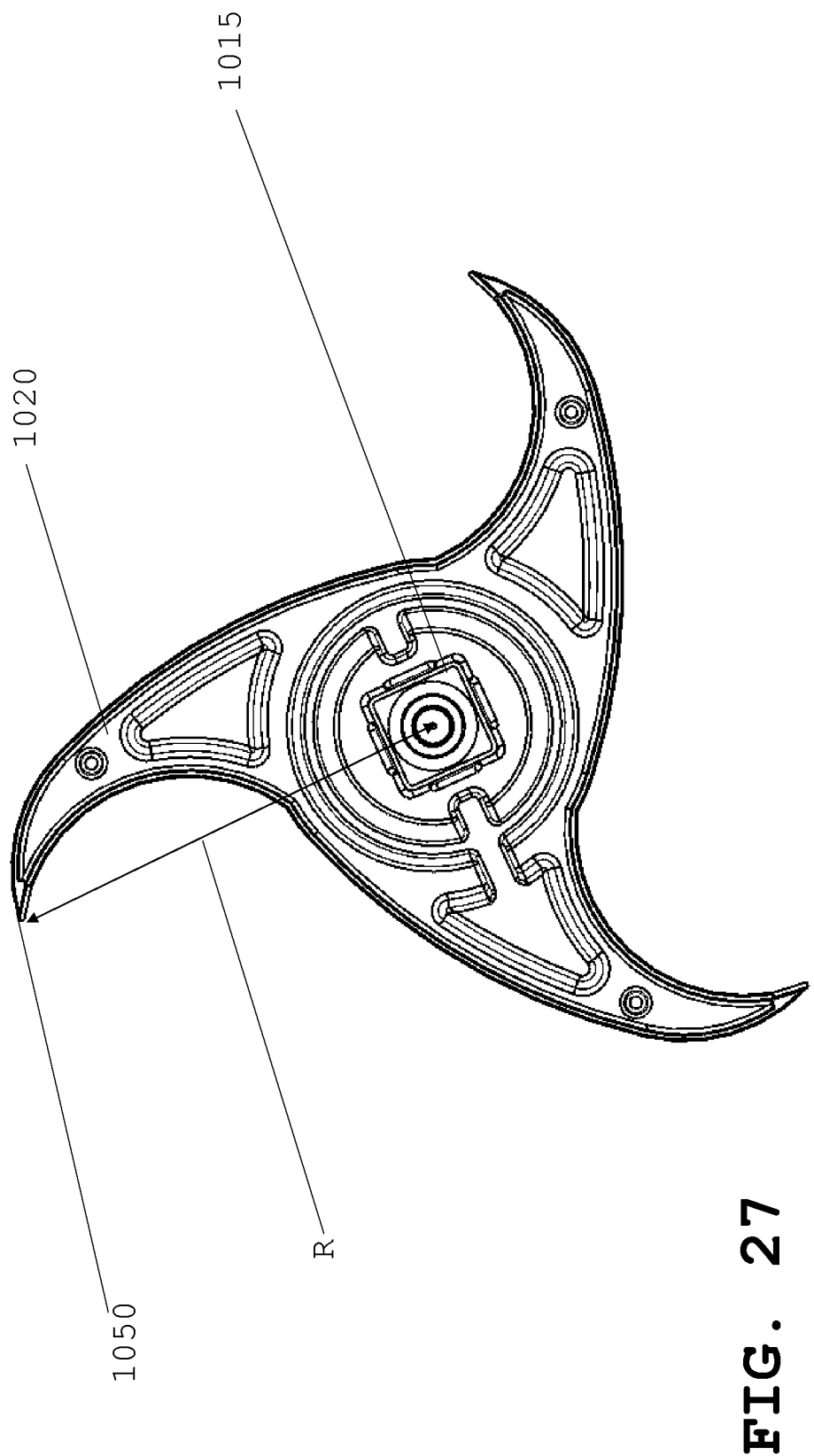
FIG. 27 is a top cutaway view of one of the central cores of the energy extraction apparatus described in the embodiment of FIG. 23.

A preferred spatial configuration of the bladed cores of this embodiment will now be described with reference to FIGS. 26 and 27. Similar to the embodiment shown in FIG. 4, a distance "R" is defined by the radius of the circumferential path travelled by the tips (e.g. 1050 or 1052) of the blade members of the cores. The circumferential blade tip paths of adjacent bladed cores (shown in FIG. 26 as dotted circles 1051 and 1053) are separated by a distance "D" as shown in FIG. 26. In a preferred embodiment, the central cores are spaced apart such that the distance "D" between the blade tip paths is between 1 and 4 times the radius "R".

Figure 28:
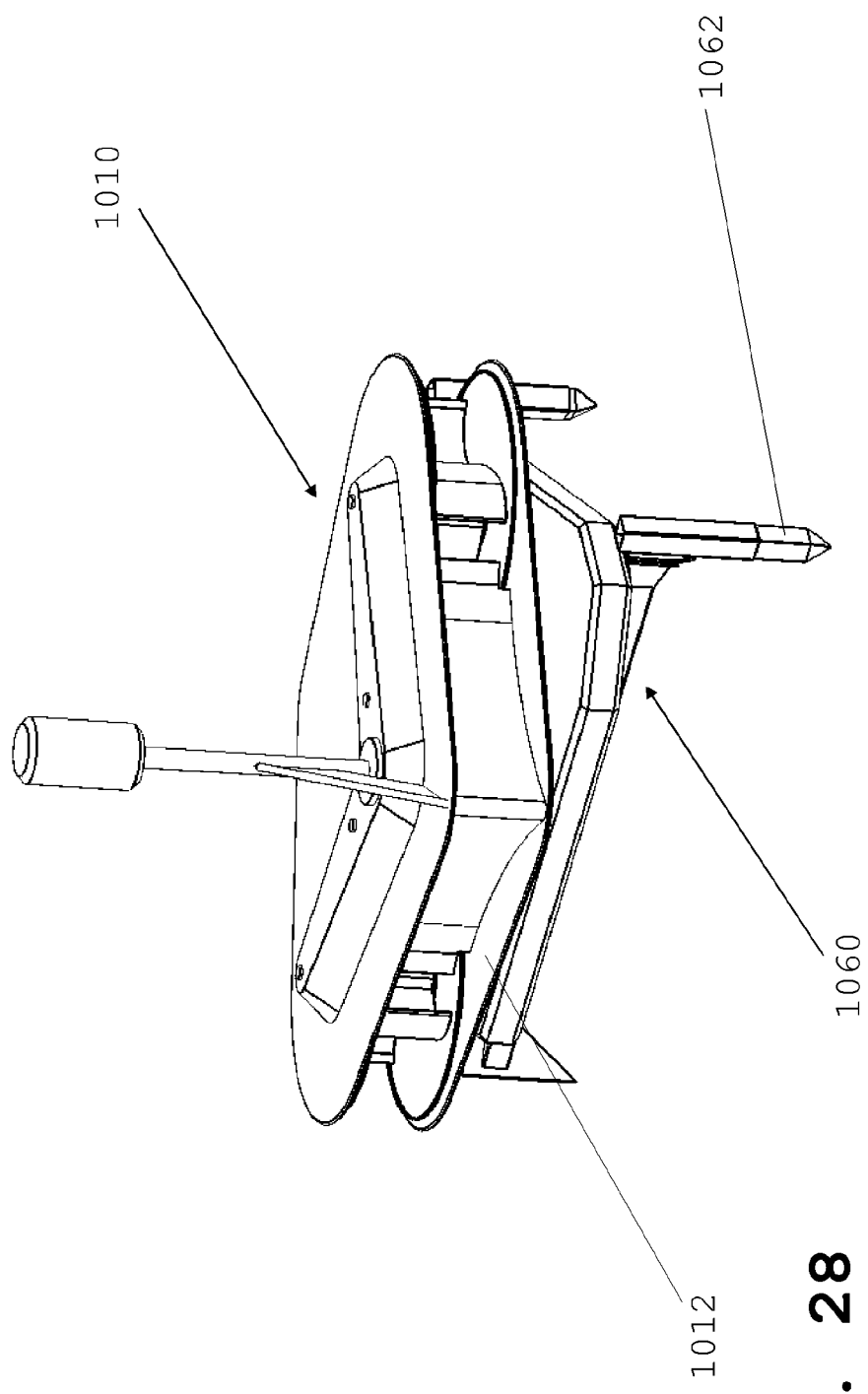
FIG. 28 is a front perspective view of the energy extraction apparatus described in the embodiment of FIG. 23 secured to a floor stabilizer.
Figure 29:
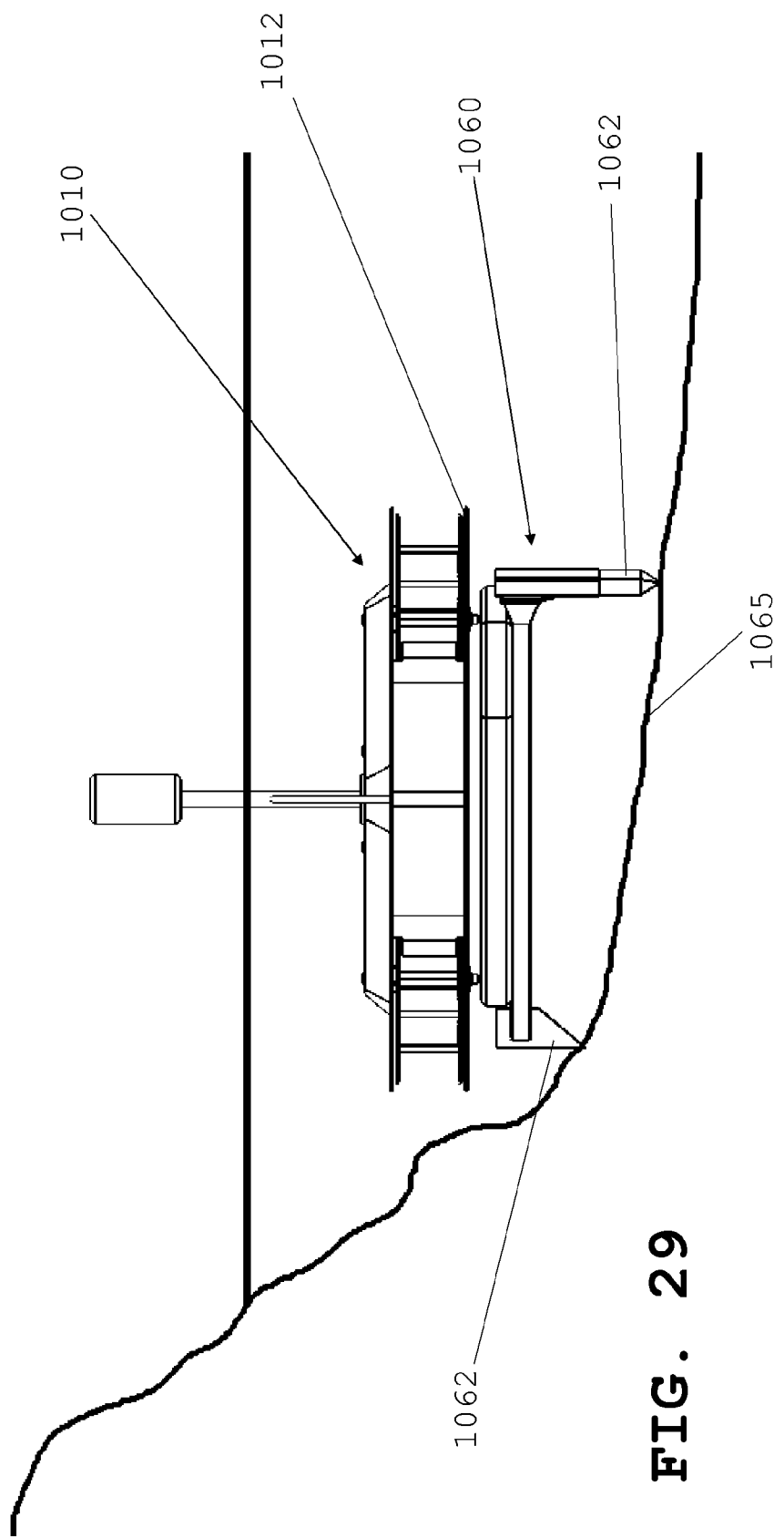
FIG. 29 is a side view of the energy extraction apparatus described in the embodiment of FIG. 28 and secured to the water floor.

FIGS. 28 and 29 show how the embodiment of FIGS. 23 and 24 may be secured to a waterbed floor using a water floor stabilizer 1060. The water floor stabilizer 1060 has legs 1062 of variable lengths to be secured to the water floor 1065 to provide stability to the apparatus 1010 in shallow water. Adjustability in the legs 1062 allows for accommodation of an uneven waterbed floor and helps to ensure the apparatus 1010 is maintained in an even, horizontal position as specifically shown in FIG. 29.

Figure 30:
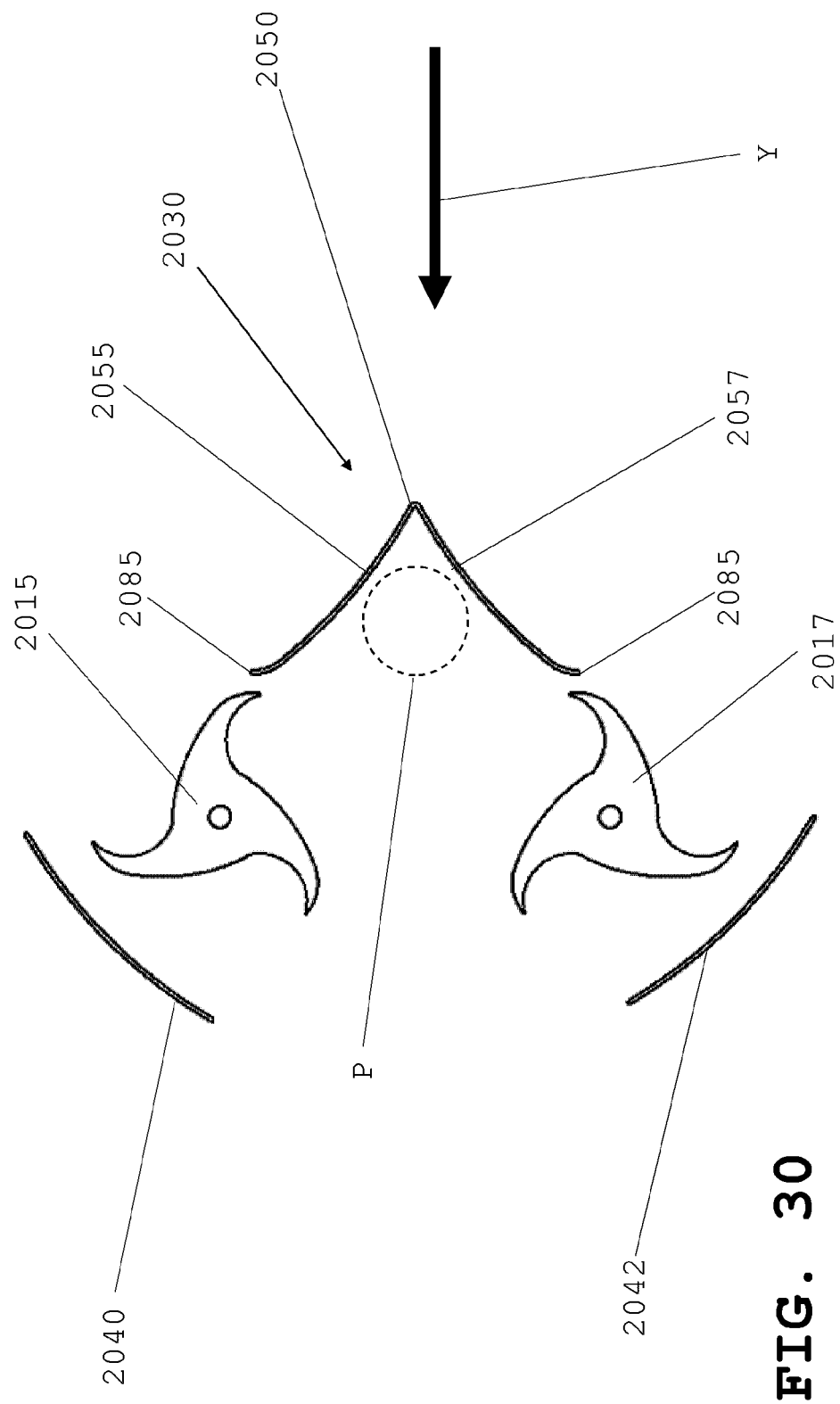
FIG. 30 is a top view of a configuration of the front flow director, central cores and secondary flow directors when water flows in direction Y, according to an embodiment of the present disclosure.
Figure 30A:
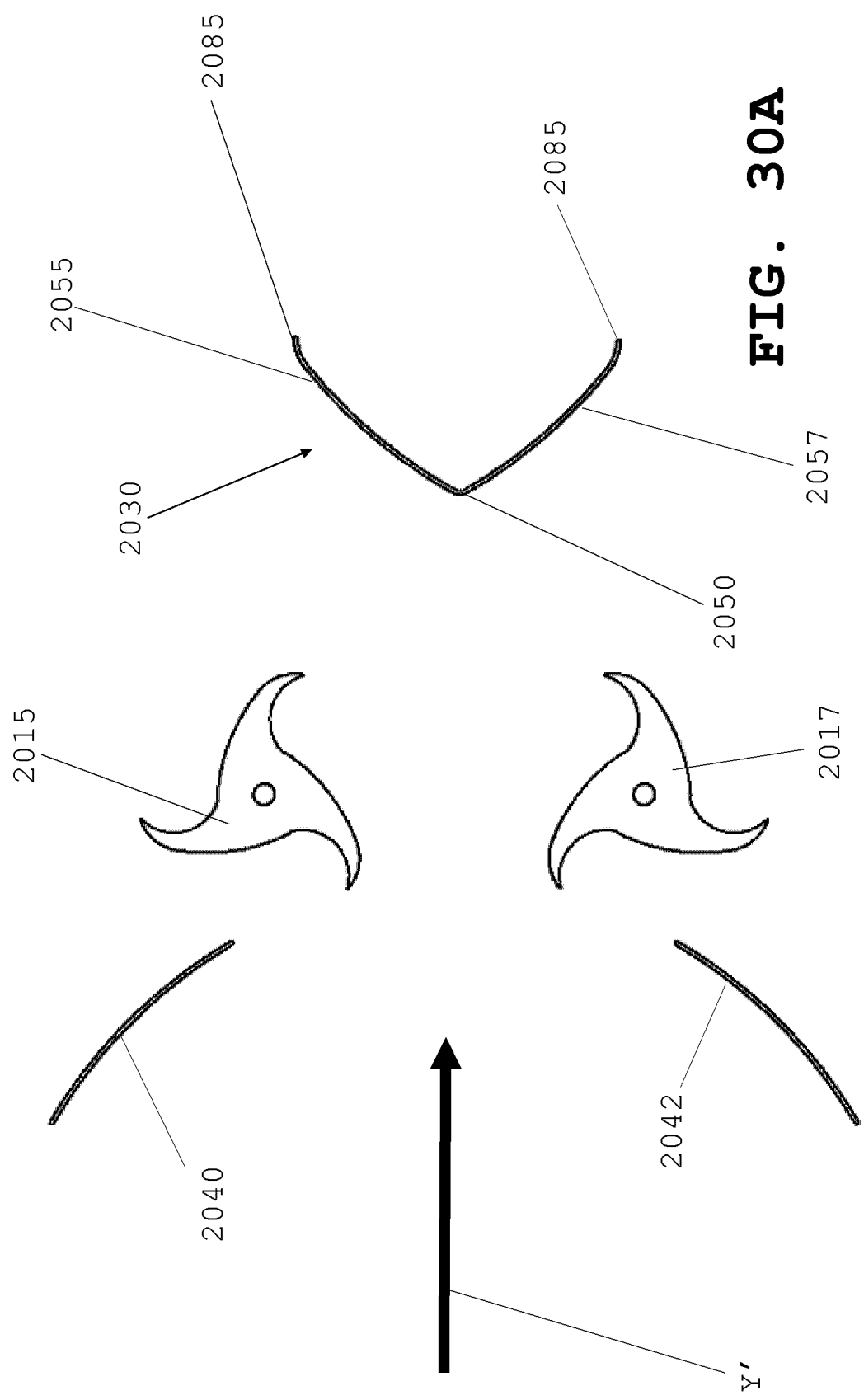
FIG. 30A is a top view of a configuration of the front flow director, central cores and secondary flow directors when water flows in direction Y', according to an embodiment of the present disclosure.
Figure 32:
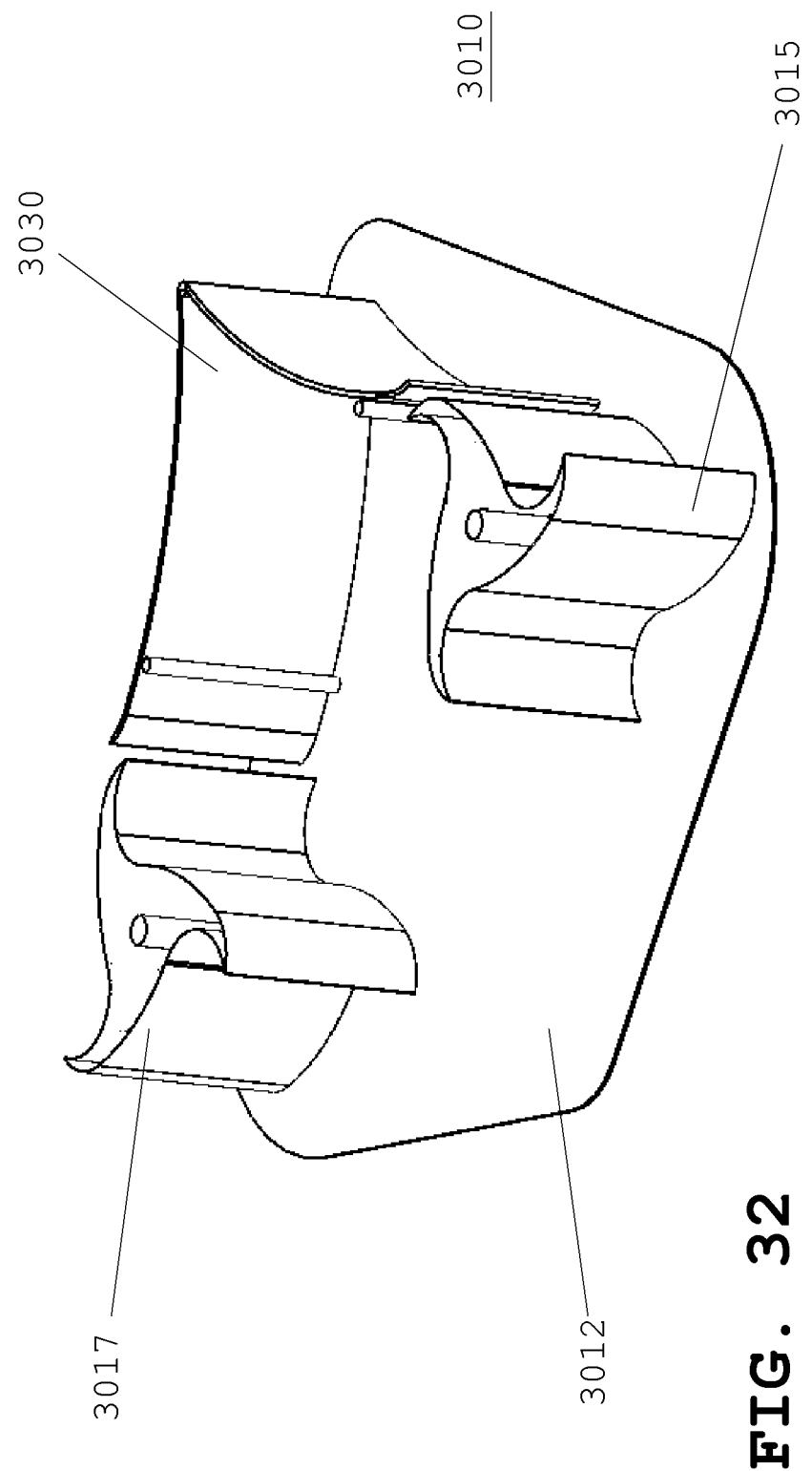
FIG. 32 is a top cross-sectional perspective view of the energy extraction apparatus as described in FIG. 31, the cross-section being taken through the center of the energy extraction apparatus.

With reference to FIGS. 30, 30A and 30B, and according to an alternate embodiment of the present disclosure, the primary flow director 2030 may be rotationally adjustable, for example, about a pivot axis 2050. The pivot axis 2050 is positioned at a first end (or leading end) of the primary flow director 2030. By virtue of its pivotability, the front flow director 2030 is able to adjust to the conditions of the incoming water flow and core rotation to help ensure continuous favourable direction of the water as the stagnation point of the blades varies. Specifically, the stagnation point of the blades at any given point—which is the target point for incoming water flow direction as described above—varies with water flow velocity and core rotational speed. The pivoting front flow director 2030 allows variability to the release point of water from the flow director such that the release point may be altered in response to changes to the stagnation point throughout operation of the apparatus. The natural fluid dynamics properties of the system during operation are such that the tips 2085 of the front flow director 2030 will naturally follow the changing stagnation point during operation (i.e. no external interference is required to maintain a desirable orientation of the pivoting front flow director).

A pivoting front flow director also renders embodiments of the present disclosure suitable to dual-directional (or tidal) flow. FIG. 30A shows how the segments 2055, 2057 of the front flow director 2030 may pivot about pivot point 2050 to reverse the direction of the V-shaped opening to allow back flow passed the flow director 2030 when the direction of water flow changes from Y to Y'. Two front stoppers 2080, 2082 are also provided and shown specifically in FIG. 30B to prevent each segment 2055, 2057 of the front flow director 2030 from pivoting beyond a desired position, which may impede rotation of the central cores 2015, 2017 in the desired direction. Similarly, the first secondary flow director 2040 is also comprised of two rear stoppers 2090, 2092, while the second secondary flow director 2042 is also comprised of two rear stoppers 2094, 2096. Such stoppers 2090, 2092, 2094, 2096 also prevent the secondary flow directors 2040, 2042 from rotating beyond a desired position, which may reduce the efficiency of the apparatus.

Although a pair of central cores 2015, 2017 are shown in many of the illustrative embodiments of the present disclosure, additional cores could be provided to help capture residual energy from water exiting the sides of the embodiments described herein. For example, as shown in FIG. 30C, additional cores 2015, 2017, 2020, 2022, 2025, 2027 may be positioned in an outside trailing configuration, such that the apparatus would form a substantially V-shaped configuration of central cores.

Figure 33:
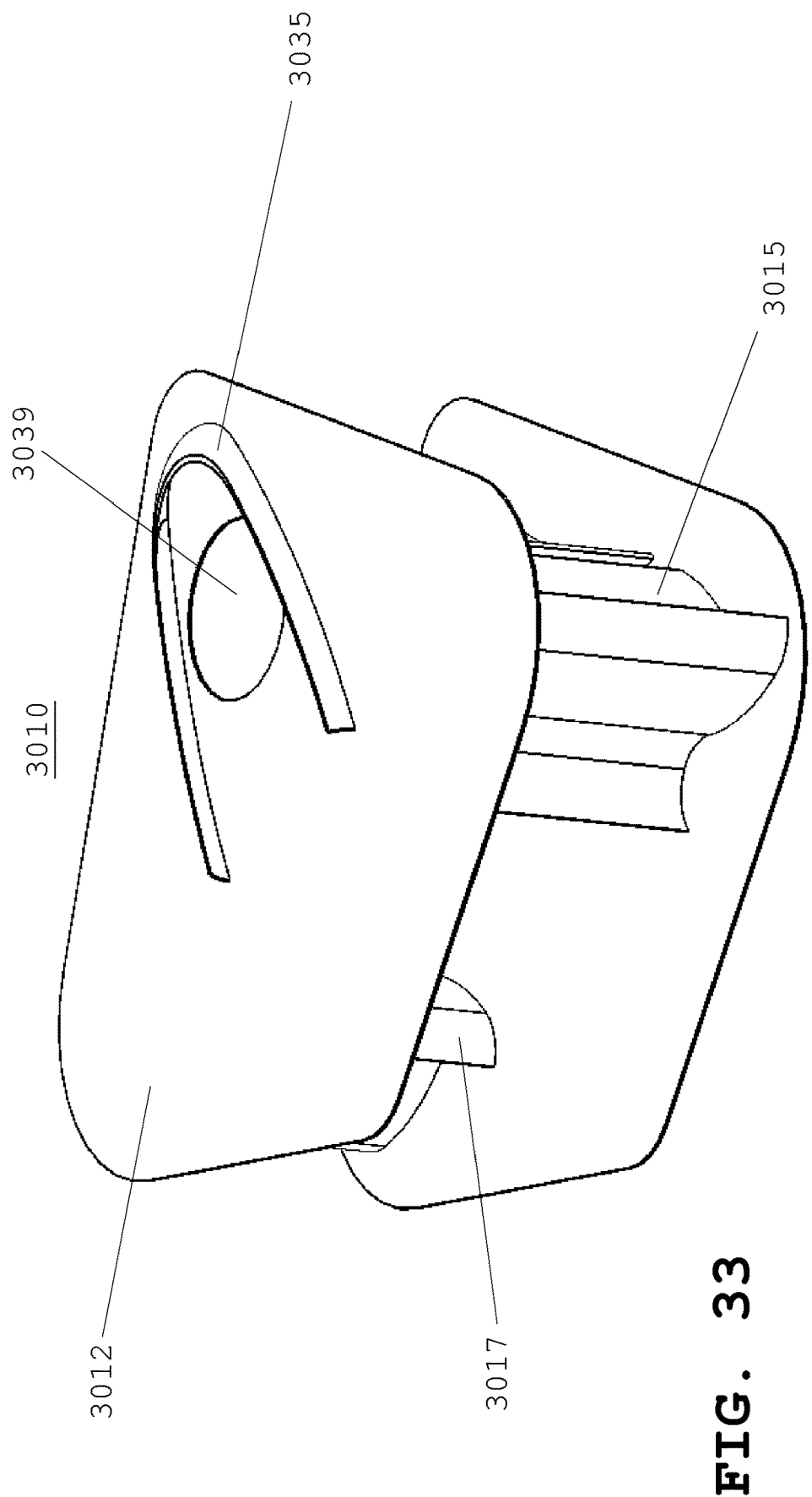
FIG. 33 is a cross-sectional perspective view of the energy extraction apparatus as described in FIG. 31, the cross-section being taken through the shield.
Figure 34:
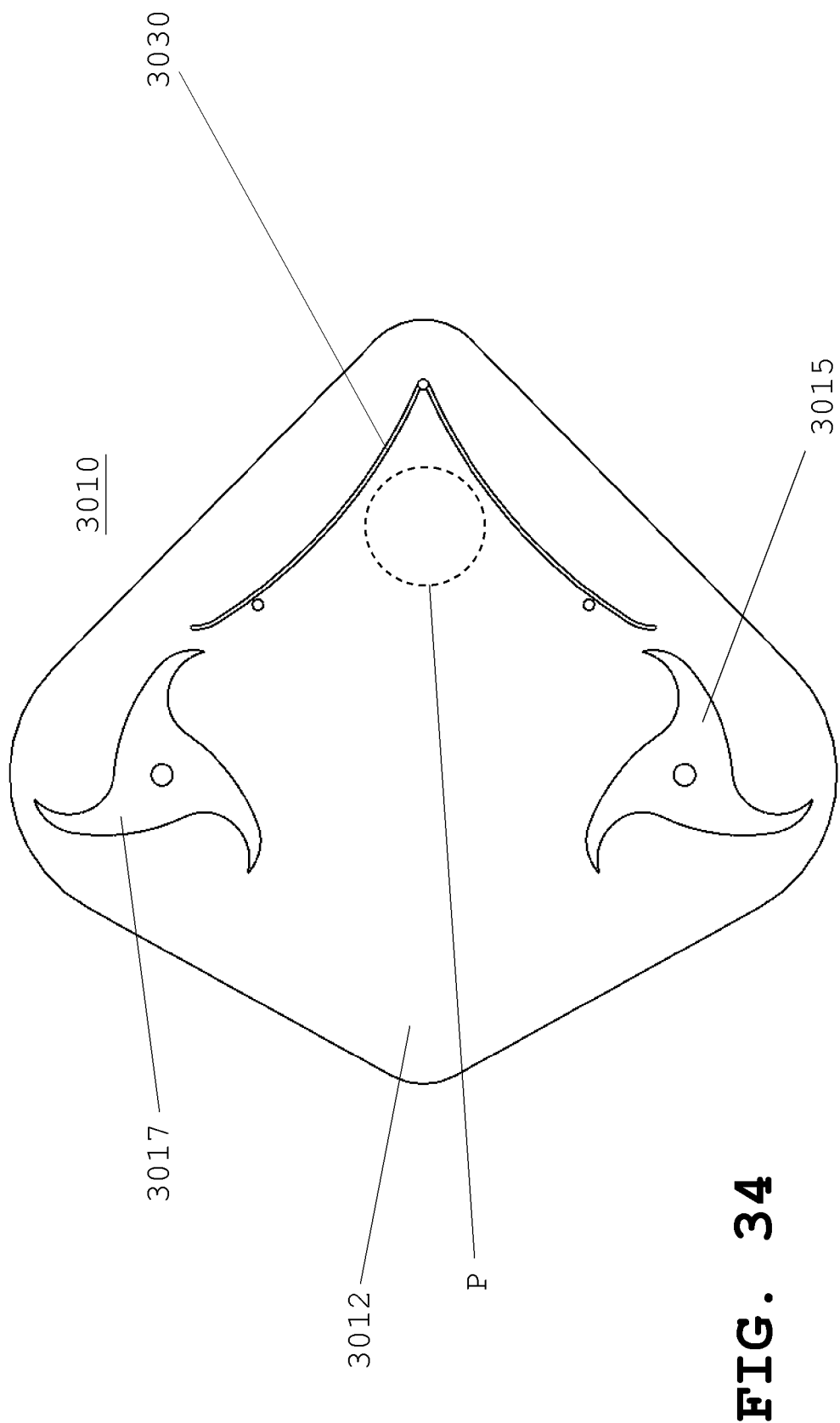
FIG. 34 is a top cross-sectional view of the energy extraction apparatus as described in FIG. 31.
Figure 35:
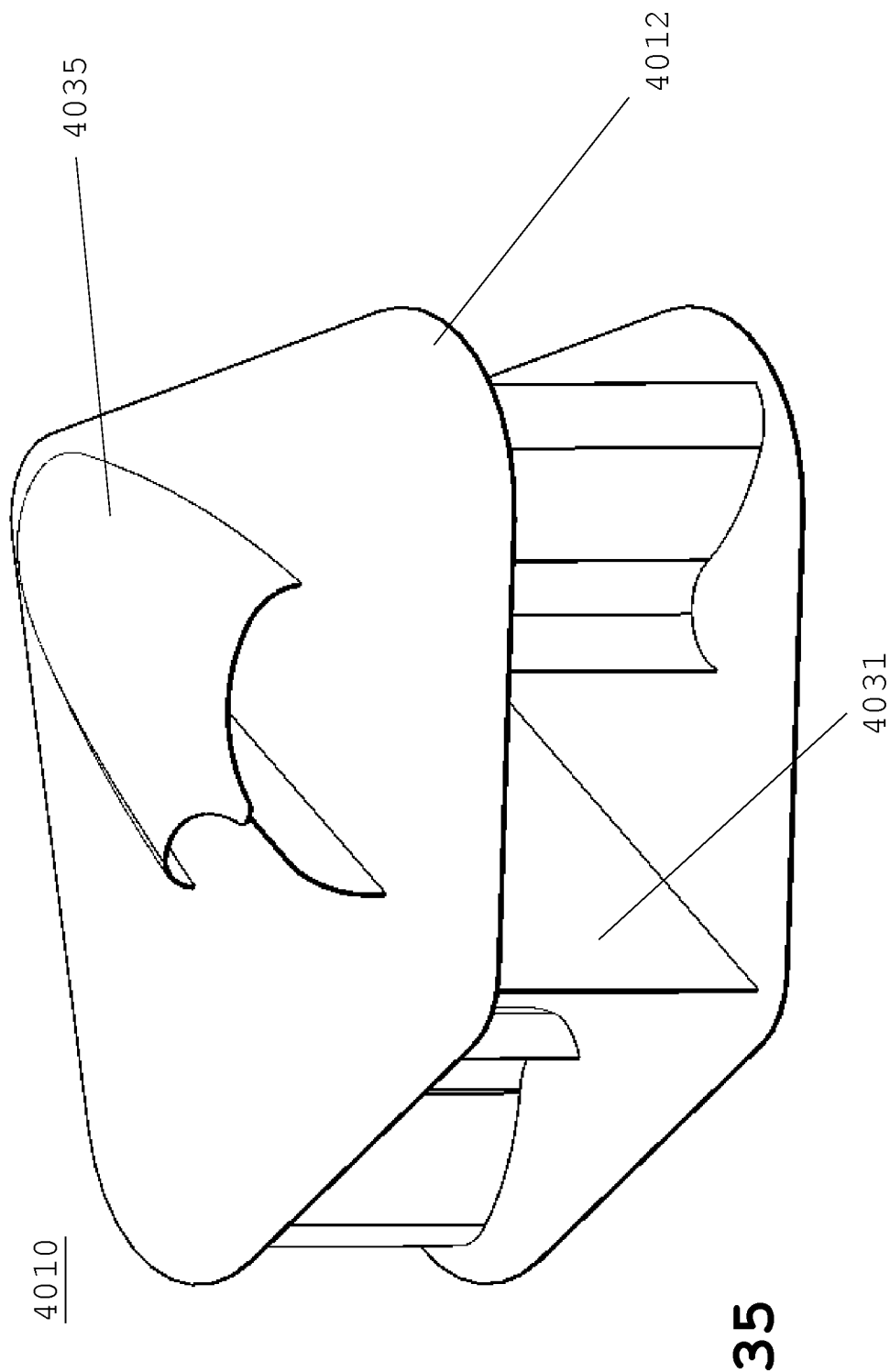
FIG. 35 is a top perspective view of an energy extraction apparatus for shallow water, according to yet another embodiment of the present disclosure.
Figure 36:
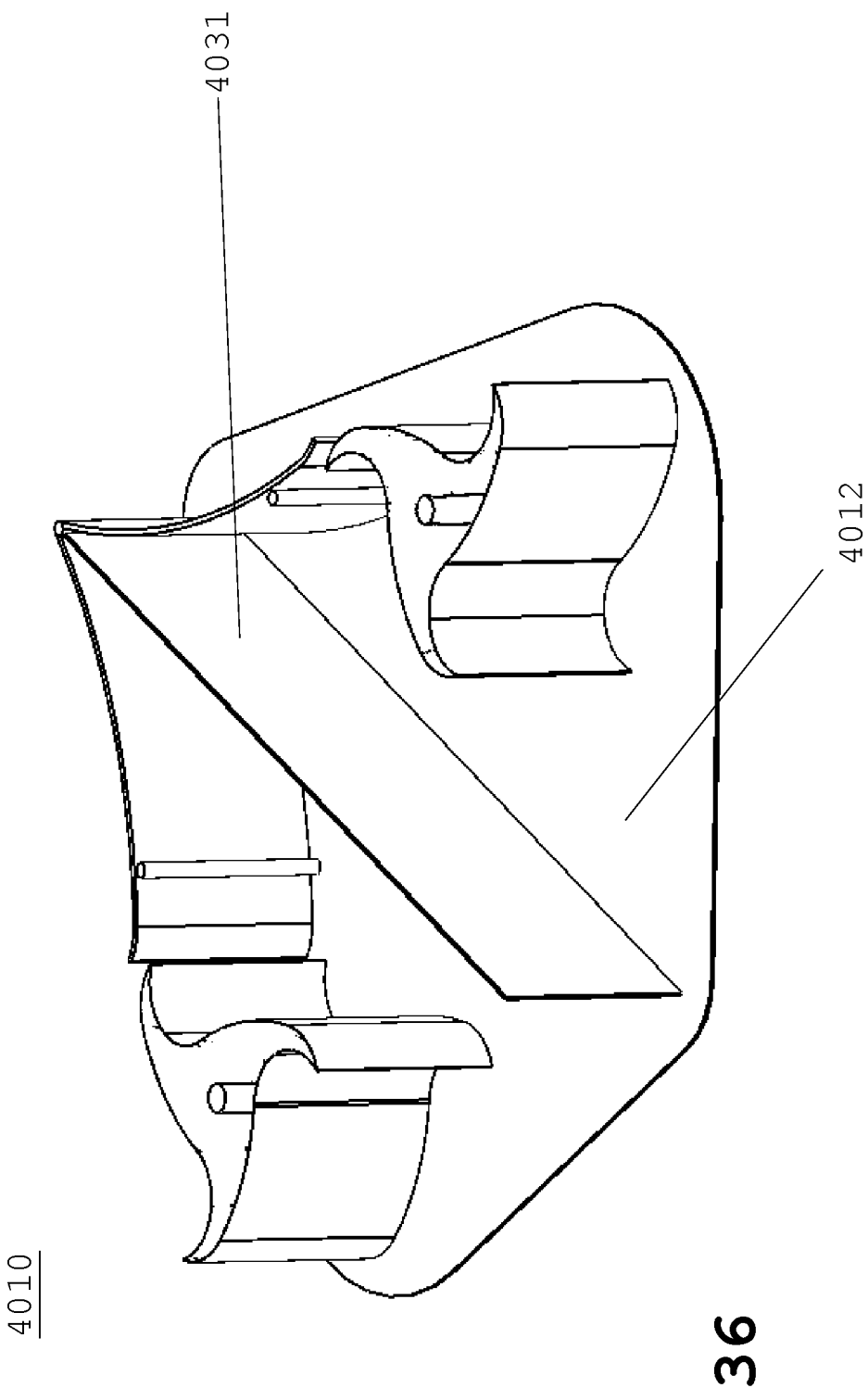
FIG. 36 is a cross-sectional perspective view of the energy extraction apparatus as described in FIG. 35, the cross-section being taken through the center of the energy extraction apparatus.

During the operation of embodiments incorporating bladed cores and the front flow director as configured and shown in FIG. 30, unwanted pressure may build up behind the front flow director 2030 in the area designated by dotted circle P. To help alleviate this adverse pressure build-up, pressure relieving features—which will now be described with reference to FIGS. 31, 32, 33 and 34—may be incorporated into the various embodiments described herein. The apparatus 3010 is generally comprised of a frame 3012, the frame 3012 preferably securing at least two central cores 3015, 3017 and a primary flow director 3030. In this pressure-relieving embodiment, the frame 3012 is provided with an aperture 3039 (FIG. 33). The presence of the aperture 3039 causes there to be a flow path to permit return water building up pressure behind the front flow director in the general vicinity P (FIG. 34) to escape from within the apparatus 3010. A shield 3035 affixed to the frame causes water flowing over the apparatus to be diverted slightly more upward and away from the aperture 3039, thereby creating a low-pressure realm on the underside of the shield 3035. The low-pressure realm would in turn assist the flow of high-pressure water from behind the front flow director 3030. The construction of the shield 3035 is best illustrated in FIG. 33, which shows the apparatus 3010 of FIG. 31 with a cutaway of shield 3035 slightly above frame 3012.

Figure 37:
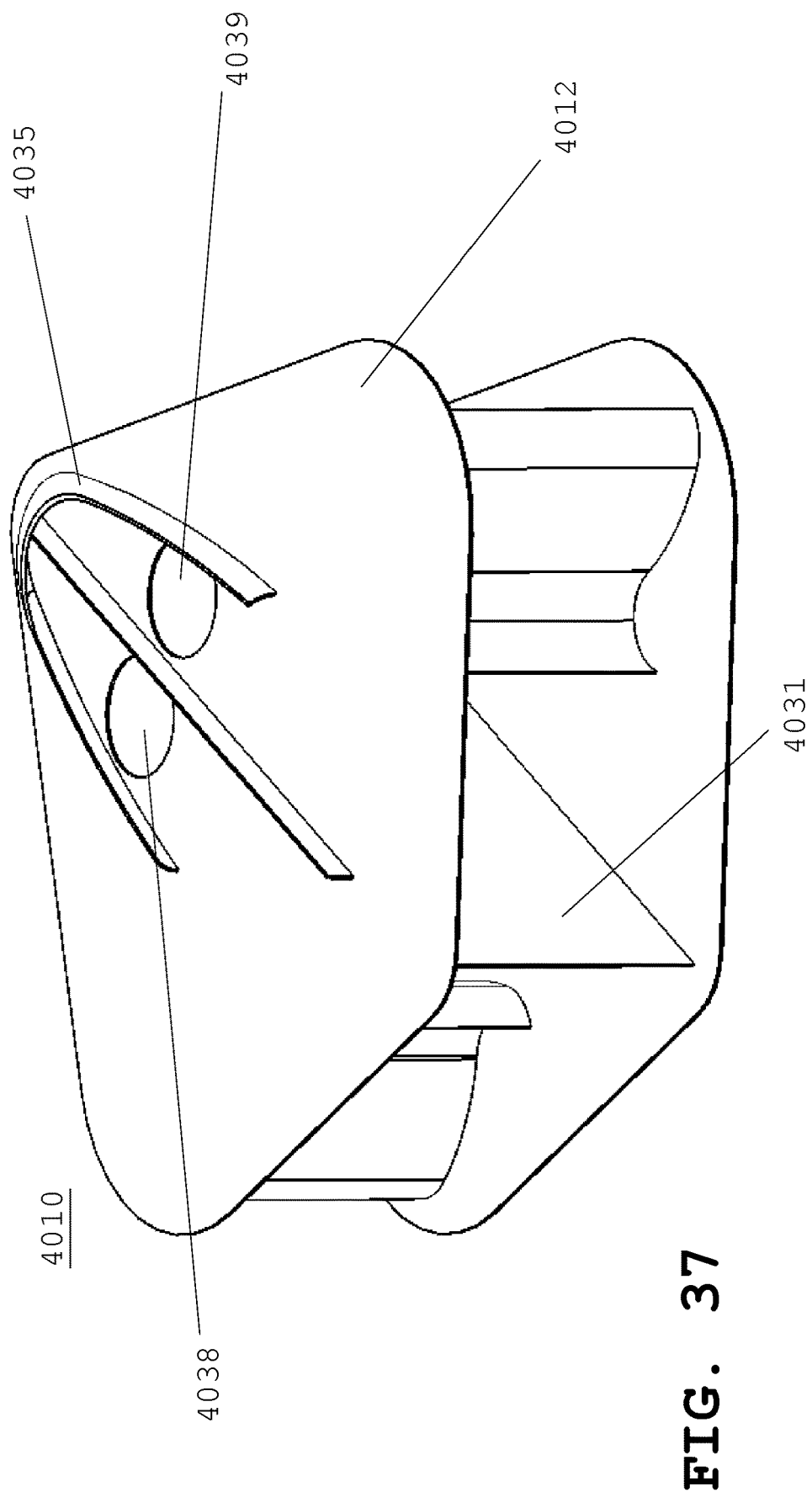
FIG. 37 is a cross-sectional perspective view of the energy extraction apparatus as described in FIG. 35, the cross-section being taken through the shield.
Figure 38:
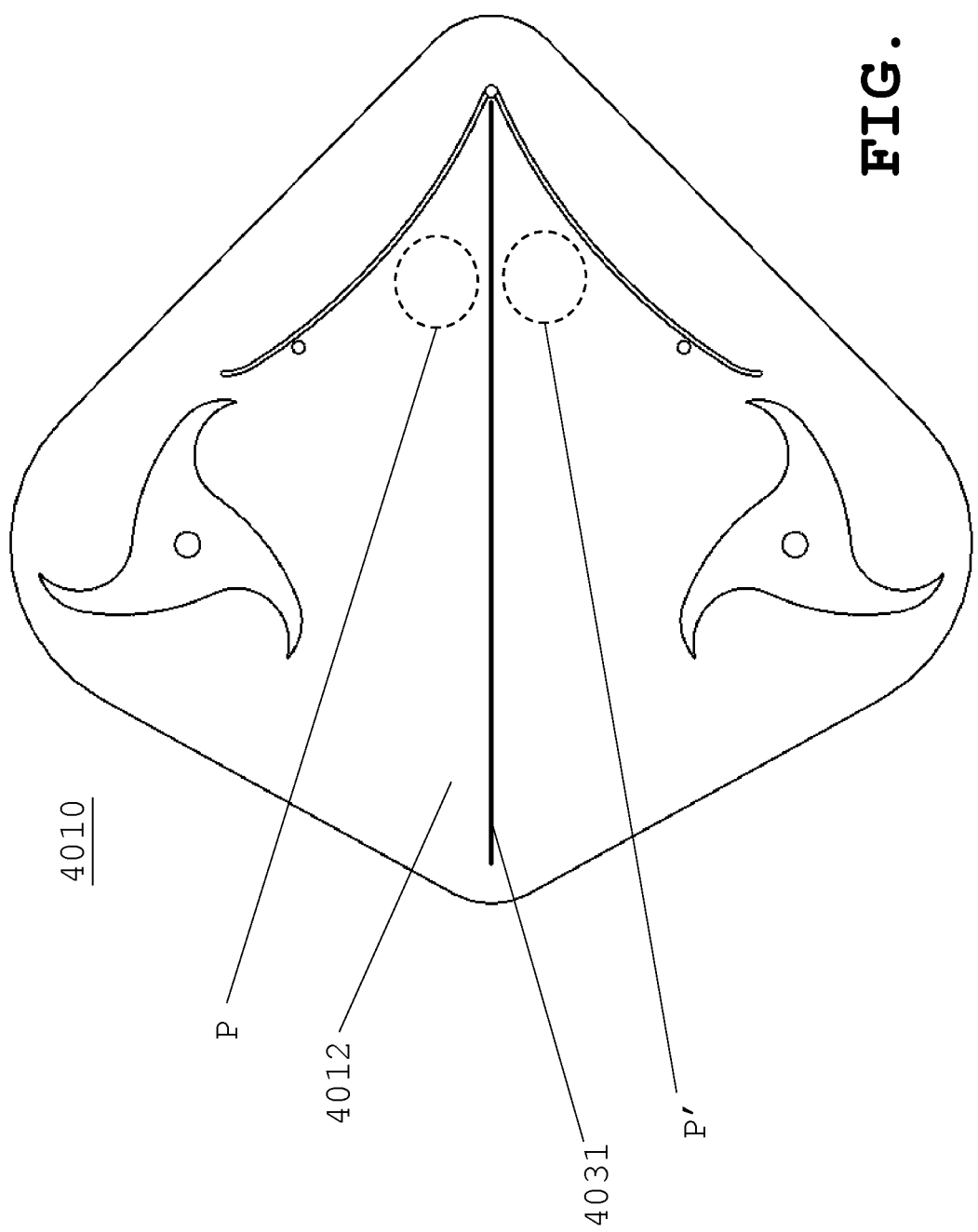
FIG. 38 is a top cross-sectional view of the energy extraction apparatus as described in FIG. 35.

FIGS. 35, 36, 37 and 38 show an alternate embodiment showing a variant on the pressure relieving means shown in FIGS. 31 to 34. In this variant, the front flow director has a trailing fin 4031. Since the return water in this embodiment is effectively divided into two areas (P and P' of FIG. 38), two apertures 4038 and 4039 are provided. An appropriately divided shield 4035 may thus be provided to cause pressure gradients and desired fluid flows paths similar to those described with reference to FIGS. 31, 32, 33 and 34. The construction of shield 4035 is best illustrated in FIG. 37, which shows the apparatus 4010 of FIG. 35 with a cutaway of shield 4035 slightly above frame 4012.

Figure 40:
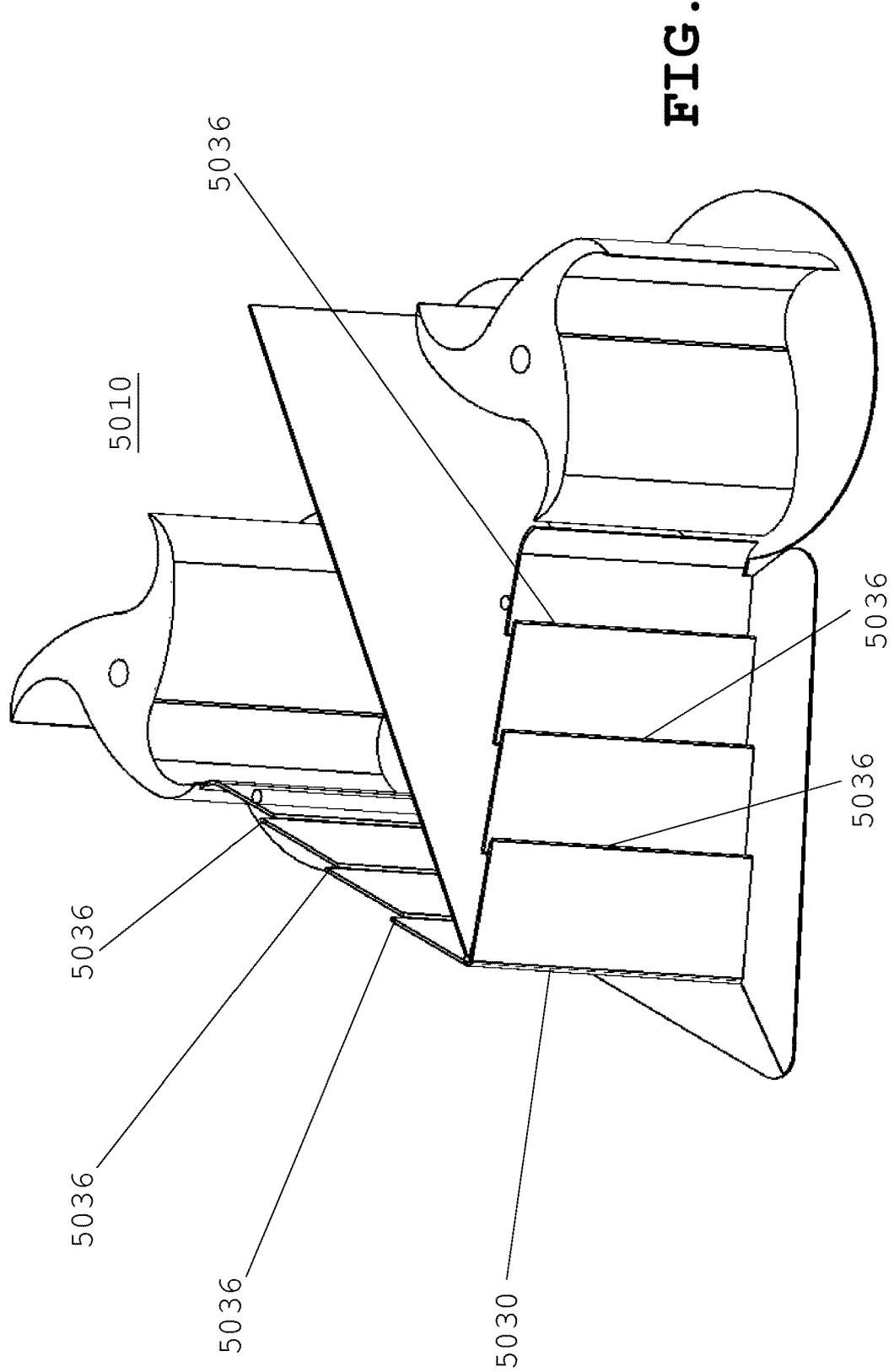
FIG. 40 is a top perspective view of an energy extraction apparatus for shallow water without an upper frame, according to yet another embodiment of the present disclosure.

FIG. 40 shows an embodiment 5010 with a variant to the front flow director 5030 that provides additional means for relieving built-up pressure behind the front flow director 5030. For ease of illustration, the upper frame panel have been omitted from the embodiment shown in FIG. 40. The front flow director 5030 of this embodiment is configured so as to permit water to flow from behind the front flow director 5030 into the stream of incoming water flow. Specifically, front flow director 5030 has a gilled configuration that both maintains a substantially smooth flow path surface for incoming water flow and sucks out high-pressure water built up behind the front flow director 5030. Similar to the low-pressure realm created under the shield of the embodiment shown in FIG. 31, incoming water flow over slots 5036 of the front flow director 5030 also creates a lower pressure realm, which induces flow of water from behind the front flow director 5030 to join the incoming water stream. Positioning of slots 5036 may be maintained, for example, by mechanically affixing the plurality of front flow director components with the frame (upper frame panel not shown); by attaching the front flow director components to one another with rigid linkages to maintain slot spacing; by other means that would be appreciated in the art, or; by any combination thereof.

Figure 41:
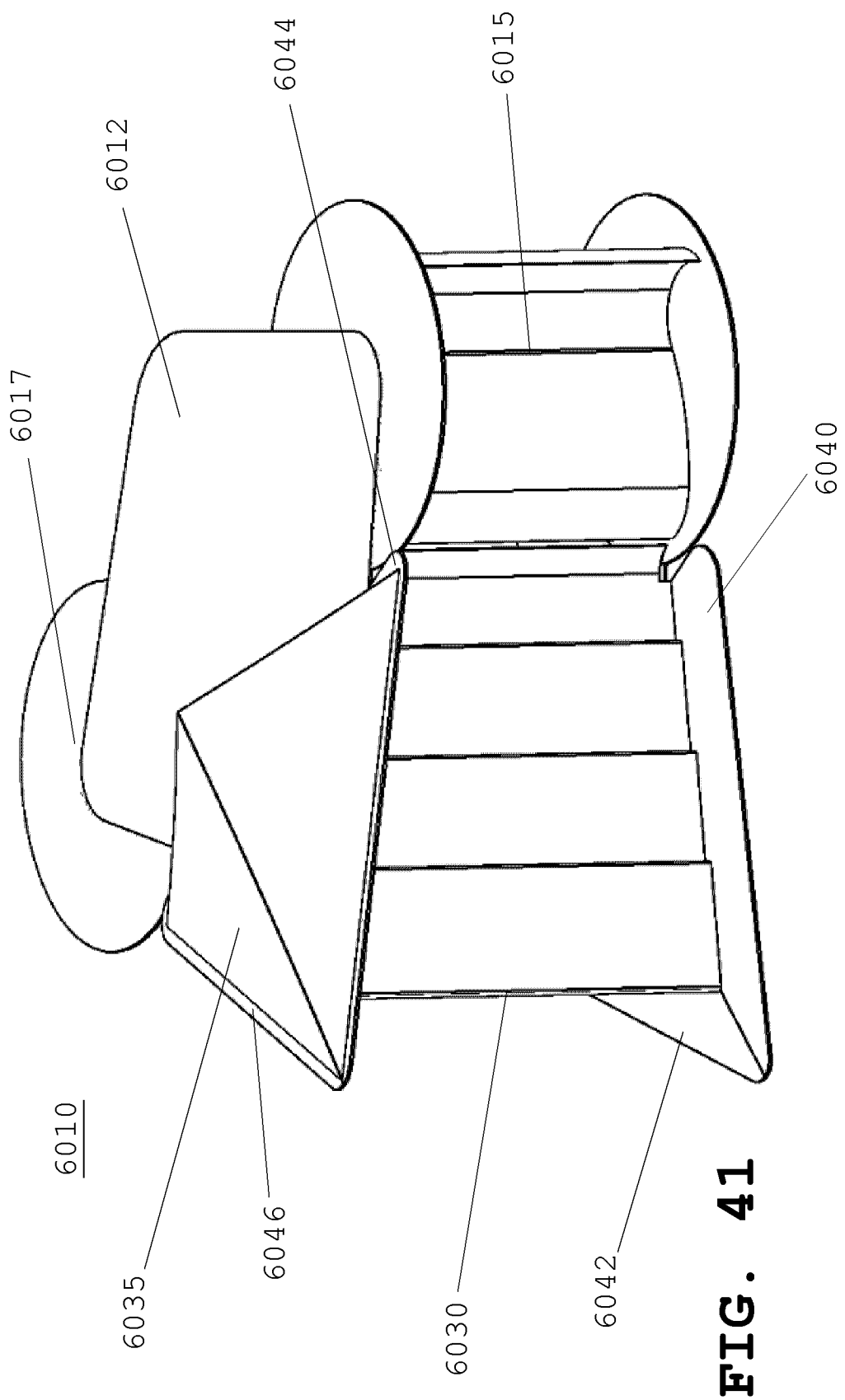
FIG. 41 is a top perspective view of an energy extraction apparatus for shallow water, according to yet another embodiment of the present disclosure.
Figure 42:
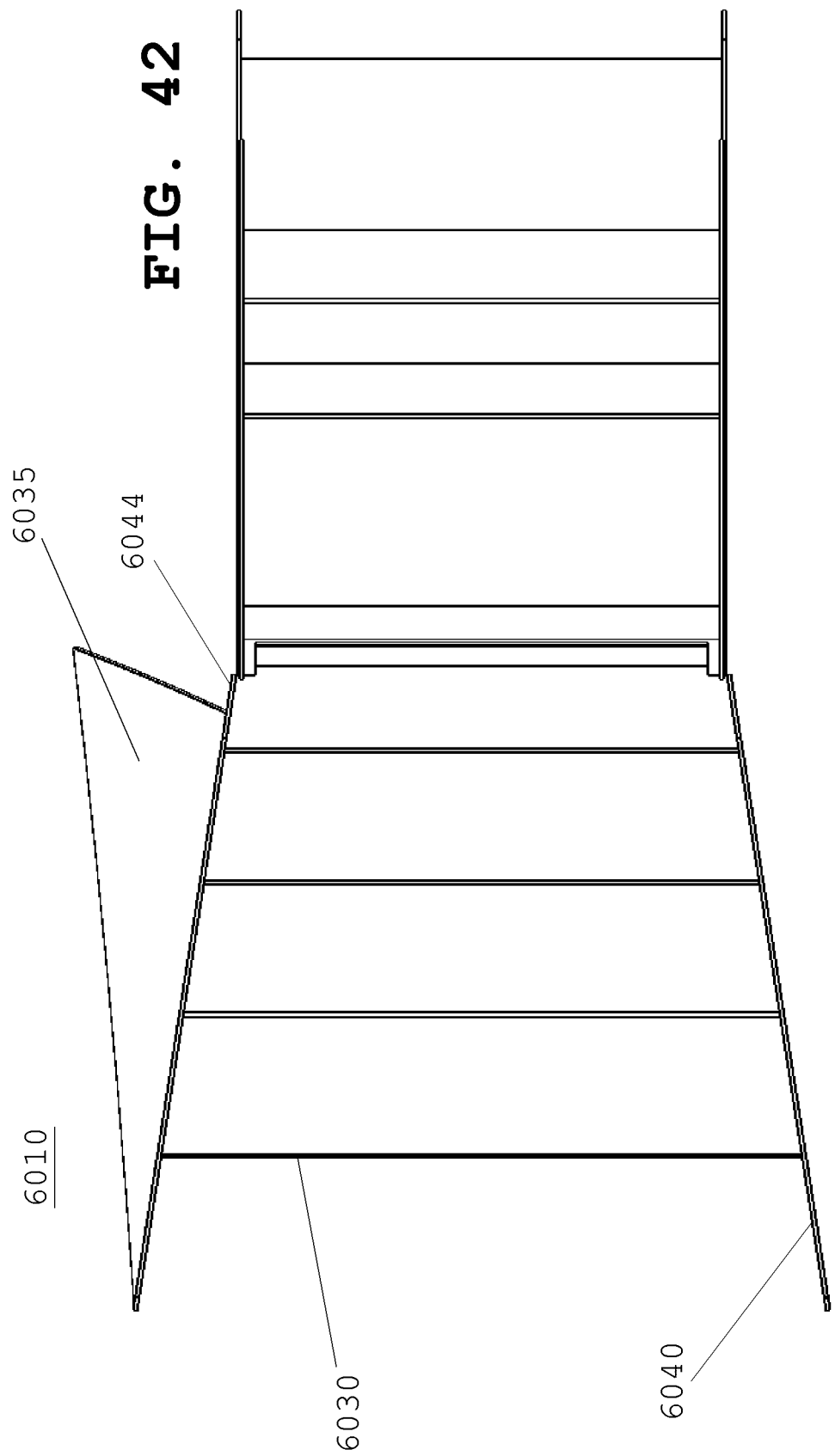
FIG. 42 is a side view of the energy extraction apparatus for shallow water shown in FIG. 41.
Figure 43:
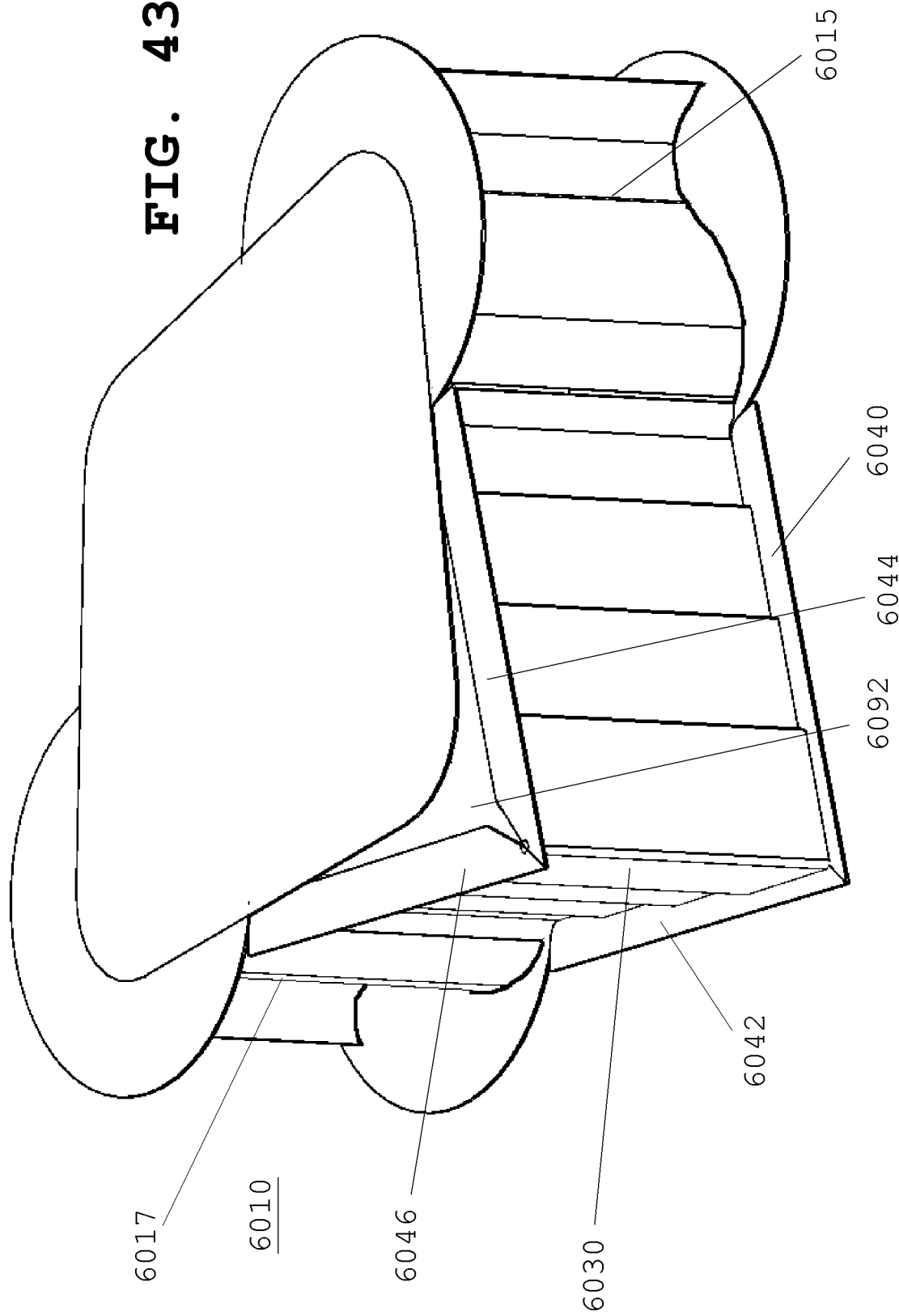
FIG. 43 is a perspective view of the energy extraction apparatus for shallow water shown in FIG. 41, with shield 6035 omitted.

FIGS. 41, 42 and 43 show yet another embodiment of the present disclosure. This embodiment combines the gilled front flow director with a variant of the pressure-relieving shield from FIG. 35. In this embodiment, apparatus 6010 is comprised of frame 6012, two bladed cores 6015, 6017, gilled front flow director 6030, and shield 6035. Frame 6012 is less expansive than frame 4012 (FIG. 35) and does not encompass the entire apparatus 6010. Gilled front flow director 6030 has side enclosure panels 6040, 6042, 6044 to help contain incoming water flow. The front flow director 6030 may be widest at its mouth and may taper down as it approaches the bladed cores to cause incoming water flow to accelerate into the bladed cores 6015, 6017. A flow path to allow water built up behind the front flow director 6030 is permitted by the aperture 6092 created by the relative spacing of the frame 6012 and the enclosure panels 6044, 6046 of the front flow director 6030 (aperture 6092 is best illustrated in FIG. 43).

Figure 44:
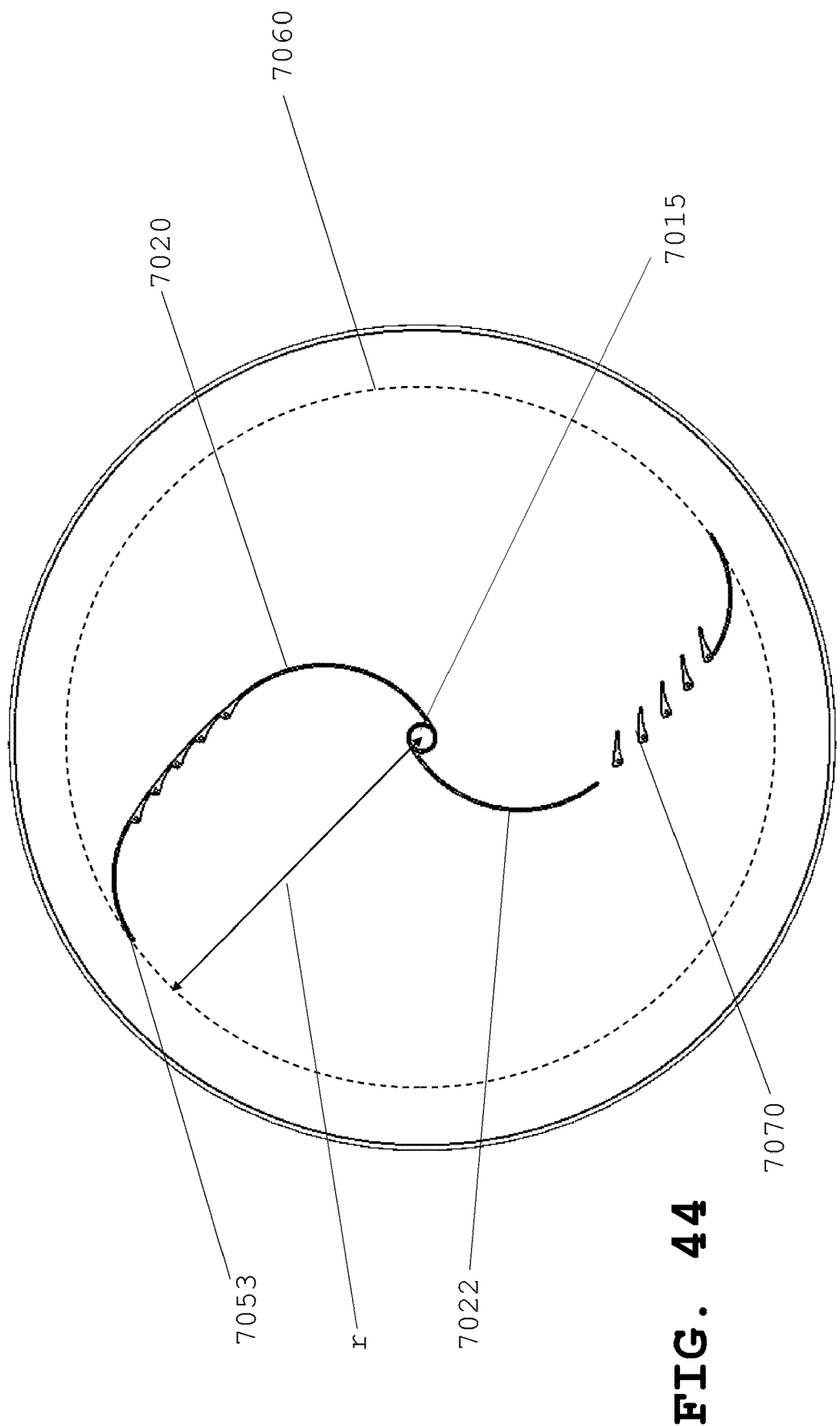
FIG. 44 is a top cutaway view of a bladed core, according to another embodiment of the present disclosure.
Figure 45:
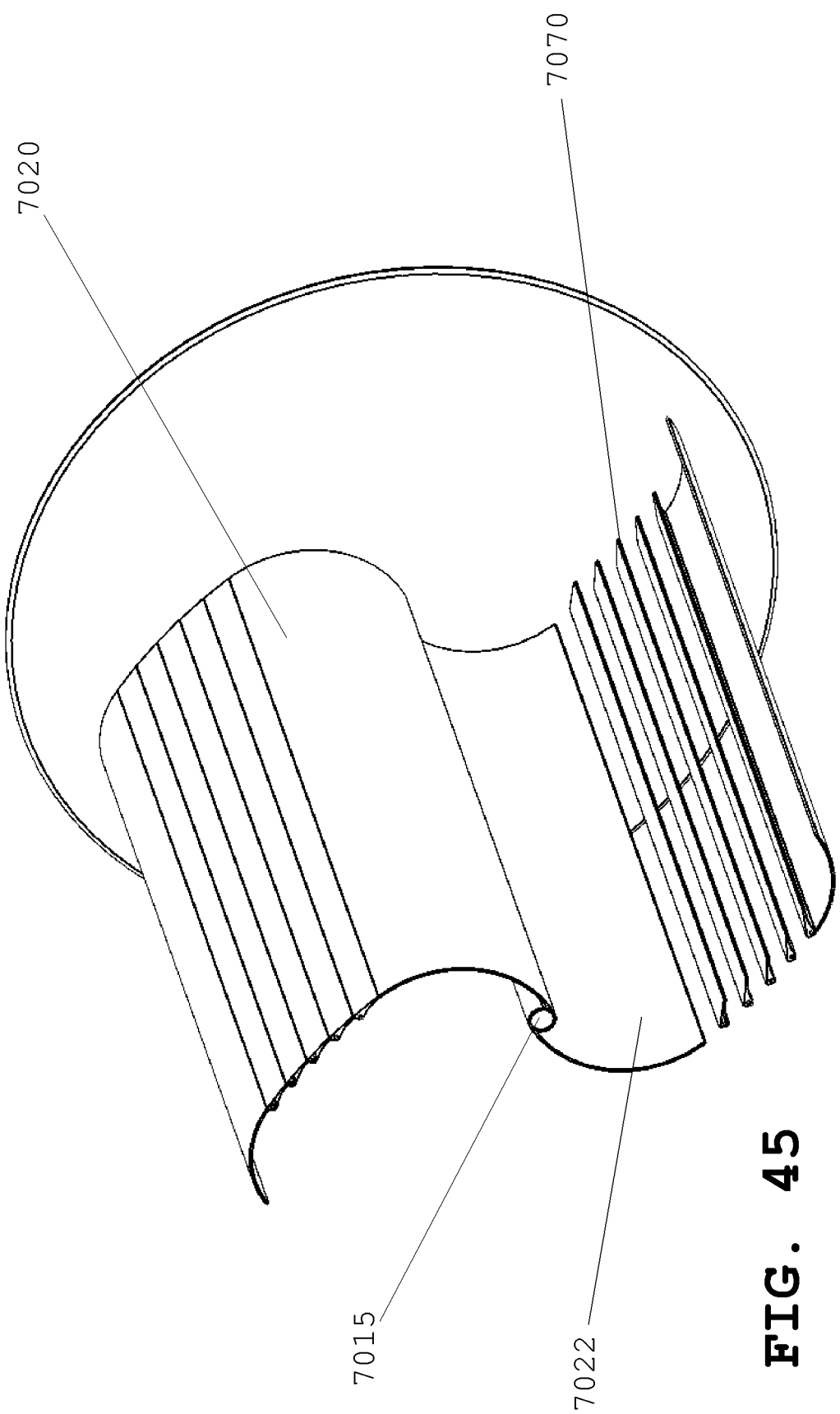
FIG. 45 is a perspective cutaway view of the bladed core as shown in FIG. 44.
Figure 46:
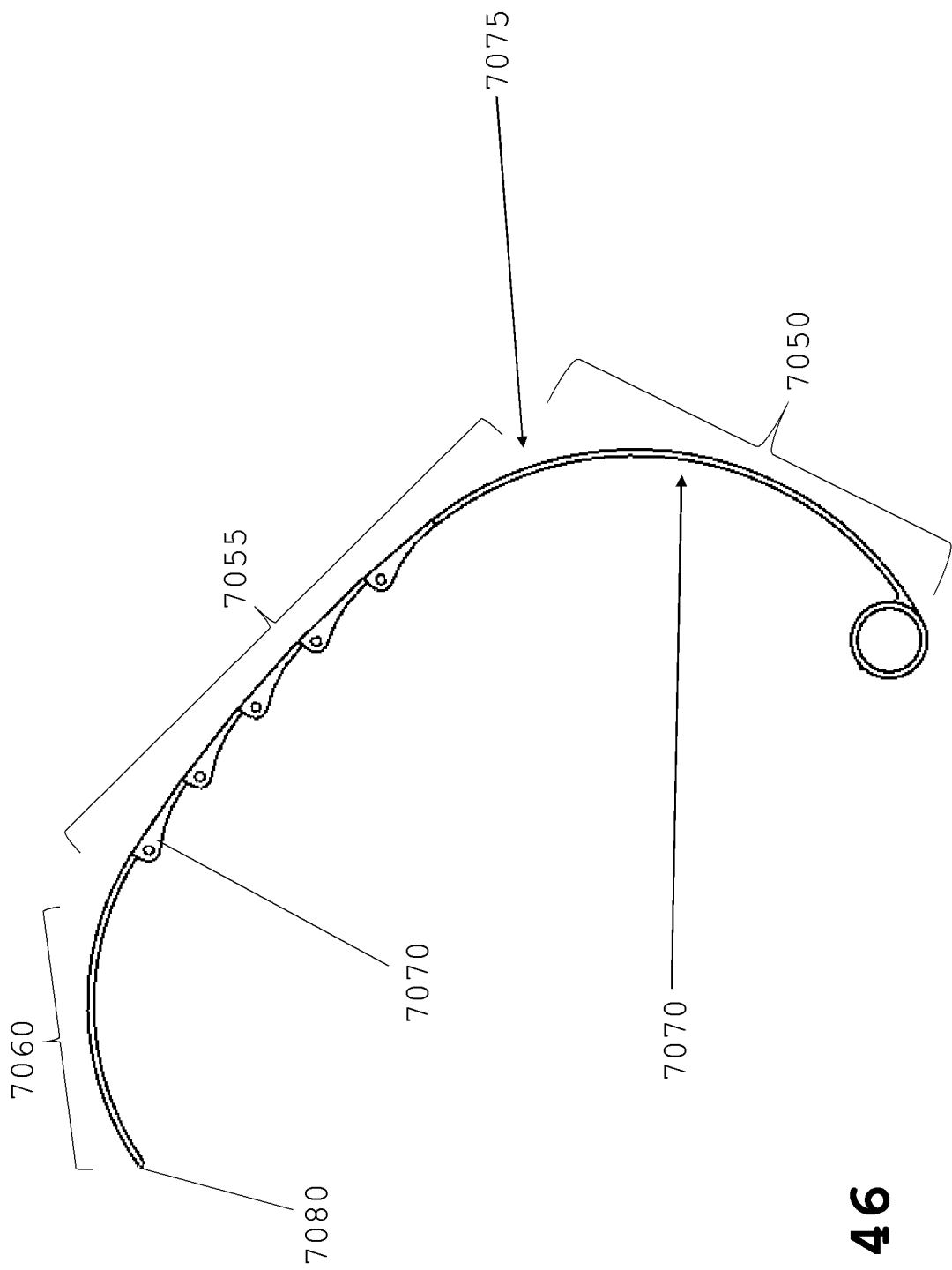
FIG. 46 is a top cutaway view of a single blade of the bladed core as shown in FIG. 44; and, FIG. 47 is a block diagram representing the steps of a method for extracting energy from a flow of water using the apparatus embodiments described herein, in accordance with an embodiment of the present disclosure.

FIGS. 44, 45 and 46 show a variant of a bladed core that could be substituted into the various apparatus embodiments described herein. The alternative central core 7015 shown has two blade members 7020, 7022 extending outwardly from the center of the central core 7015. In this variant to the blade and core configuration, the blades are substantially bodyless in the sense that the structure of the blades is plate-like as opposed to having a more voluminous body. For example, a blade according to this embodiment may be contoured out of sheet metal or other suitable thin flat material sufficiently strong to hold up to the various forces exerted on the system during operation by the water flow. Each blade member 7020, 7022 terminates in a sharp tip end (e.g. 7053). During rotation, the tip ends 7053 define a circular travel path 7060. At any point in time, the blades terminate at their tips 7053, at a point that resides along the circular travel path 7060. The blades in this embodiment are configured so as to have a tangent line at the tip 7053 of the blade that is substantially congruent with the tangent line along the circular path 7060, at the point where the tip 7053 resides.

With specific reference to FIG. 46, a single blade of the embodiment described with reference to FIGS. 44 and 45 is shown. The blades of this embodiment may be generally described as having three adjoining sections and two surfaces. The three sections (an inner portion 7050, a central portion 7055 and an outer portion 7060) and the two surfaces (the impact surface or ram surface 7070 and the lift surface or non-ram surface 7075) are identified in FIG. 46. The inner portion 7050 is nearest to and attaches to the central core 7015. The central portion 7055 of the blade 7055 begins at the end of the inner portion 7050 and is configured similar to an airfoil to induce low pressure and therefore lift forces at the lift surface 7075 of the blade 7020. The outer portion 7060 begins at the distal end of the central portion 7055, extends outwardly in a curved fashion and terminates with a sharp tip 7080. The outer portion 7060 is characterized by its tip 7080 being in the orientation described previously (i.e. whereby a tangent line at the blade tip is substantially congruent with a tangent line of the circular blade tip travel path at the point of intersection between the blade tip 7080 and the circular path). This combination of blade features has been found to produce favourable power generation results.

With continuing reference to FIGS. 44, 45 and 46, the blade members 7020, 7022 may optionally feature one or more fluid bypass mechanisms such as, for example, louvers 7070 that may open and close to allow fluid to pass through the blades 7020, 7022 during certain stages of rotation of the bladed cores. The rotation of the blades can be split into two cycles. The first cycle, which we will refer to as the ram cycle, is experienced by a blade when incoming water flow is acting directly on the impact side of the blade (as described previously with reference to element 92 in FIG. 6); this cycle can also be described as when the impact surface of the blade is experiencing ram. When incoming water flow is no longer acting directly on the impact side of the blade (i.e. the blade is no longer experiencing ram), the blade is in the second cycle, which we will refer to as the non-ram cycle. When a blade is in the ram cycle, incoming water flow causes the louvers 7070 to close, thereby creating a substantially continuous blade surface against which water may act. Once a blade transitions into the non-ram cycle, the louvers are caused to open (or bleed) creating bypasses for water ahead of the blade's rotation to flow through the blade (as opposed to otherwise getting swept up and displaced by the blade). In this way, the blades experience less rotational resistance while in the non-ram cycle, thereby enhancing power-generating rotation of the cores.

Figure 47:
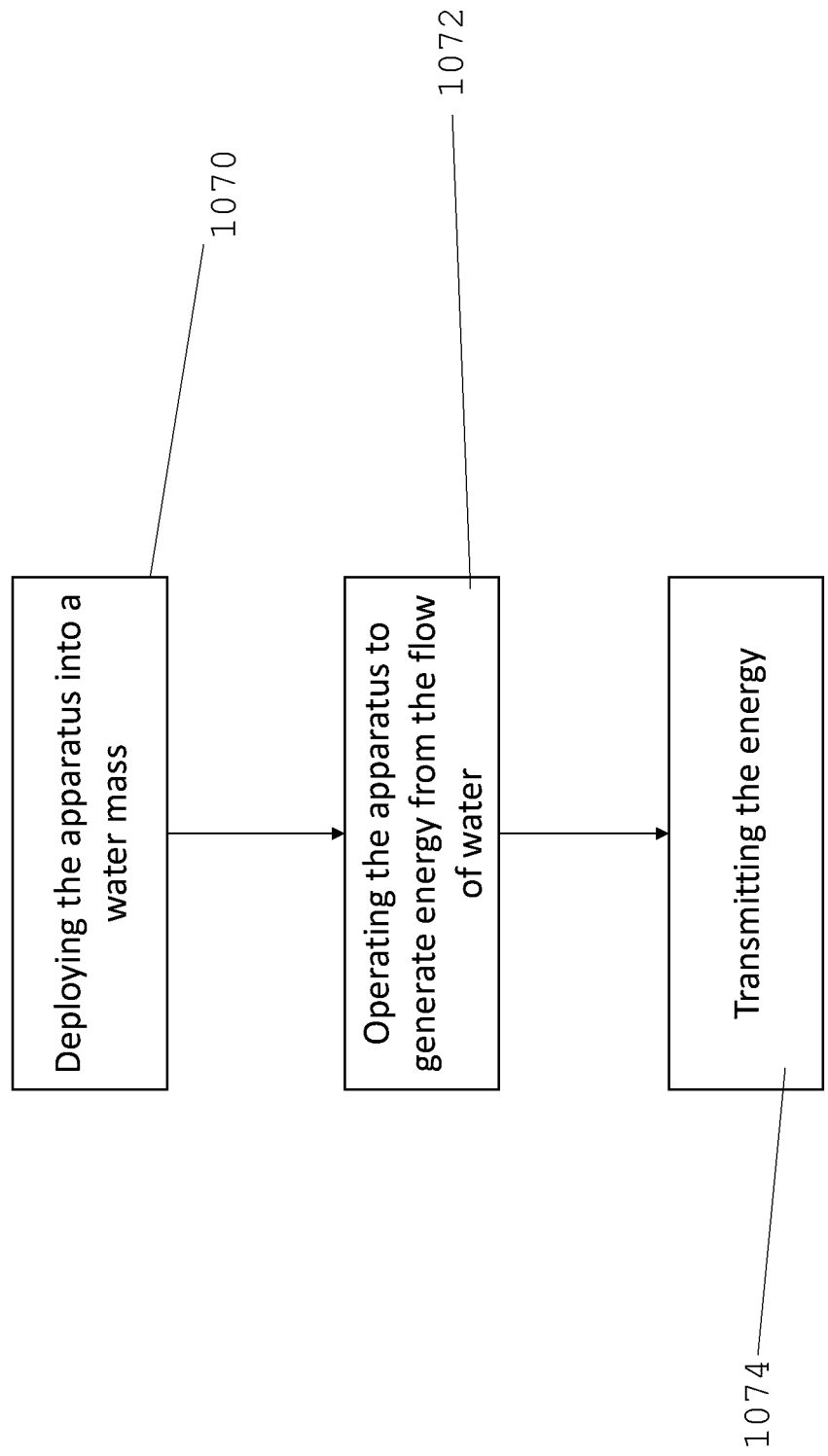

FIG. 47 shows the steps of a method for extracting energy from a flow of water using the apparatus embodiments described herein. The steps of the method may be performed in any practical order and should not be limited to the order suggested in the exemplary embodiments described herein. In one step 1070, an energy extraction apparatus according to any of the embodiments described herein is positioned or deployed in a body of water. As described, this may be achieved by tethering the apparatus to the floor of the body of water (in the case of a buoyant apparatus) or suspending the apparatus from a support structure at one or more points above the surface of the water (in the case of an apparatus that is at least partially non-buoyant). In either case, the apparatus is positioned so that the core portions are submerged in water such that the flowing water causes rotation of the cores. In another step 1072, the apparatus is operated such that mechanical rotational energy from the cores of the apparatus is converted into electricity. This may be achieved, for example, through the use of generators in communication with the rotating cores either directly or through various mechanical power transmission components commonly known in the art (as previously described). In another step 1074, the generated electricity is transmitted to be used to power any number of electrical devices and/or may be used to create or supplement one or more power grids.

Many modifications of the embodiments described herein as well as other embodiments may be evident to a person skilled in the art having the benefit of the teachings presented in the foregoing description and associated drawings. It is understood that any such modifications and additional embodiments are captured within the scope of the contemplated disclosure, which is not to be limited to any of the specific embodiments disclosed.

The invention claimed is:

1. An apparatus for extracting energy from a flow of water, the apparatus comprising:
a plurality of central cores, each supported at a first and second end, each core rotatable about a substantially vertical axis;
at least one blade member extending from each of the central cores for engaging with the flow of water to cause rotation of the central cores, the at least one blade member defining a ram surface and a lift surface; and
at least one primary flow director positioned at a leading end of the apparatus for directing incoming water flow toward a predetermined region along each of the at least one blade members,
wherein the plurality of cores is positioned behind the at least one primary flow director, and
wherein the at least one blade member further comprises:
an inner portion proximate the central core from which the at least one blade member extends;
a central portion beginning at a distal end of the inner portion; and
an outer portion beginning at a distal end of the central portion and terminating in a sharp tip,
wherein the central portion is curved to induce lift to a lift surface side of the at least one blade member and wherein a curvature of the outer portion at the tip substantially corresponds to a curvature of a circular path travelled by the tip of the outer portion of the at least one blade member during rotation of the central cores.

2. The apparatus of claim 1 further comprising a secondary flow director positioned at each side of the apparatus for directing additional water flow toward the blade members.

3. The apparatus of claim 2 wherein at least one of the secondary flow directors are rotationally adjustable.

4. The apparatus of claim 1 comprised of two central cores, wherein rotation of each central core causes its corresponding blades to travel along a circular path defining a radius "R", and wherein the central cores are spaced apart such that the circular path travelled by the blades of one core and the circular path travelled by the blades of the other core are separated by a distance "X", whereby R≤X≤4R.

5. The apparatus of claim 1 wherein the at least one primary flow director is rotationally adjustable.

6. The apparatus of claim 1 wherein the at least one primary flow director has a substantially V-shaped first end.

7. The apparatus of claim 1 wherein the at least one primary flow director has a second end, the second end having a cross-section with a shape taken from the group comprised of: a square, a line, an arc, a diamond and an arrow.

8. The apparatus of claim 1 wherein the at least one primary flow director is further comprised of pressure regulating slots for relieving a pressure build-up behind the leading end of the at least one primary flow director.

9. The apparatus of claim 1 further comprising at least one flow path for allowing fluid to escape the apparatus from behind the front flow director.

10. The apparatus of claim 1 wherein the at least one primary flow director is rotationally adjustable about a pivot axis.

11. The apparatus of claim 1 wherein the at least one extending blade member rotates through a ram cycle and a non-ram cycle, the blade further comprised of at least one fluid flow-through mechanism to alleviate pressure against the blade member while rotating through the non-ram cycle.

12. The apparatus of claim 1 wherein the at least one primary flow director comprises at least one lip at a trailing end thereof, the at least one lip for enhancing a release of flow adhesion from the primary flow director.

13. The apparatus of claim 1 wherein the plurality of central cores comprise two central cores, wherein the substantially vertical axes of the two central cores are separated by a distance "Y", wherein the primary flow director is defined by a lateral overall width "Z", and wherein the distance "Y" is greater than the lateral width "Z".

14. The apparatus of claim 1 further comprising an enclosure plate at each longitudinal extremity of the at least one blade member, the enclosure plates for assisting in prevention of fluid escaping from the longitudinal extremities of the apparatus.

15. A method to extract energy from a flow of water, comprising the steps of:
deploying an apparatus into a water mass, the apparatus comprising:
a plurality of central cores, each supported at a first and second end, each core rotatable about a substantially vertical axis;
at least one blade member extending from each of the central cores for engaging with the flow of water to cause rotation of the central cores, the at least one blade member defining a ram surface and a lift surface; and
at least one primary flow director positioned at a leading end of the apparatus for directing incoming water flow toward a predetermined region along each of the at least one blade members,
wherein the plurality of cores is positioned behind the at least one primary flow director,
wherein the at least one blade member further comprises:
an inner portion proximate the central core from which the at least one blade member extends;
a central portion beginning at a distal end of the inner portion; and
an outer portion beginning at a distal end of the central portion and terminating in a sharp tip,
wherein the central portion is curved to induce lift to a lift surface side of the at least one blade member and wherein a curvature of the outer portion at the tip substantially corresponds to a curvature of a circular path travelled by the tip of the outer portion of the at least one blade member during rotation of the central cores;
operating the apparatus to generate energy from the flow of the water; and
transmitting the energy to power an electrical device.

16. An apparatus for extracting energy from a flow of water, the apparatus comprising:
a plurality of central cores, each supported at a first and second end, each core rotatable about a substantially vertical axis;
at least one blade member extending from each of the central cores for engaging with the flow of water to cause rotation of the central cores; and
at least one primary flow director positioned at a leading end of the apparatus for directing incoming water flow toward a predetermined region along each of the at least one blade members,
wherein the plurality of cores is positioned behind the at least one primary flow director, and
wherein the at least one extending blade member is substantially bodyless and terminates at a tip, wherein a curvature of the blade at its tip is substantially congruent with a curvature of the circular path travelled by the tip during rotation of the core.

17. The apparatus of claim 16 wherein the at least one primary flow director is rotationally adjustable.

18. The apparatus of claim 16 wherein the at least one primary flow director is further comprised of pressure regulating slots for relieving a pressure build-up behind the leading end of the at least one primary flow director.

19. The apparatus of claim 16 further comprising at least one flow path for allowing fluid to escape the apparatus from behind the front flow director.

20. The apparatus of claim 16 wherein the at least one extending blade member rotates through a ram cycle and a non-ram cycle, the blade further comprised of at least one fluid flow-through mechanism to alleviate pressure against the blade member while rotating through the non-ram cycle.

* * * * *